US010967465B2

(12) United States Patent
Fisher et al.

(10) Patent No.: US 10,967,465 B2
(45) Date of Patent: Apr. 6, 2021

(54) APPARATUS AND METHOD FOR BAFFLE BOLT REPAIR

(71) Applicant: BWXT Nuclear Energy, Inc., Lynchburg, VA (US)

(72) Inventors: Benjamin D. Fisher, Lynchburg, VA (US); Thomas A. Pritchett, Huntsville, AL (US); Shant Daghlian, Soddy Daisy, TN (US); Andrew T. Pace, Rising Fawn, GA (US); Douglas M. Lawrence, Evington, VA (US); Nicholas Johnson, Chattanooga, TN (US); Jerry Cooper, Cleveland, TN (US); Christopher J. Farrell, Signal Mountain, TN (US)

(*) Notice: Subject to any disclaimer, the term of this patent is extended or adjusted under 35 U.S.C. 154(b) by 127 days.

(21) Appl. No.: 15/916,145

(22) Filed: Mar. 8, 2018

(65) Prior Publication Data
US 2018/0257183 A1    Sep. 13, 2018

Related U.S. Application Data

(60) Provisional application No. 62/468,912, filed on Mar. 8, 2017.

(51) Int. Cl.
*B23P 6/04* (2006.01)
*G21C 19/20* (2006.01)
(Continued)

(52) U.S. Cl.
CPC ............... *B23P 6/04* (2013.01); *B23P 6/00* (2013.01); *B23P 19/06* (2013.01); *G21C 5/02* (2013.01);
(Continued)

(58) Field of Classification Search
CPC .......... B23P 19/06; B23P 6/00; G21C 19/207; Y10T 29/531; Y10T 29/49815;
(Continued)

(56) References Cited

U.S. PATENT DOCUMENTS 4,048,687 A * 9/1977 Kato ..................... B23P 19/105
470/45
4,069,102 A    1/1978 Berringer et al.
(Continued)

FOREIGN PATENT DOCUMENTS

CN    1058364    2/1992
CN    1084310    3/1994
(Continued)

OTHER PUBLICATIONS

International Search Report and Written Opinion, PCT/US2018/21632, dated Oct. 1, 2018, 20 pages.
(Continued)

*Primary Examiner* — Jermie E Cozart
(74) *Attorney, Agent, or Firm* — Nelson Mullins Riley & Scarborough LLP

(57) ABSTRACT

A bolt repair platform includes a frame and a tool module. The tool module includes a tool having a first end configured to rotationally engage a bolt. The tool module also includes an actuator disposed between the tool and the frame so that actuation of the actuator moves the tool with respect to the frame. The frame is removably disposed on the structure, and the tool is movable with respect to the frame, so that, at each of a plurality of positions, the second end of the tool is capable of engagement with a respective bolt disposed in an internal support structure of a nuclear reactor vessel.

38 Claims, 51 Drawing Sheets

(51) Int. Cl.
  *B23P 19/06* (2006.01)
  *B23P 6/00* (2006.01)
  *G21C 5/02* (2006.01)
  *G21C 19/02* (2006.01)

(52) U.S. Cl.
  CPC ........... *G21C 19/02* (2013.01); *G21C 19/207* (2013.01); *Y02E 30/30* (2013.01); *Y10T 29/49815* (2015.01); *Y10T 29/49819* (2015.01); *Y10T 29/531* (2015.01)

(58) Field of Classification Search
  CPC ......... Y10T 29/49819; Y10T 29/53087; Y10T 29/53061
  See application file for complete search history.

(56) References Cited

U.S. PATENT DOCUMENTS

| | | | |
|---|---|---|---|
| 4,561,816 A | 12/1985 | Dingess | |
| 4,673,545 A | 6/1987 | Cooke et al. | |
| 4,683,108 A | 7/1987 | Balog | |
| 4,715,111 A * | 12/1987 | Kapoor | G21C 3/335 29/723 |
| 4,941,159 A | 7/1990 | Schwirian et al. | |
| 4,986,314 A | 1/1991 | Himmler | |
| 4,991,280 A | 2/1991 | Reimer et al. | |
| 5,146,676 A | 9/1992 | Cuba | |
| 5,209,895 A | 5/1993 | Wivagg | |
| 5,482,409 A | 1/1996 | Dunning et al. | |
| 5,687,206 A | 11/1997 | Schmidt et al. | |
| 5,771,266 A | 6/1998 | Fabris | |
| 5,787,137 A | 7/1998 | Nelson, III et al. | |
| 5,803,688 A | 9/1998 | Gleason et al. | |
| 5,930,316 A | 7/1999 | Kowdley et al. | |
| 6,055,288 A | 4/2000 | Schwirian | |
| 6,163,946 A * | 12/2000 | Pryor | A01B 69/008 29/407.04 |
| 6,578,451 B1 | 6/2003 | Graeff | |
| 6,715,201 B2 * | 4/2004 | Sato | G21C 19/02 29/712 |
| 7,668,281 B2 | 2/2010 | Balog et al. | |
| 8,615,065 B2 | 12/2013 | Balog | |
| 8,739,704 B2 | 6/2014 | Wickman et al. | |
| 9,393,680 B2 | 7/2016 | Cocke | |
| 9,505,051 B2 | 11/2016 | Oberoi et al. | |
| 2002/0032956 A1 * | 3/2002 | Walt, II | B25H 1/0021 29/525.01 |
| 2008/0317192 A1 * | 12/2008 | Rowell | G21C 19/207 376/249 |
| 2016/0176685 A1 | 6/2016 | O'Dell | |

FOREIGN PATENT DOCUMENTS

| | | |
|---|---|---|
| CN | 203956473 | 11/2014 |
| EP | 0194330 A1 | 9/1986 |
| EP | 2 103 376 B1 | 6/2012 |
| FR | 2589535 A1 | 5/1987 |
| FR | 2684481 B1 | 3/1994 |
| FR | 2742255 B1 | 3/1998 |
| JP | 2001305261 A | 10/2001 |
| JP | 2002357690 A | 12/2002 |
| JP | 2002357691 A | 12/2002 |
| JP | 2003028980 | 1/2003 |
| JP | 4365546 B2 | 11/2009 |
| JP | 4560234 B2 | 10/2010 |
| KR | 101547765 B1 | 8/2015 |
| WO | 95/18452 A1 | 7/1995 |
| WO | 2018/165488 A2 | 9/2018 |

OTHER PUBLICATIONS

Invitation to Pay Additional Fees, and, Where Applicable, Protest Fee, PCT/2018/21632, dated Jul. 25, 2018, 2 pages.
European Extended Search report dated Oct. 29, 2020, for corresponding European application No. 18764376.2.
Chinese First Examination Report dated Aug. 5, 2020, for corresponding Chinese application No. 201880029859.1.

* cited by examiner

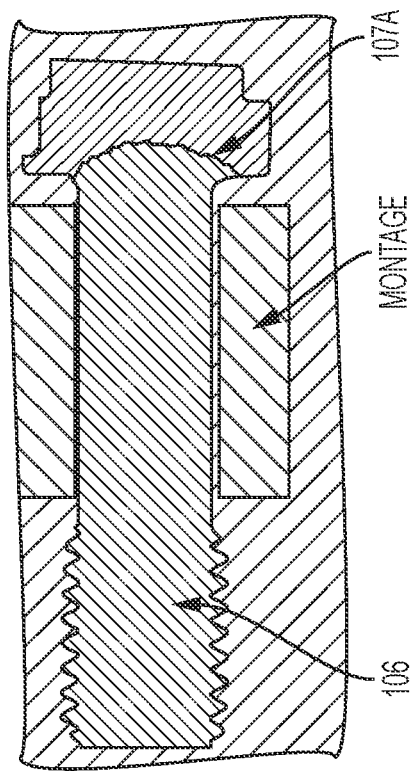
FIG. 3D
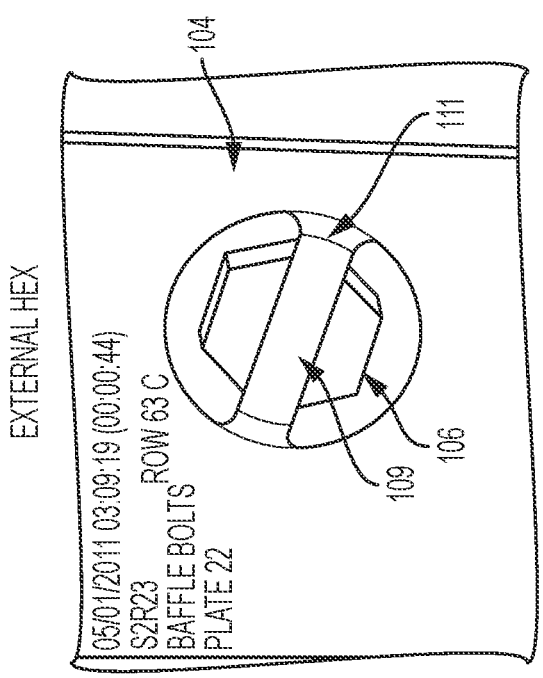
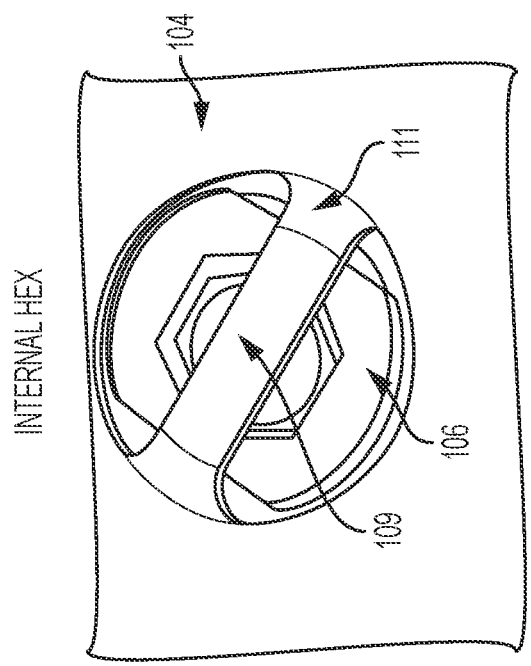
FIG. 3C

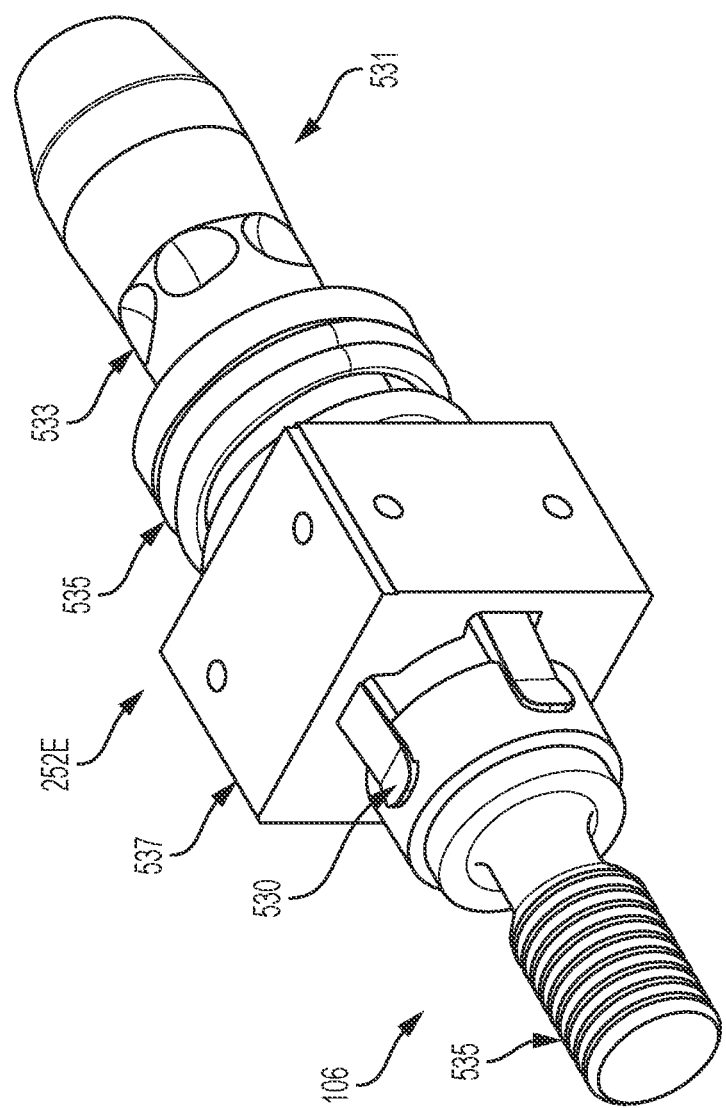

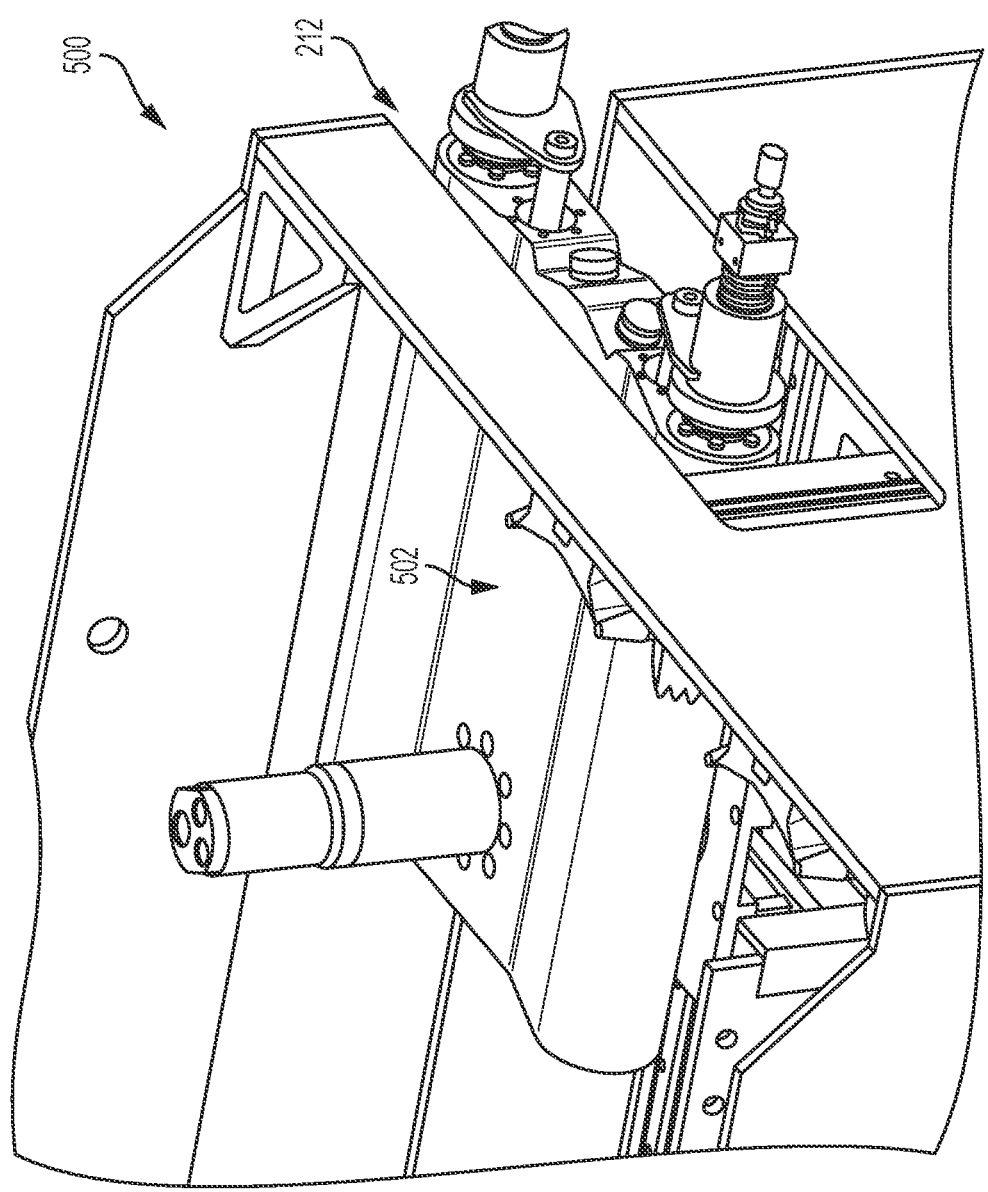

APPARATUS AND METHOD FOR BAFFLE BOLT REPAIR

CROSS REFERENCE TO RELATED APPLICATIONS

This application claims the benefit of U. S. Provisional Application No. 62/468,912 filed on Mar. 8, 2017, the entire contents of which are hereby incorporated herein by reference.

FIELD OF THE INVENTION

Example embodiments generally relate to repair of baffle bolts in reactor core assemblies.

BACKGROUND OF THE INVENTION

Nuclear reactor vessels, particularly pressurized water reactor vessels, may include internal structures to support and orient reactor fuel and direct coolant through a reactor core. One such internal structure may be a core baffle that includes a set of vertical plates surrounding the outer rim of the reactor fuel assembly. The core baffle provides lateral restraint to the core and directs coolant flow through the core in that it blocks coolant flow laterally but permits vertical flow. The vertical baffle plates may be bolted to the edges of horizontal former plates which, in turn, may be bolted to the inside surface of a core barrel. There may, typically, be several levels of former plates located at various elevations within the core barrel. Baffle-former bolts, e. g. baffle bolts, may secure the baffle plates to the former plates.

Baffle bolts may degrade, e. g. due to one or more of irradiated assisted stress corrosion cracking, loss of preload, thermal and irradiation embrittlement, high cycle fatigue/unzippering/overload, steady-state pressure gradient across the baffle plates, or the like. In some reactor plants, a portion of the water flowing through the reactor vessel may be directed between the core barrel and the baffle plates to cool the baffle structure in either a downward direction ("down-flow"), or an upward direction ("up-flow"). "Down-flow" plants may place more stress on baffle bolts, which may contribute to the bolts' susceptibility to degradation. Plants with the modified "up-flow" direction suffer less baffle-former bolt cracking as compared to the "down-flow" designs.

A tooling system that may be used to replace baffle bolts includes a large mast with a tool on an end effector that is configured to work, i. e. extract and replace, one baffle bolt at a time. Such systems achieve an average removal rate of about eight bolts per day. In some cases, removal rates of up to sixteen bolts per day have been reported with upgraded equipment and skilled operators, but, in many cases, removal rates are approximately four bolts per day. This rate of removal of baffle bolts may be undesirable when reactor plants experience high bolt failure rates. Plants faced with the need to replace two hundred bolts in a single maintenance outage can experience 25-40 day impacts to restored operation.

SUMMARY OF THE INVENTION

Accordingly, example embodiments may enable baffle bolt repair, as described below. In one example embodiment, a bolt repair platform for repairing a bolt disposed in an internal support structure of a nuclear reactor vessel includes a frame and a tool module. The tool module including a tool having a first end configured to rotationally engage a bolt and a second end and a motor-driven rotary driver movably mounted on the frame. The rotary driver defines a distal end thereof that is configured to retain the second end of the tool so that, when actuated, the rotary driver rotationally drives the tool. The tool module also includes an actuator operatively disposed between the rotary driver and the frame so that actuation of the actuator moves the rotary driver among a plurality of positions of the rotary driver with respect to the frame. The frame is removably disposed on the structure, and the rotary driver is movable with respect to the frame so that, at each of the plurality of positions of the rotary driver, the second end of the tool is capable of engagement with a respective bolt disposed in the structure.

In another example embodiment, a method for repairing a bolt disposed in an internal support structure of a nuclear reactor vessel, is provided including the steps of providing a bolt repair platform including a frame, a motor-driven rotary driver movably mounted on the frame among a plurality of positions of the rotary driver with respect to the frame, and a tool having a first end configured to rotationally engage a bolt and a second end. The rotary driver defines a distal end thereof that is configured to retain the second end of the tool so that, when actuated, the rotary driver rotationally drives the tool. The method also includes disposing the frame removably on the structure and moving the rotary driver with respect to the frame and actuating the rotary driver so that, at each of the plurality of positions of the rotary driver, the second end of the tool engages a respective bolt disposed in the structure.

In a further embodiment of a method of repairing bolts disposed in baffle plates forming an internal support structure of a nuclear reactor vessel, a frame is provided adjacent one or more baffle plates. A tool is disposed movably on the frame, the tool having an end configured to engage a bolt. A first actuator is operatively disposed between the tool and the frame so that actuation of the first actuator moves the tool with respect to the frame. The first actuator is actuated to move the tool with respect to the frame to a position proximate a first bolt disposed in a said baffle plate. At least one of the frame and the tool is moved with respect to the baffle plate so that the end of the tool engages the first bolt.

In a still further embodiment, a system for repairing bolts disposed in baffle plates forming an internal support structure of a nuclear reactor vessel includes a frame disposed adjacent one or more baffle plates. A tool is disposed movably on the frame, the tool having an end configured to engage a bolt. A first actuator is operatively disposed between the tool and the frame so that actuation of the first actuator moves the tool with respect to the frame. The frame and the tool are disposed with respect to a baffle plate so that, upon actuating the first actuator to move the tool with respect to the frame to a position proximate a first bolt disposed in the baffle plate, movement of at least one of the frame and the tool with respect to the baffle plate engages the tool with the first bolt.

BRIEF DESCRIPTION OF THE DRAWINGS

Figure 1:
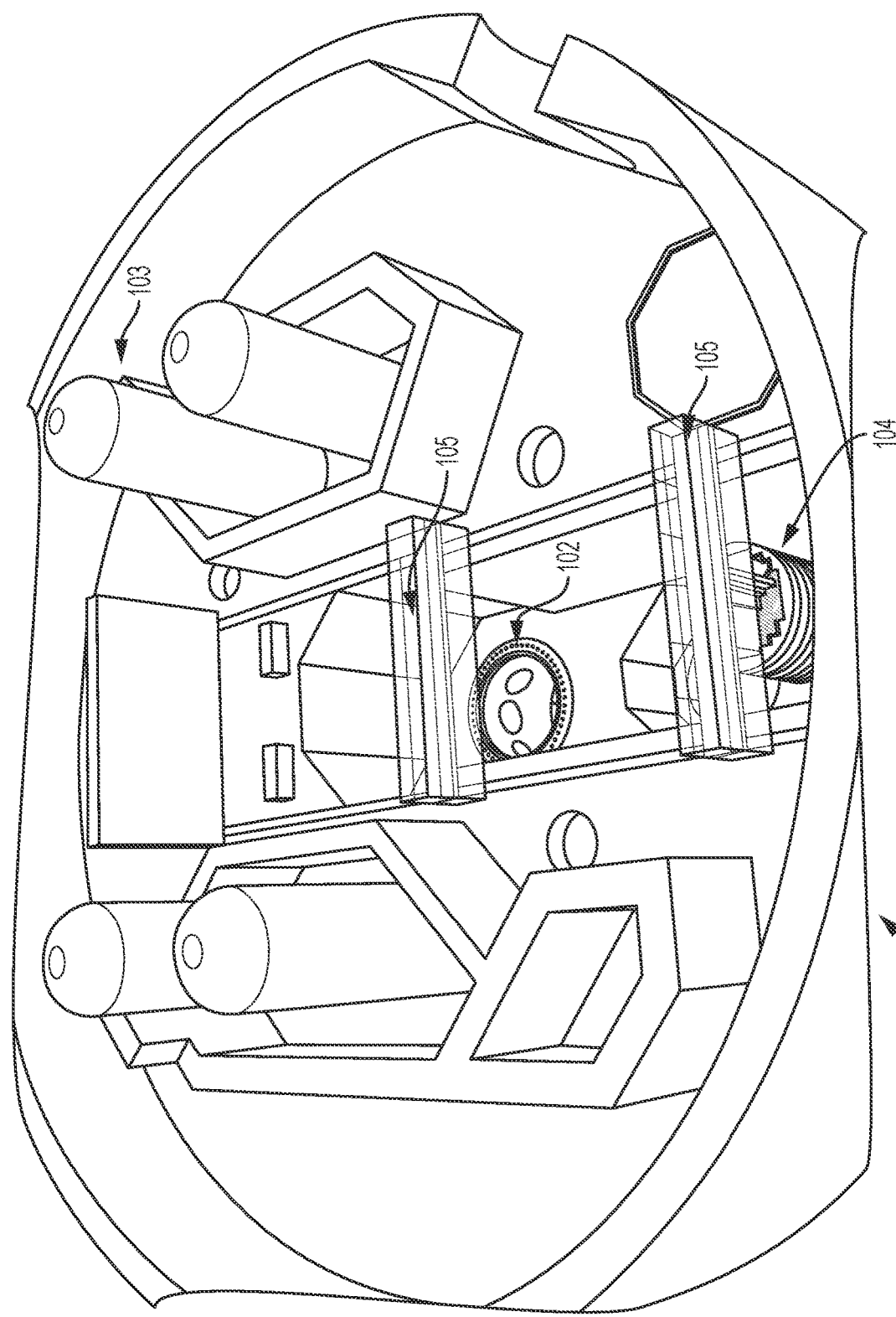
Figure 2:
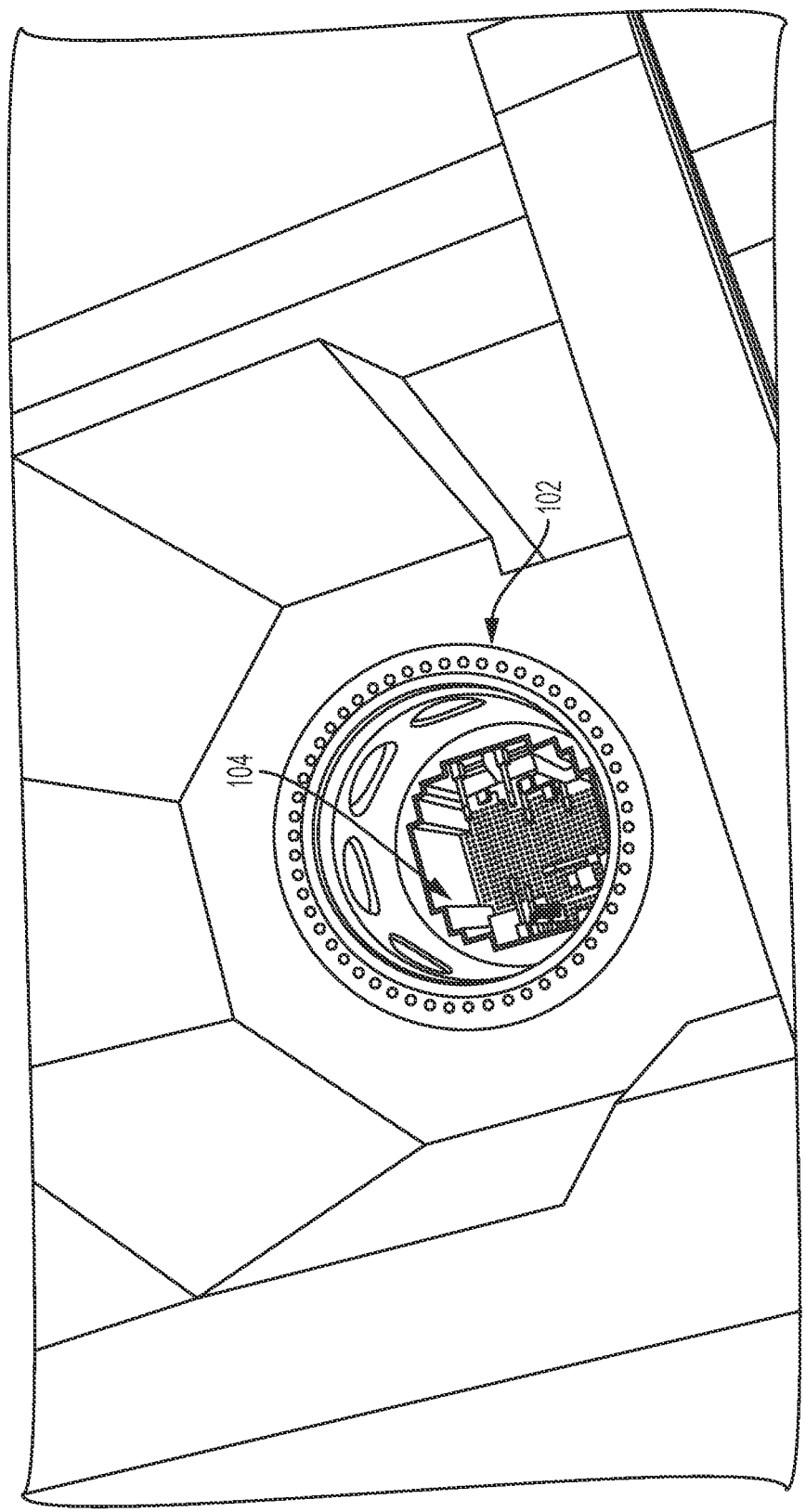
Figure 3A:
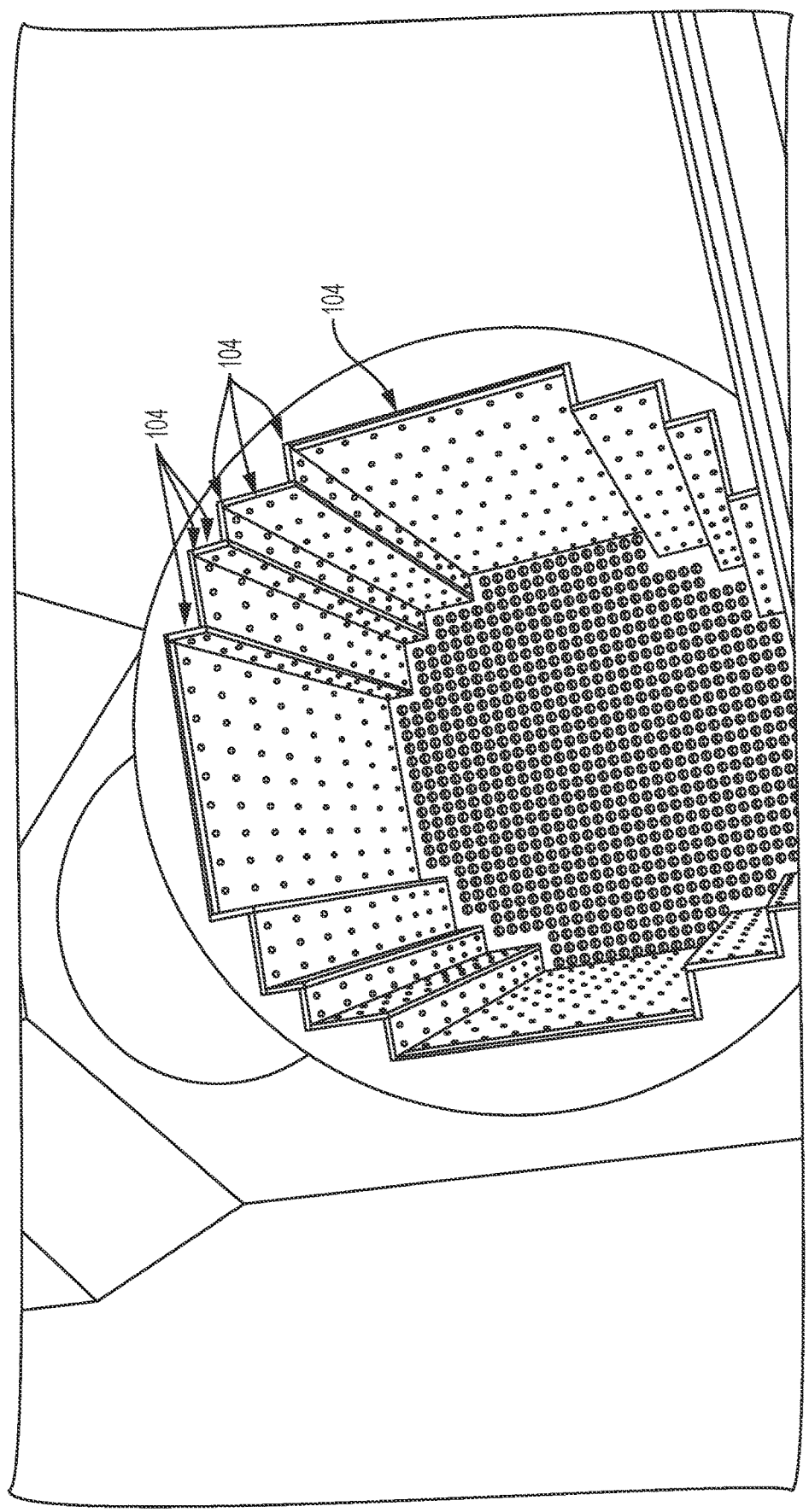
Figure 3B:
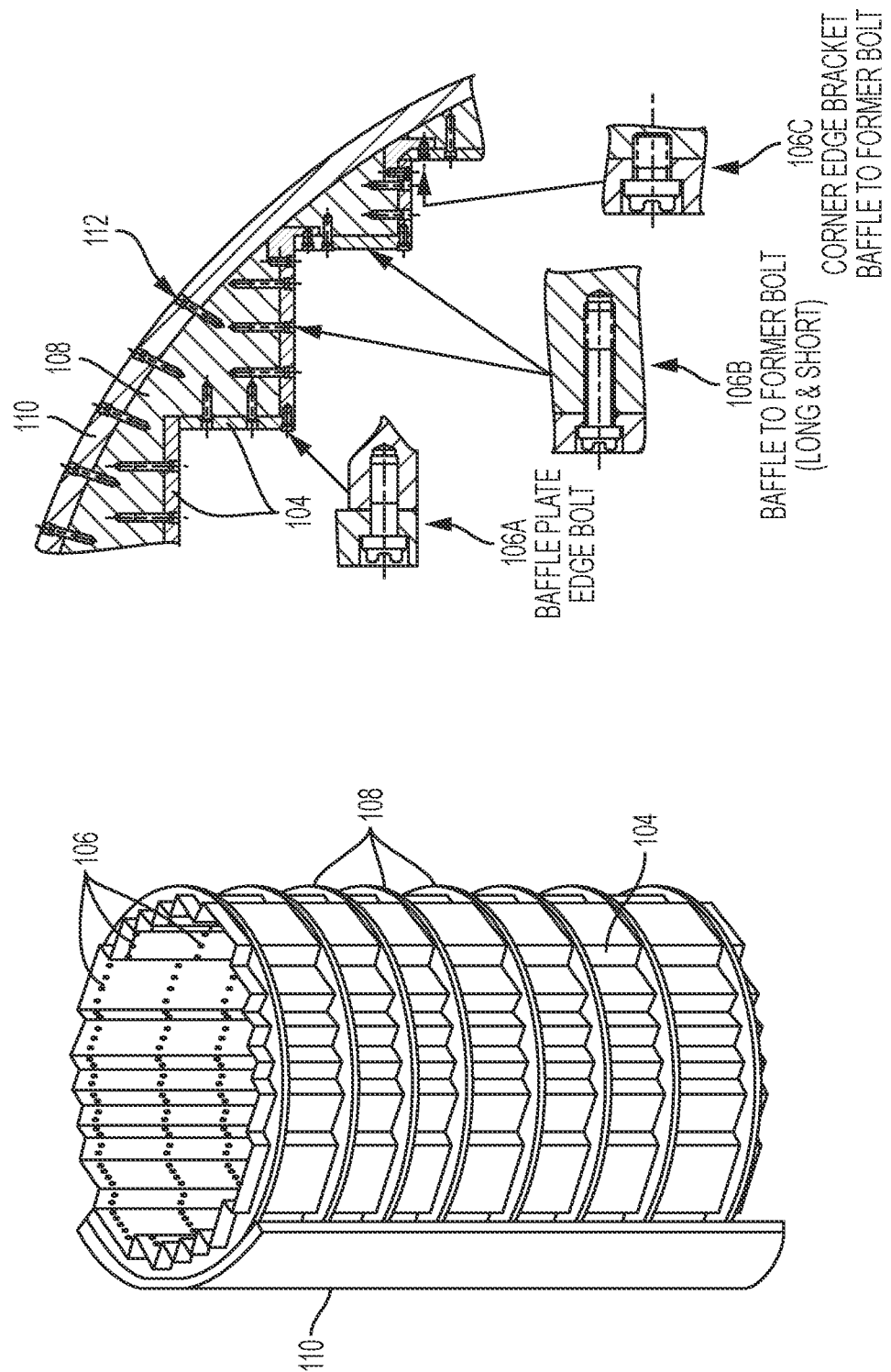
Figure 3E:
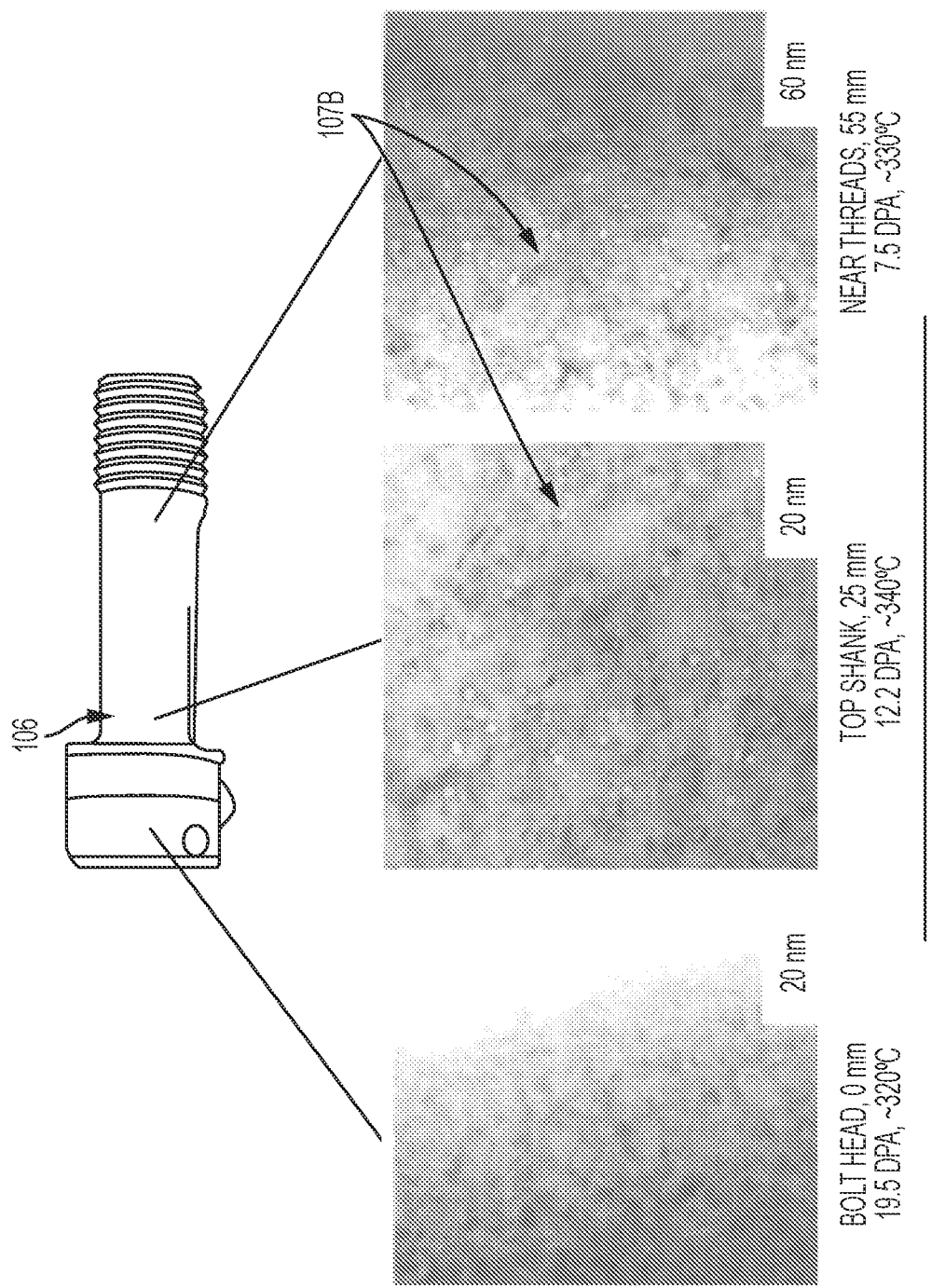
Figure 4:
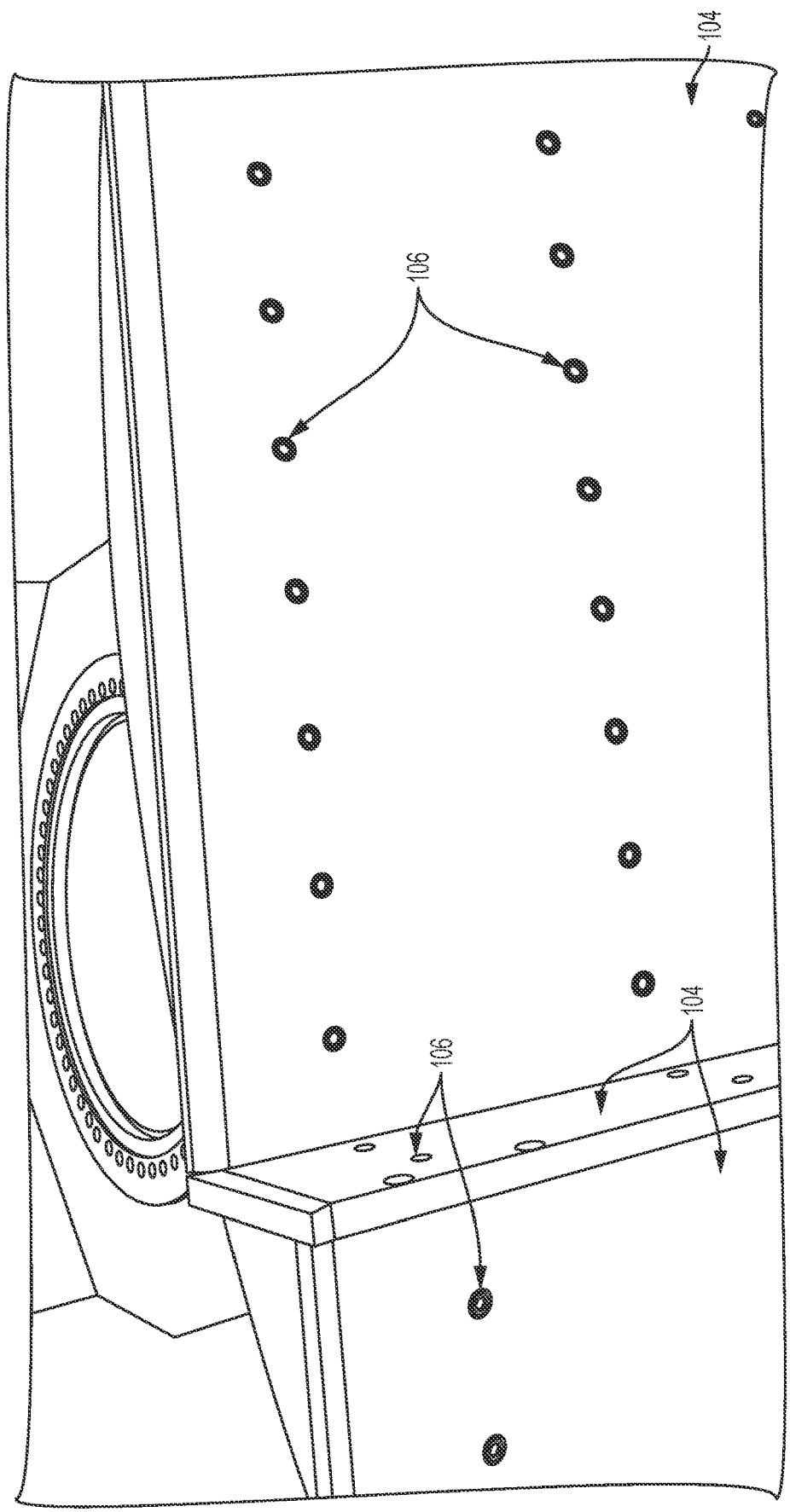
Figure 5:
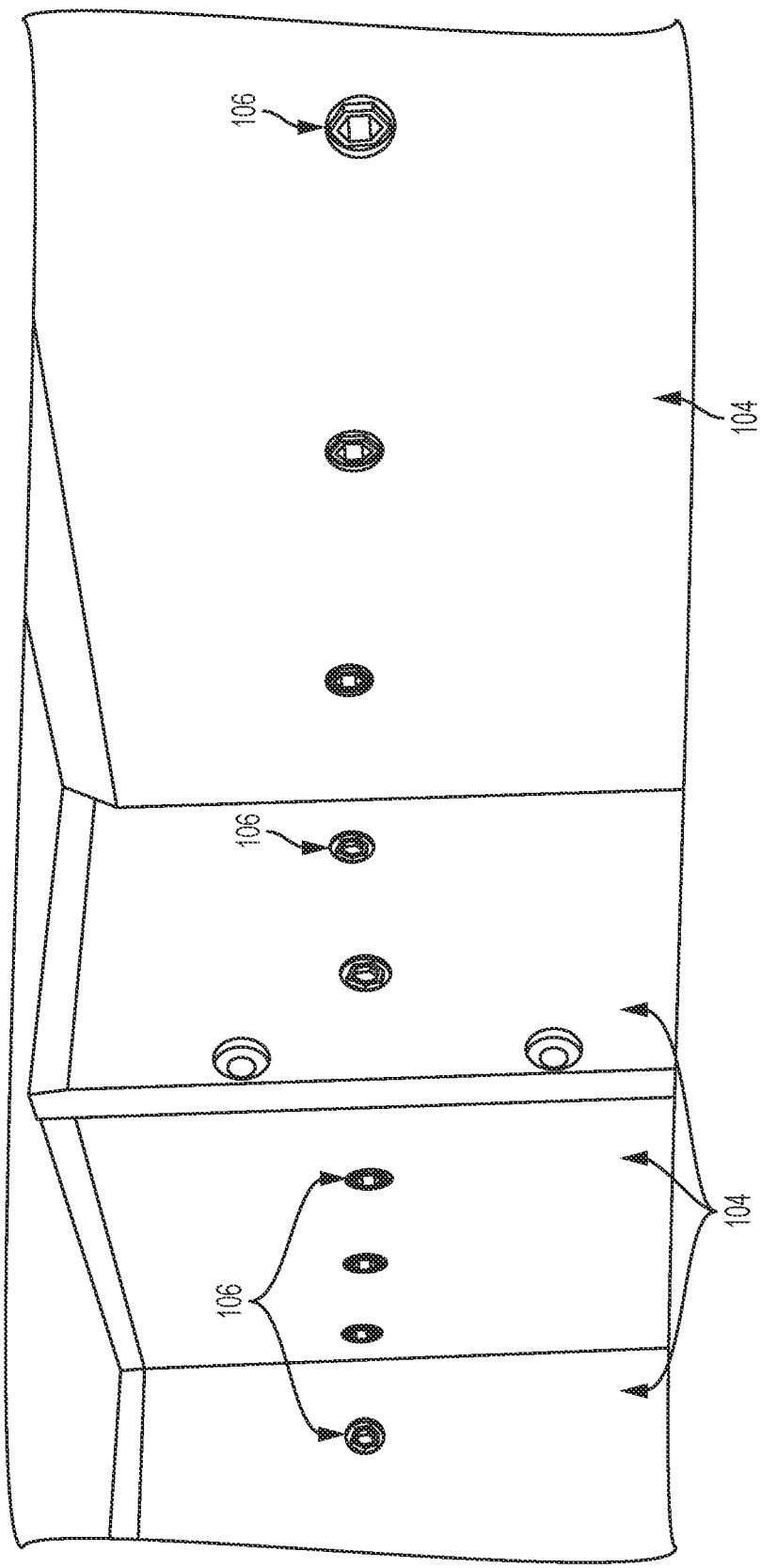
Figure 6:
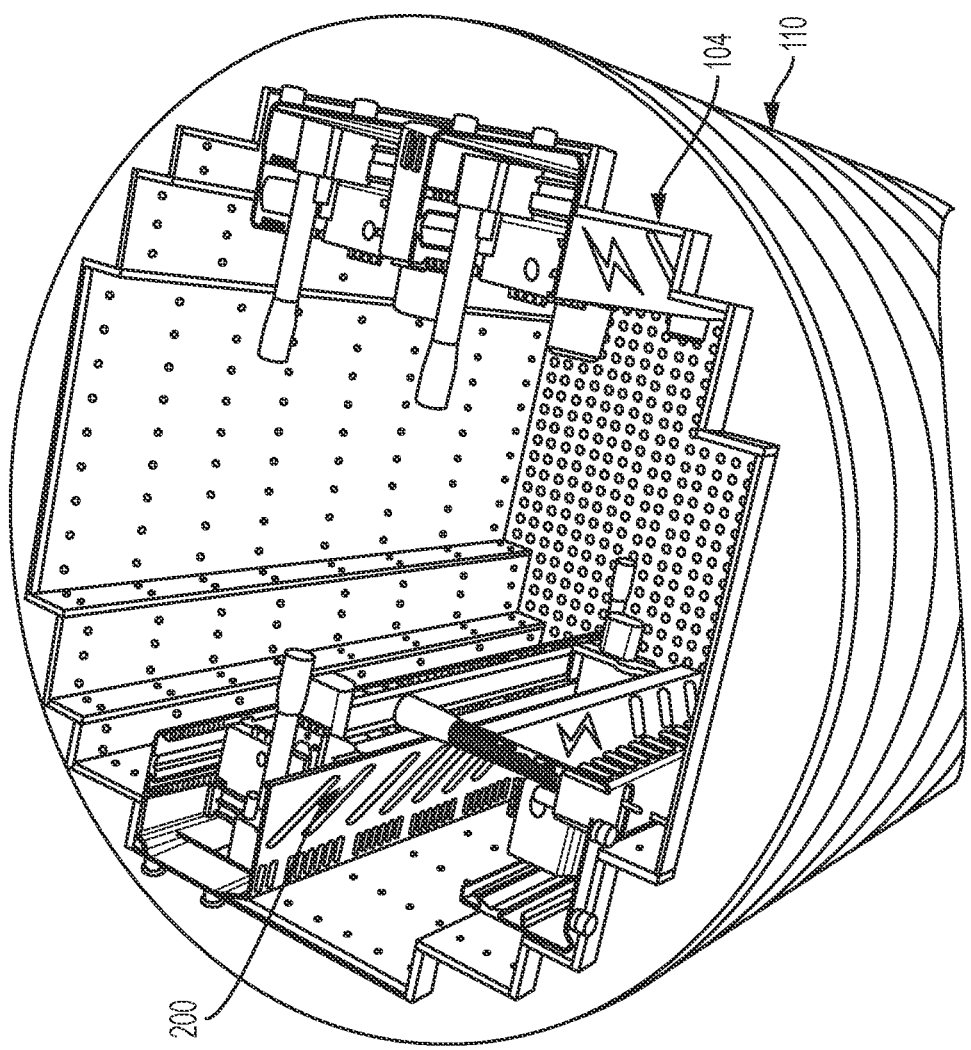
Figure 7:
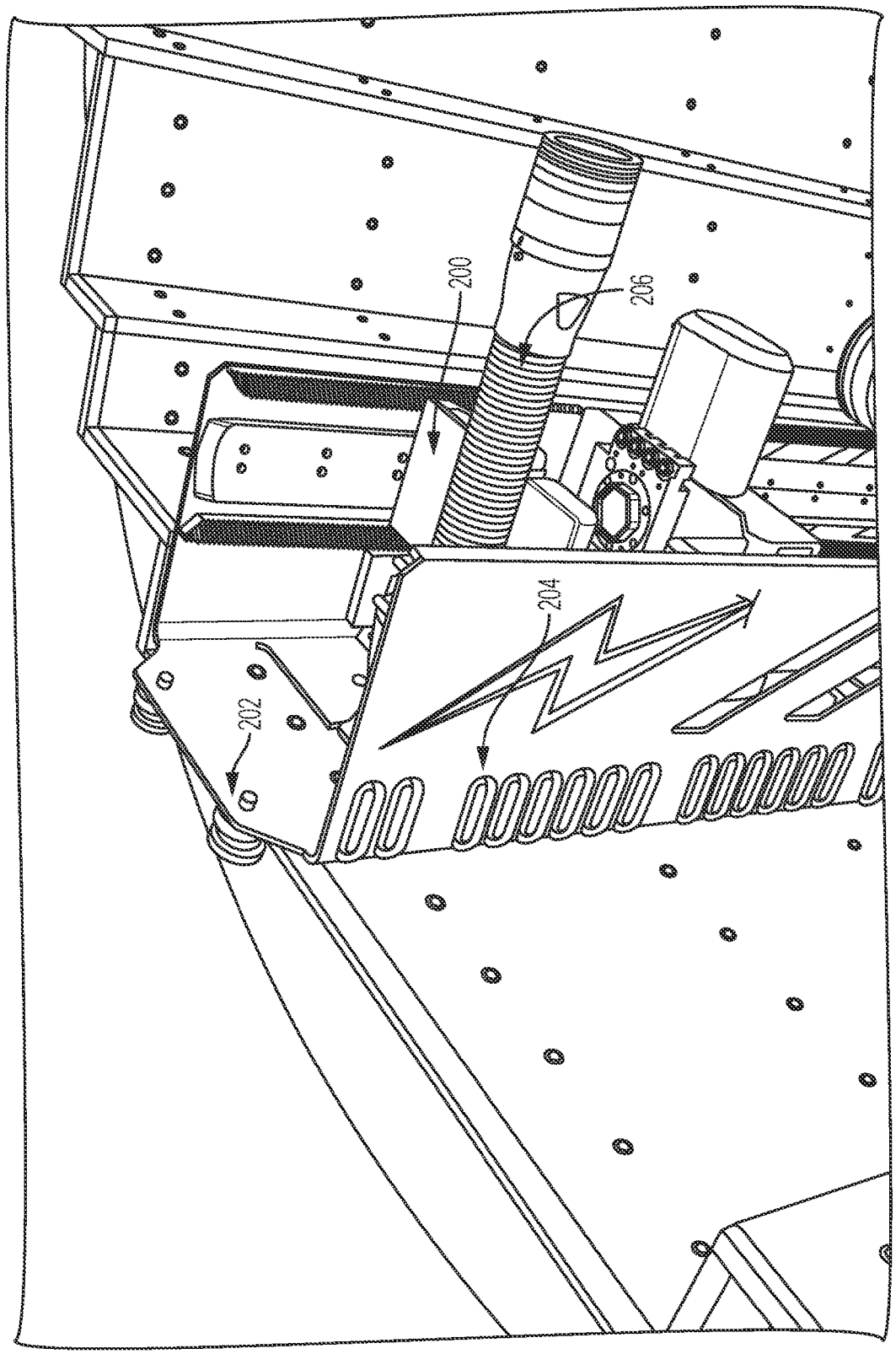
Figure 8:
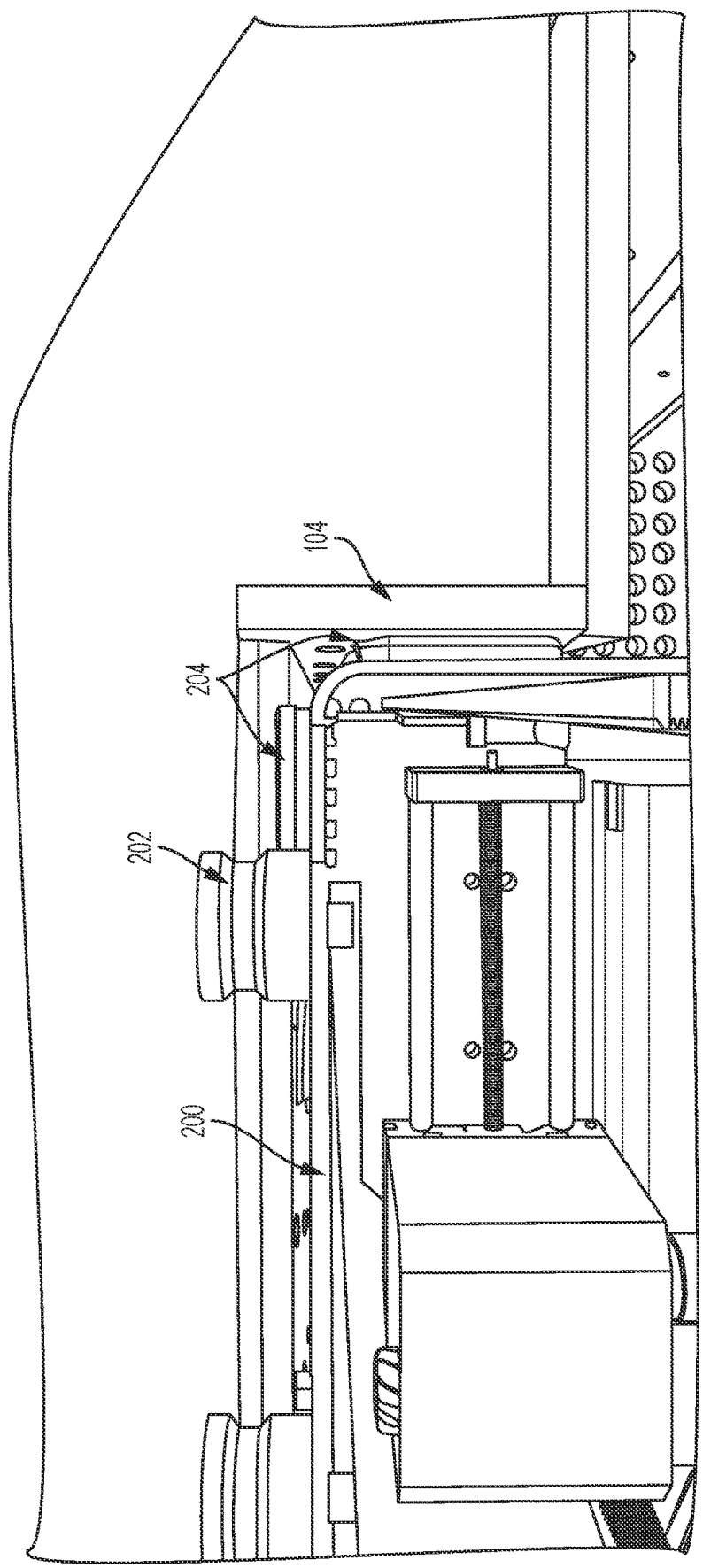
Figure 9:
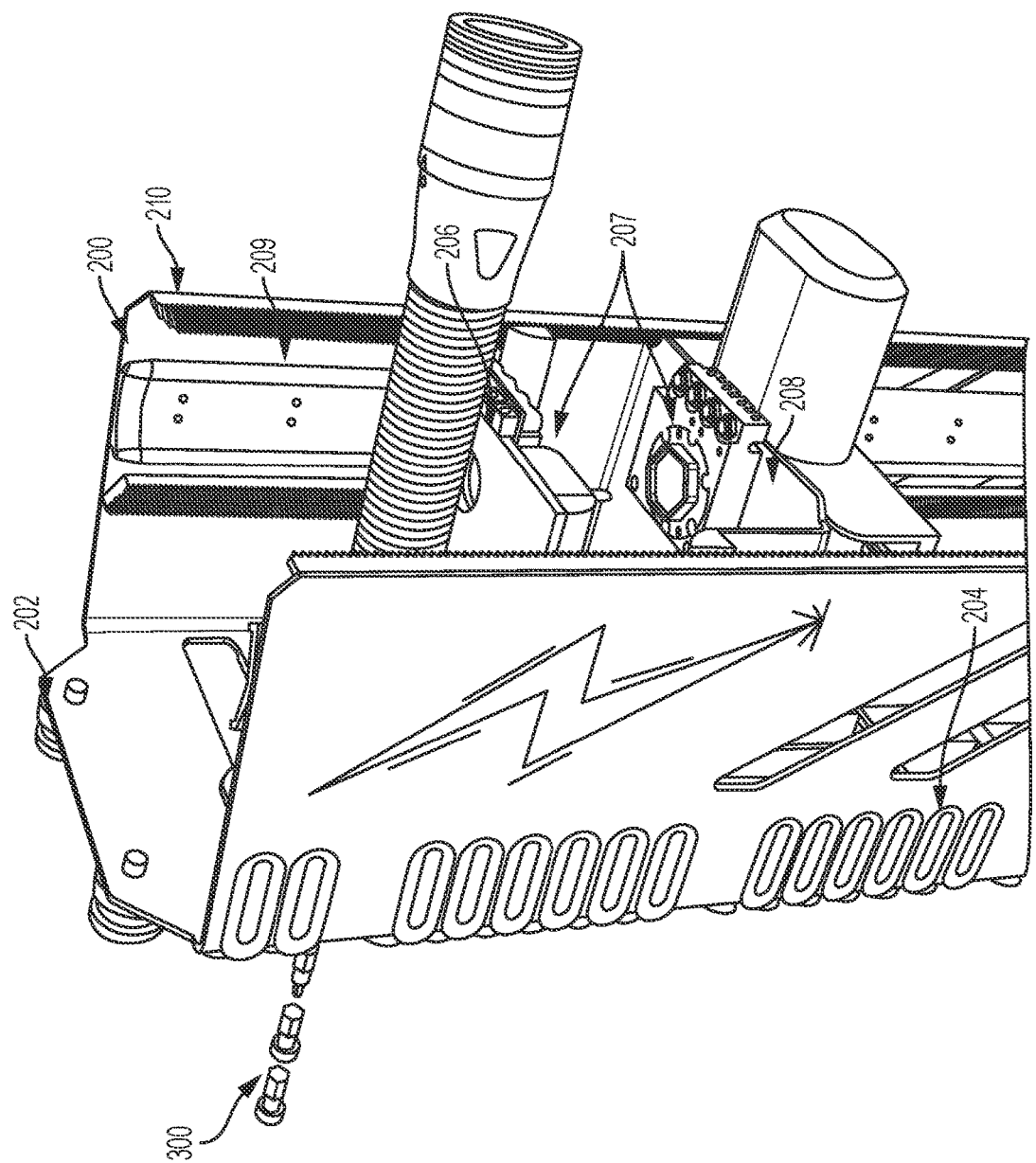
Figure 10:
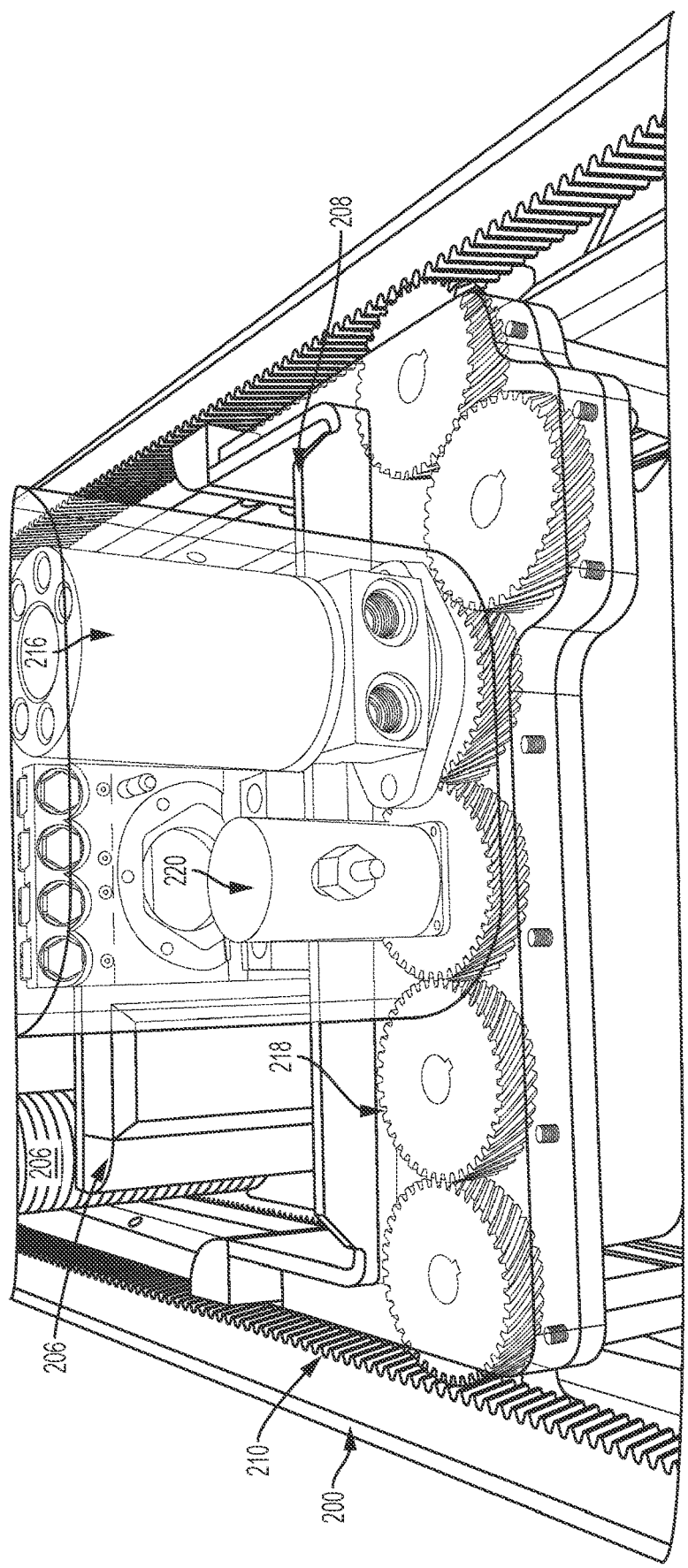
Figure 11:
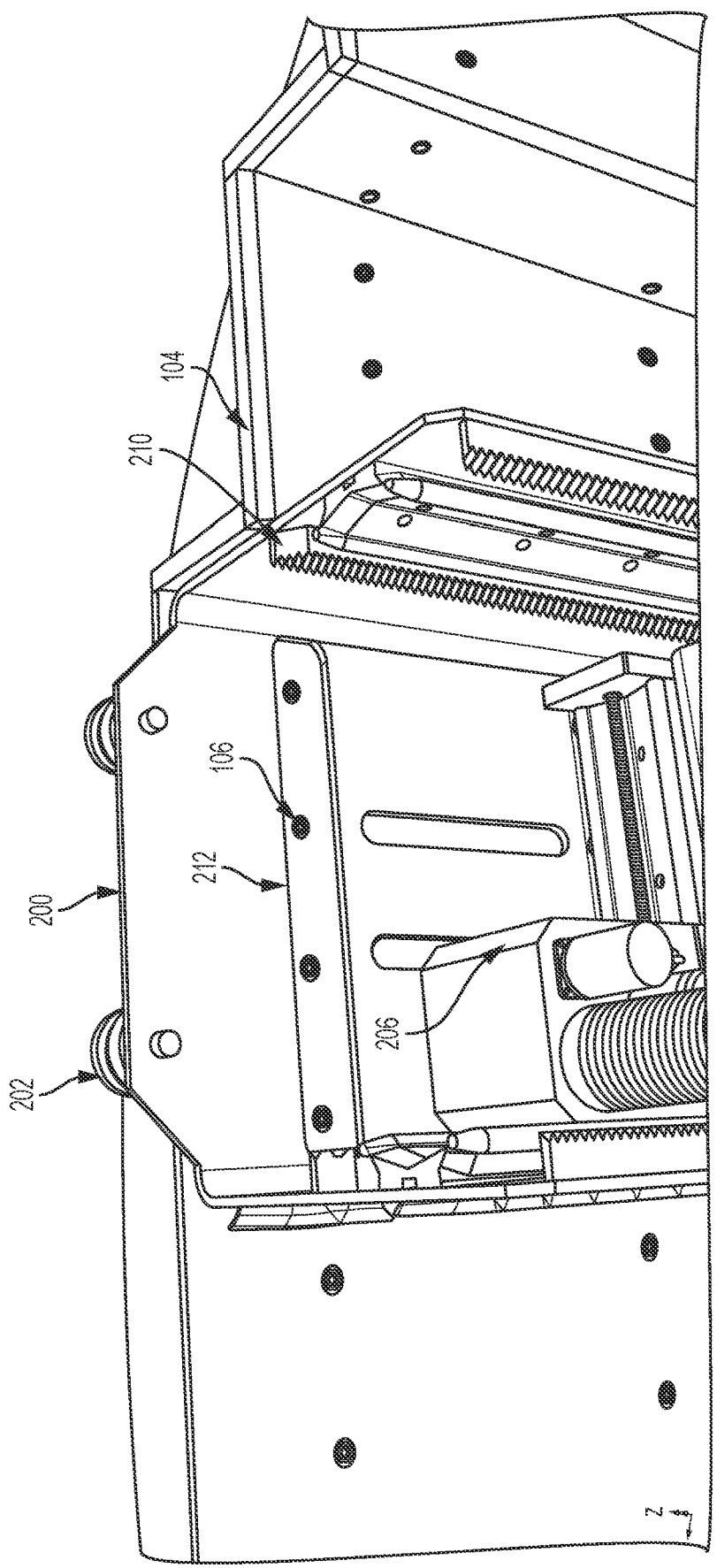
Figure 12:
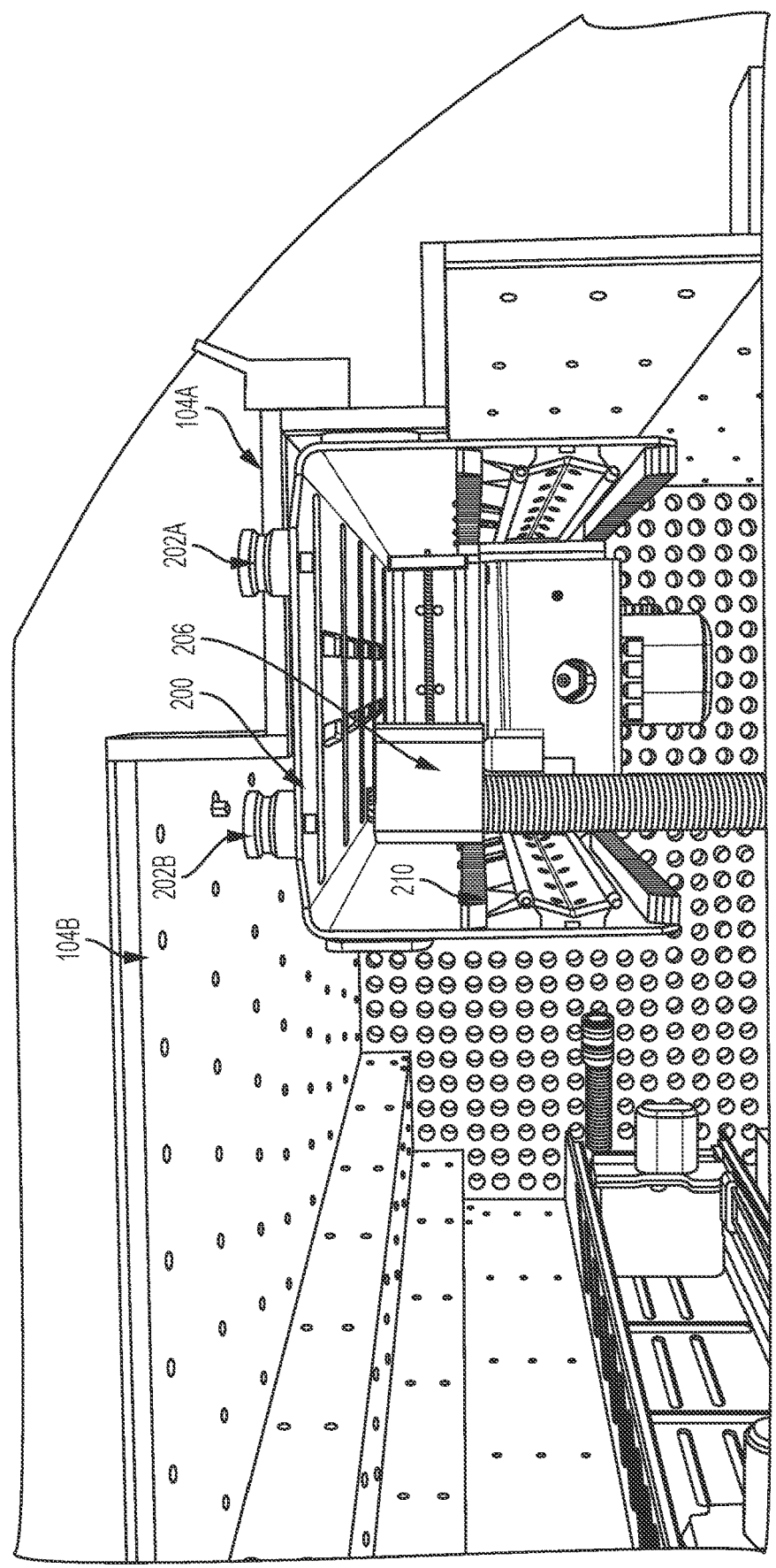
Figure 13:
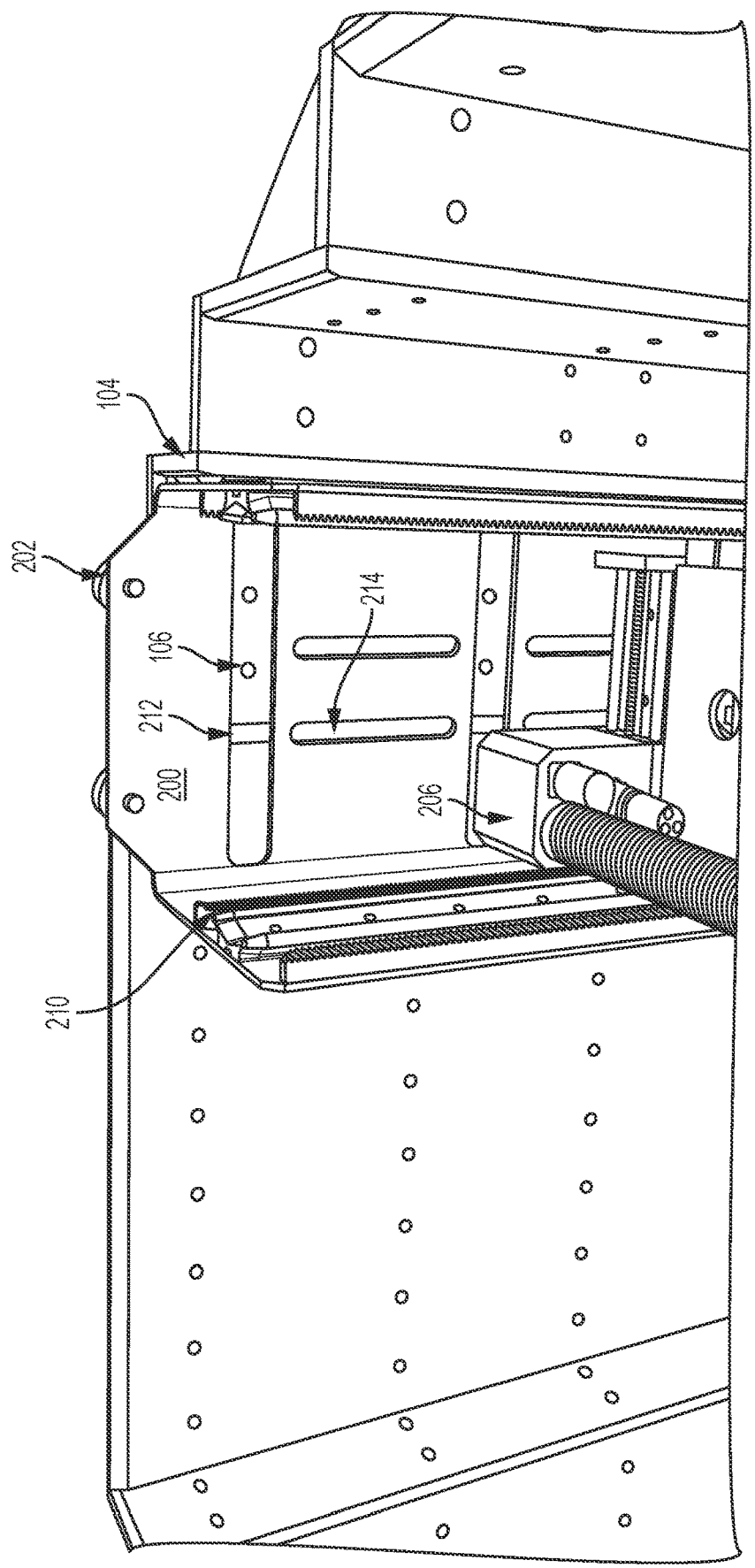
Figure 14:
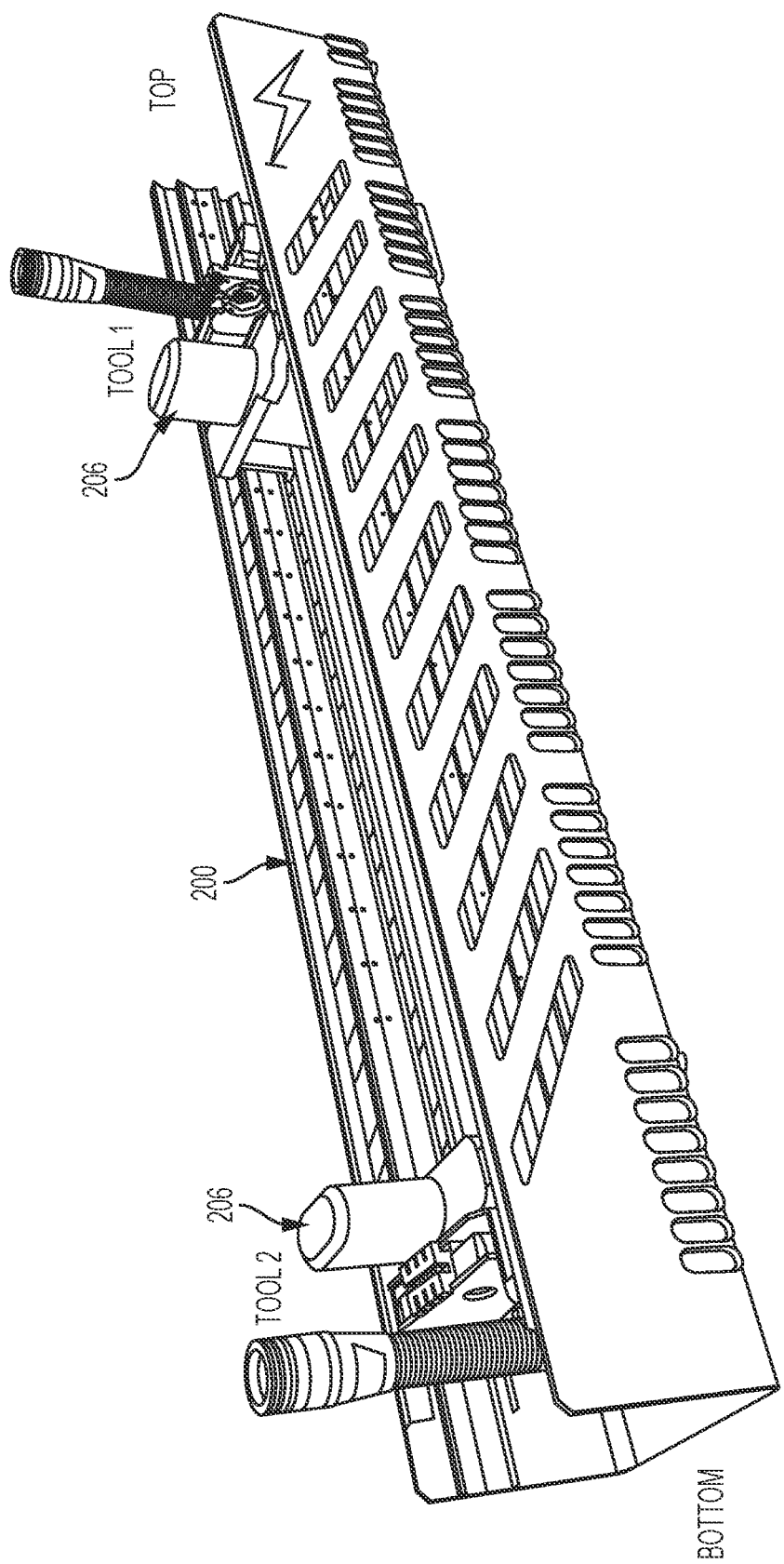
Figure 15:
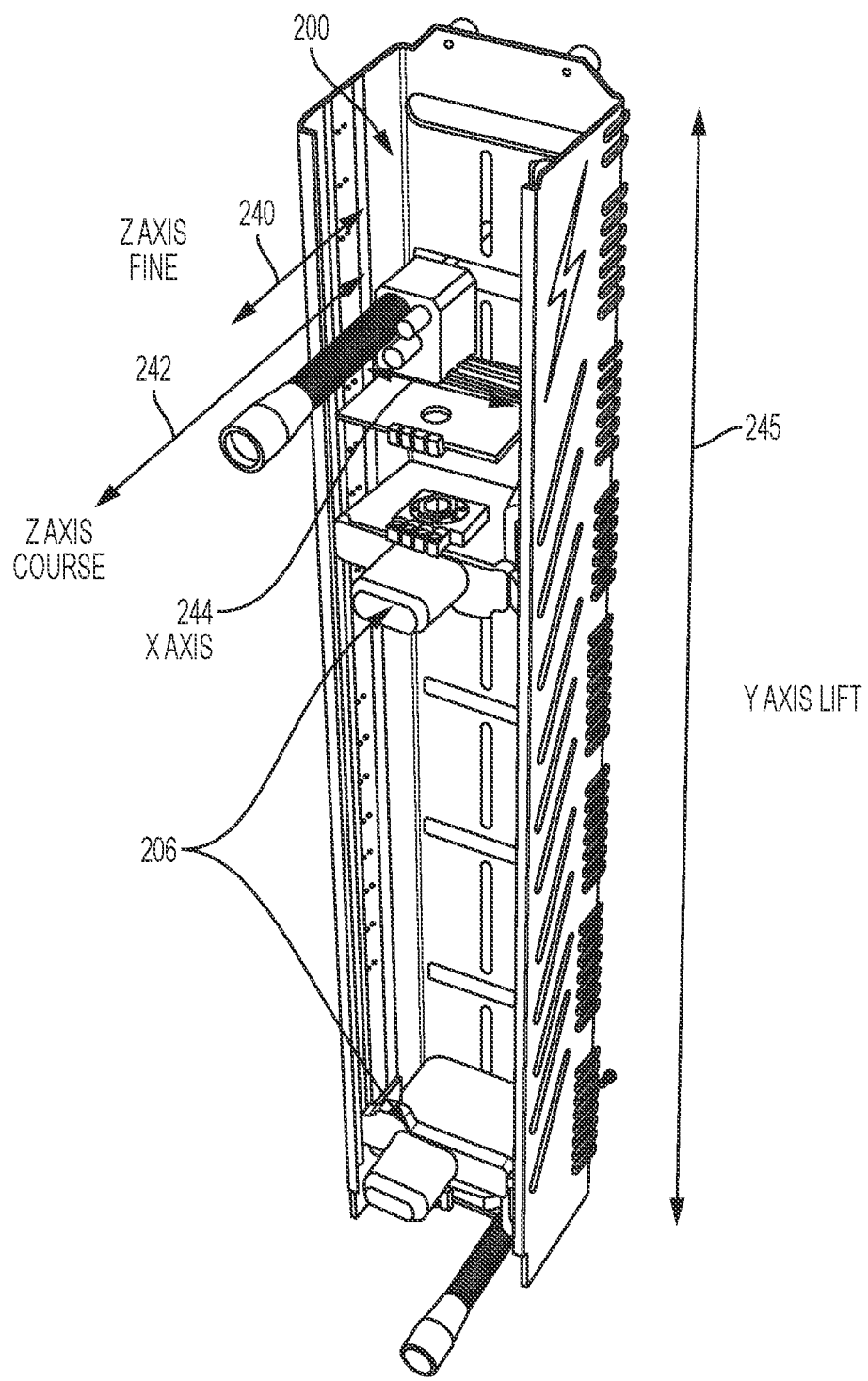
Figure 16:
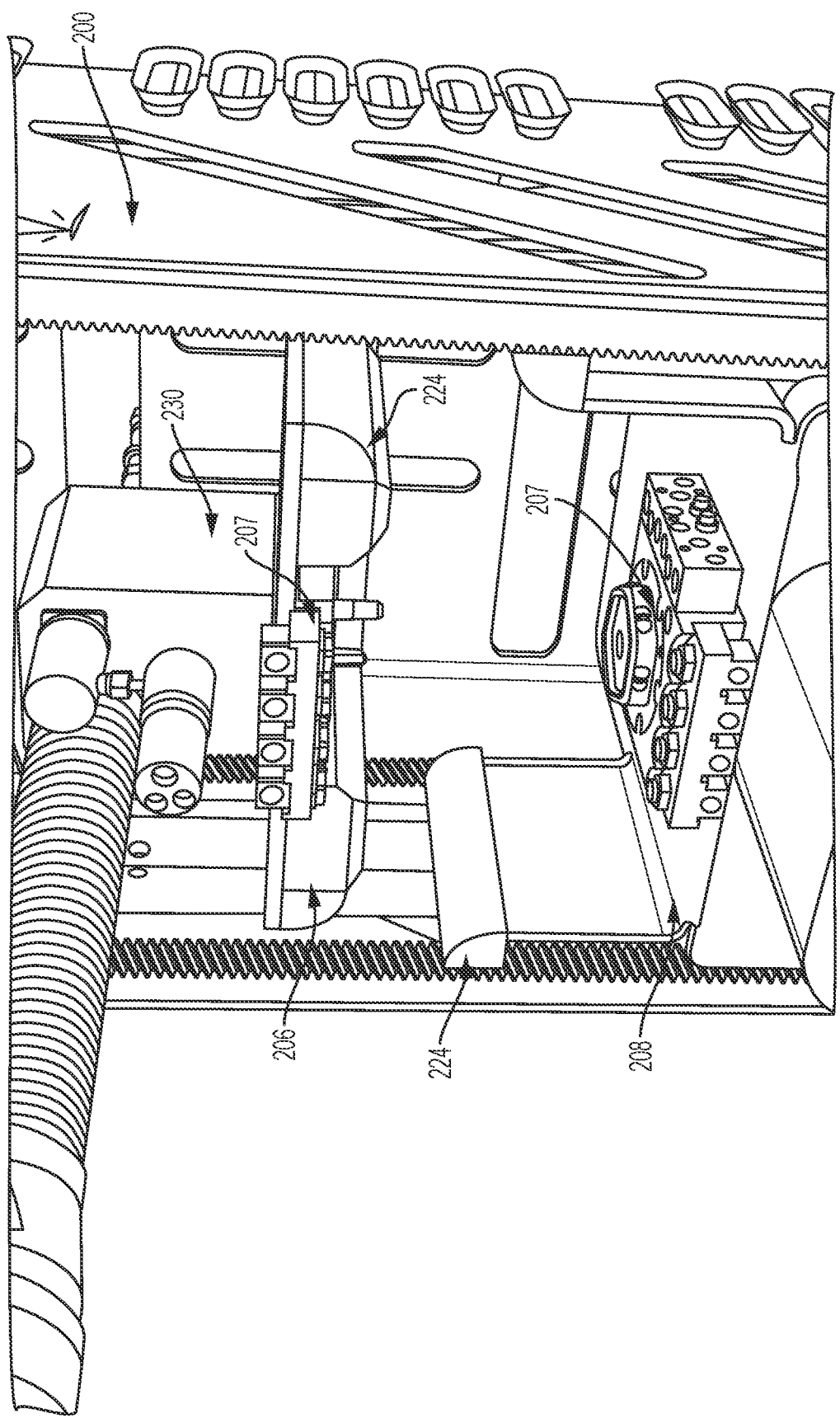
Figure 17:
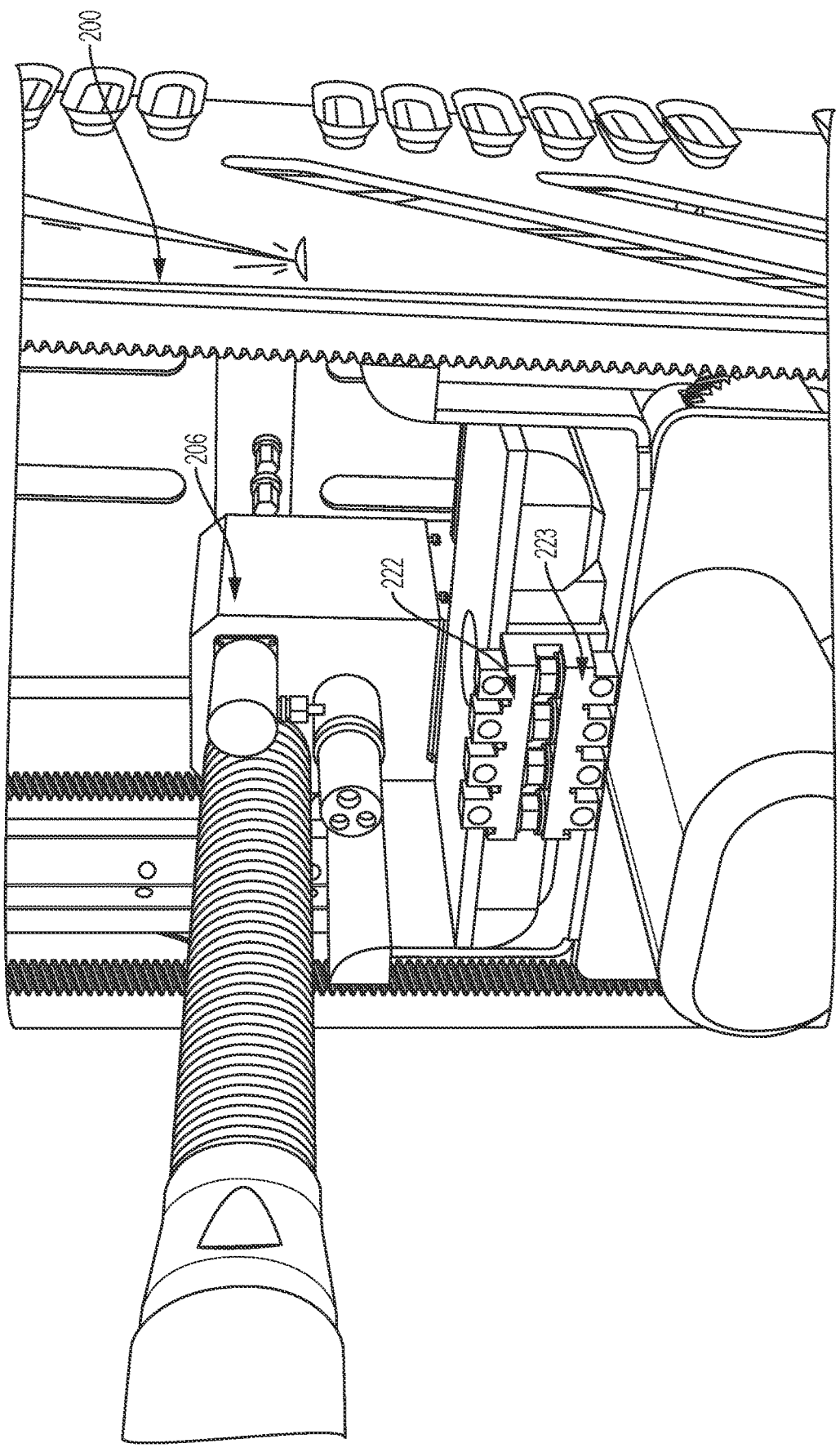
Figure 18:
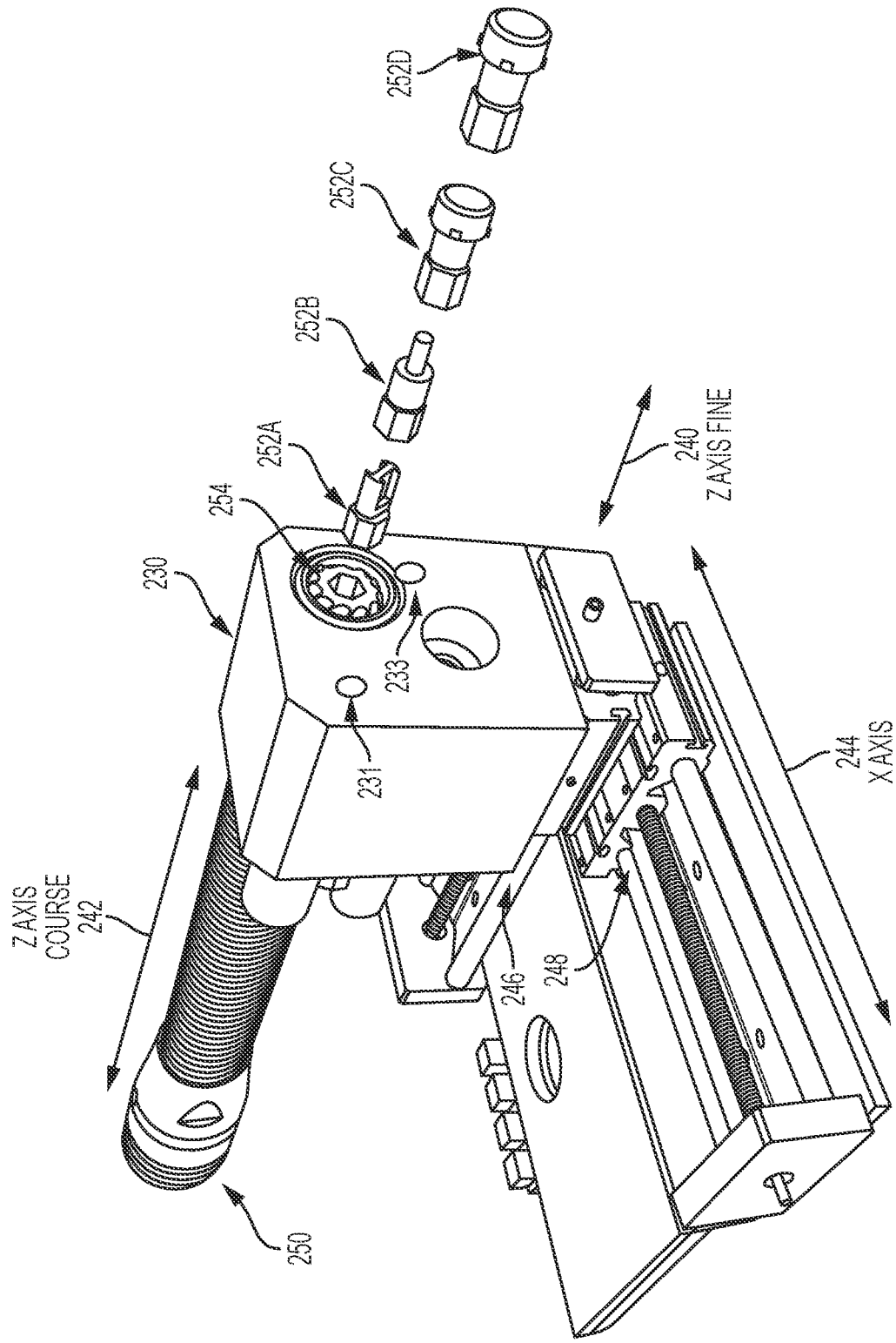
Figure 19:
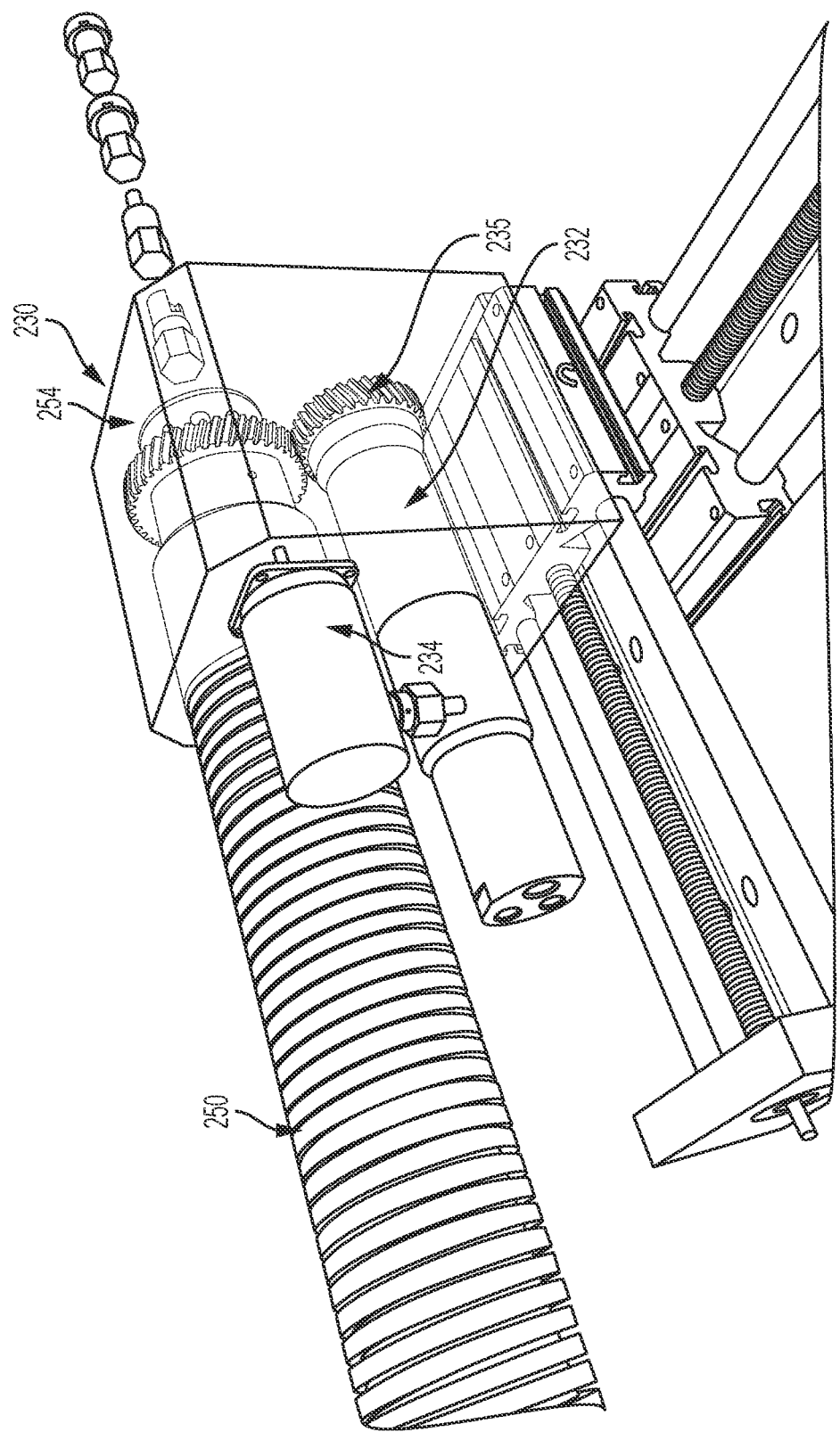
Figure 20:
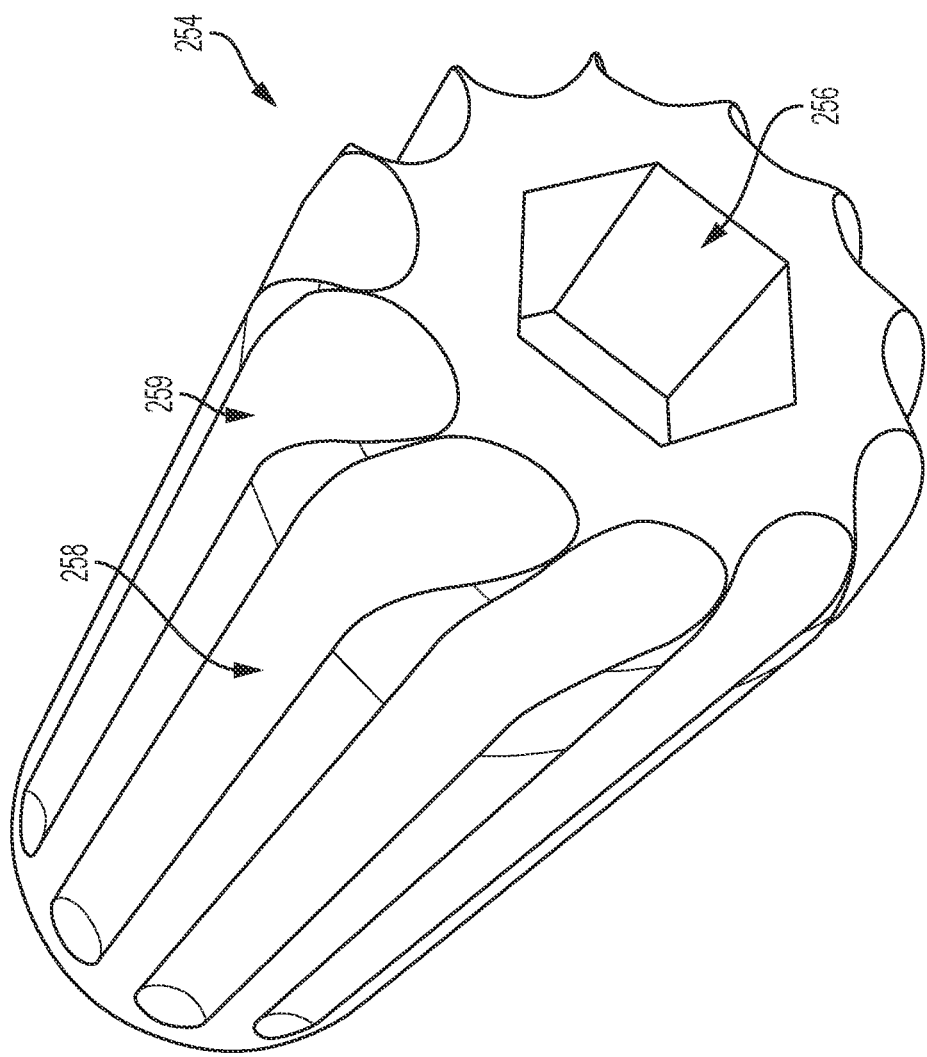
Figure 21:
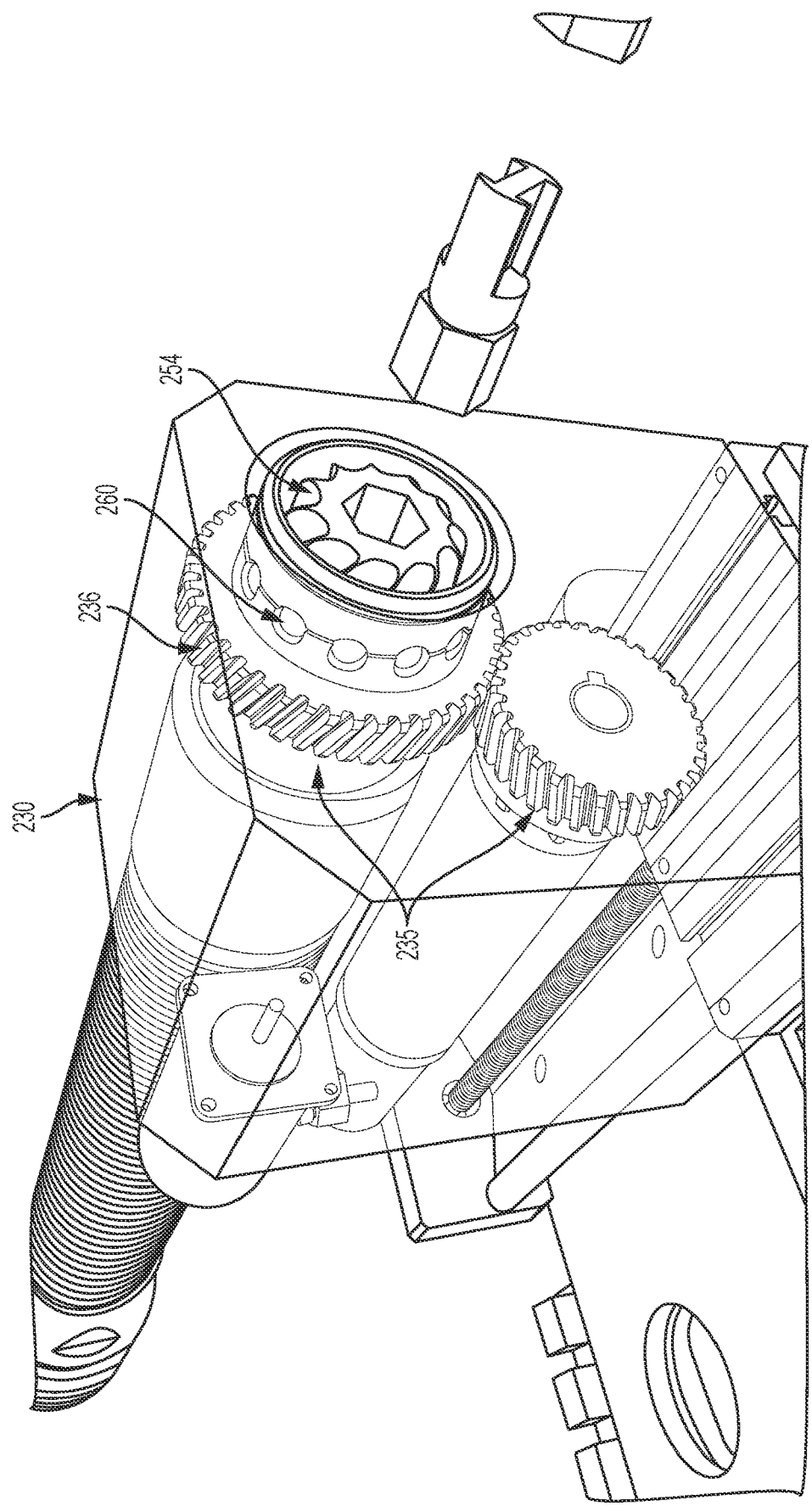
Figure 22:
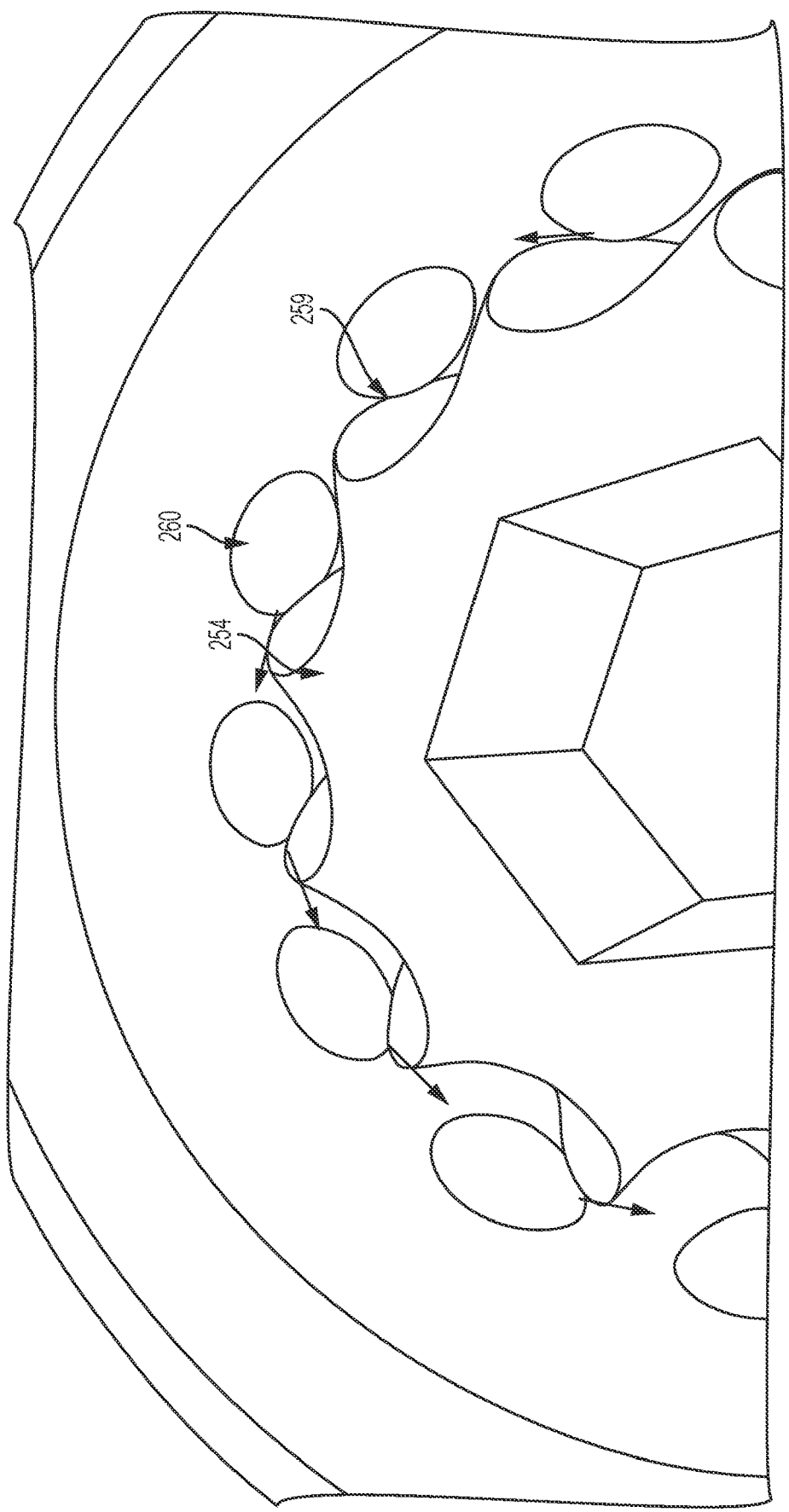
Figure 23:
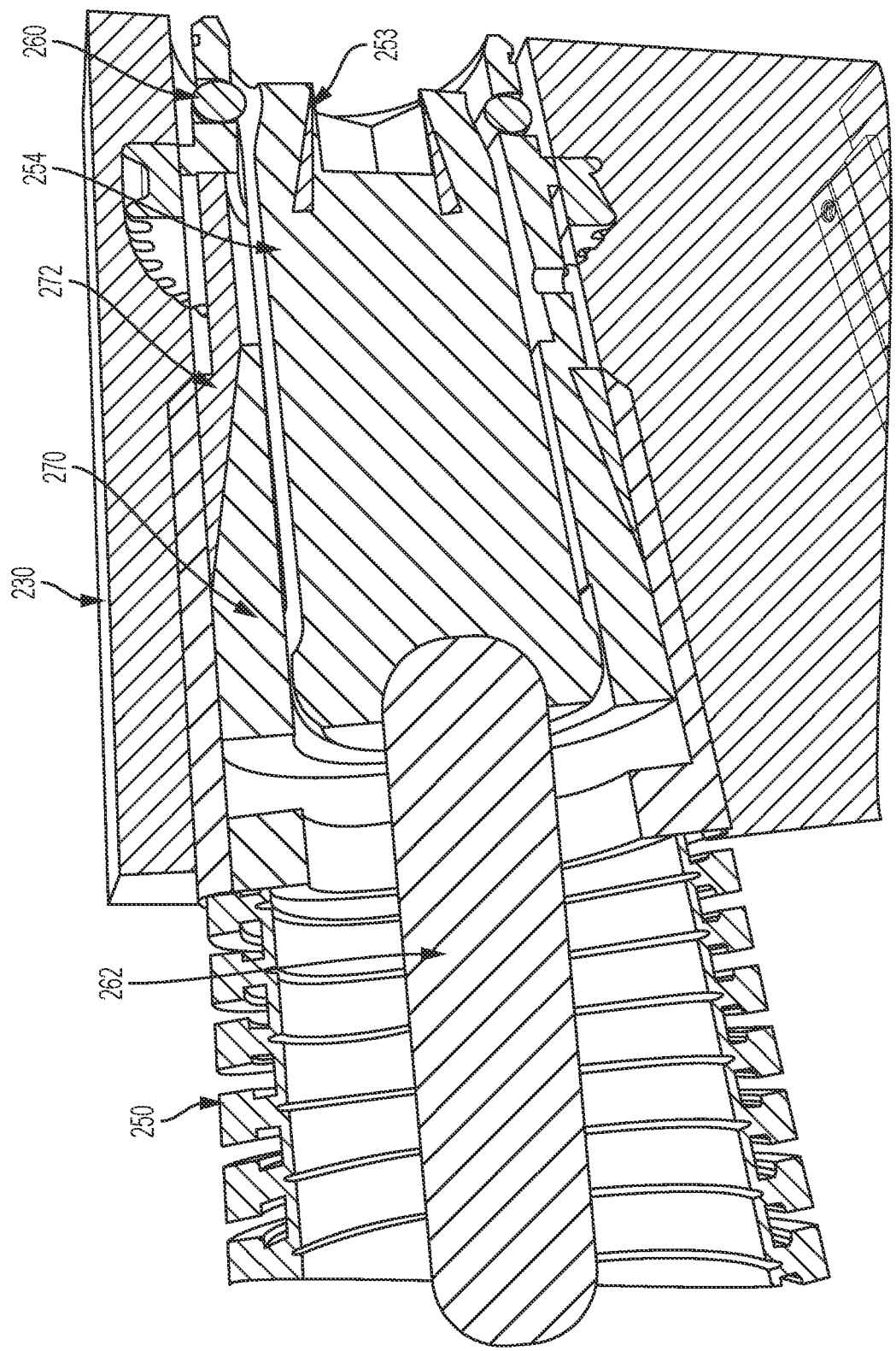
Figure 24:
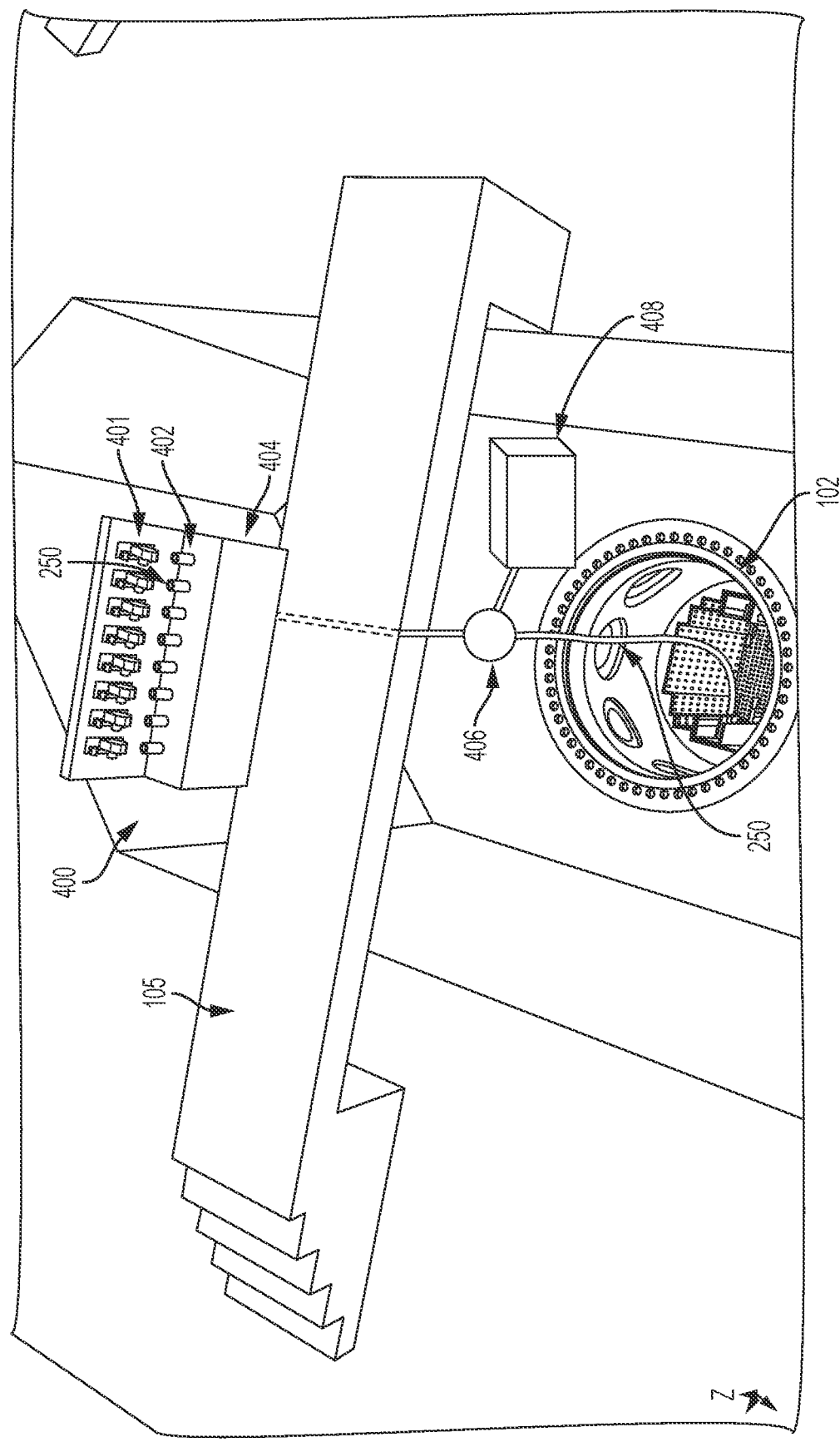
Figure 25:
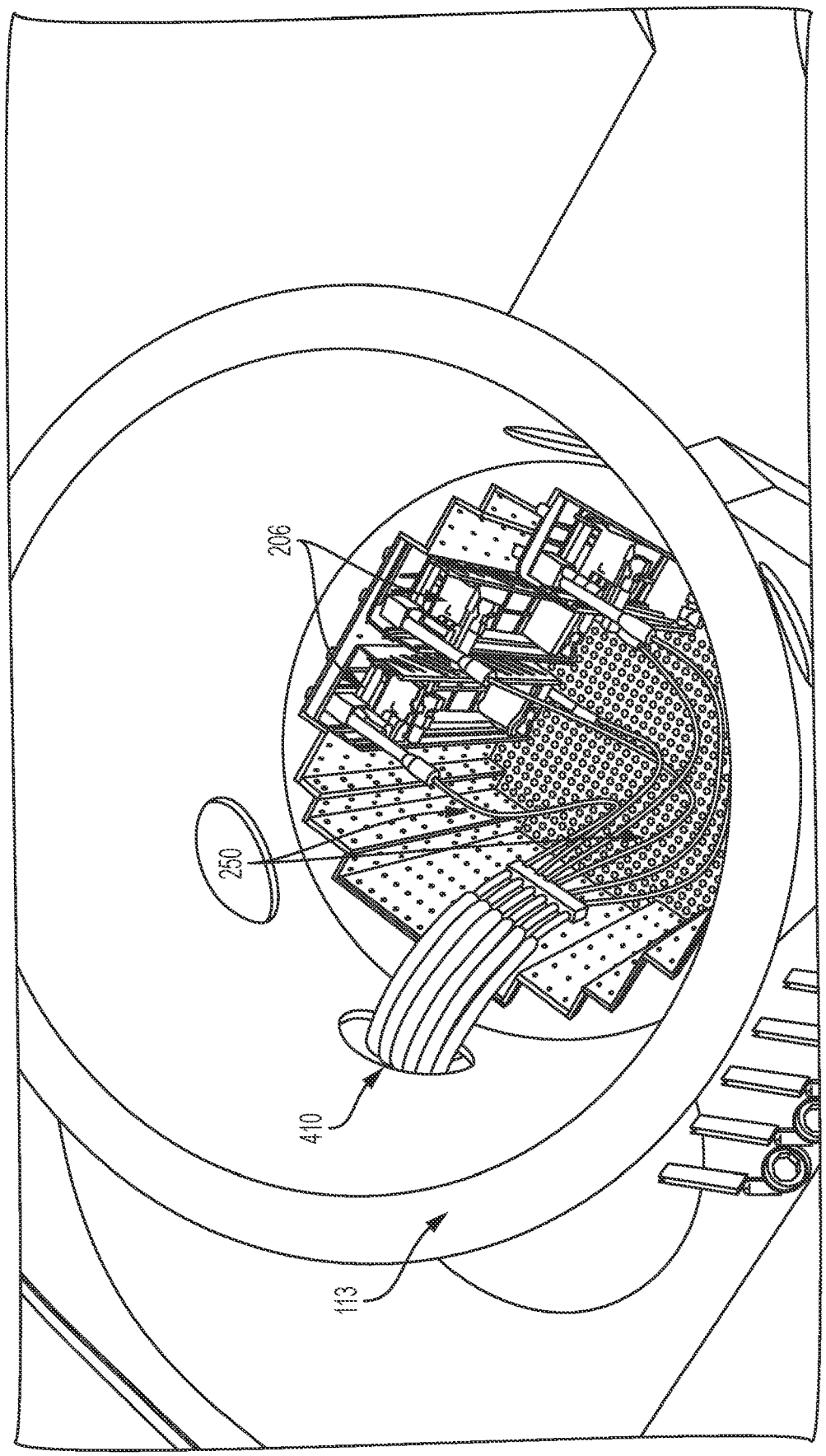
Figure 26:
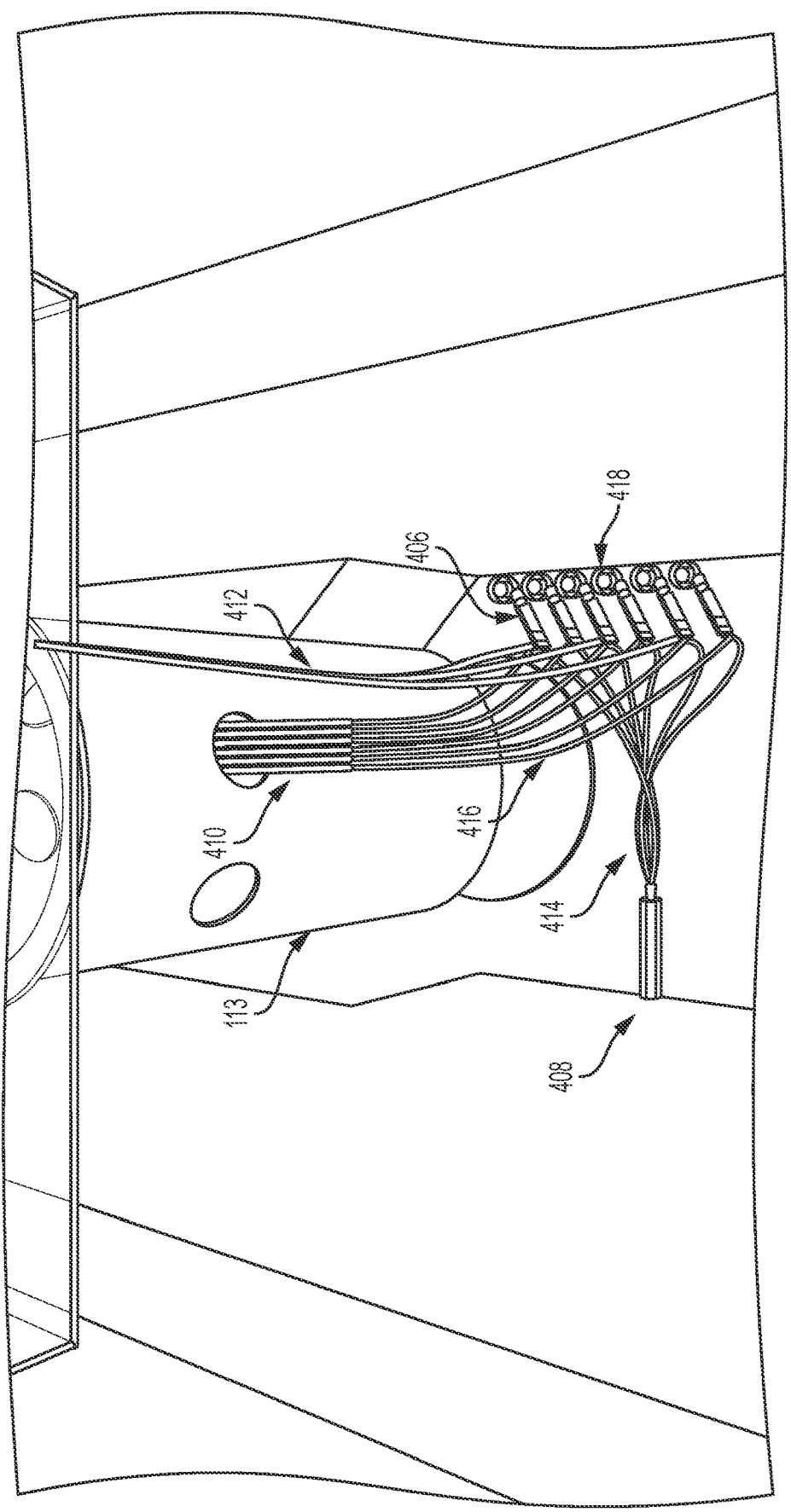
Figure 27:
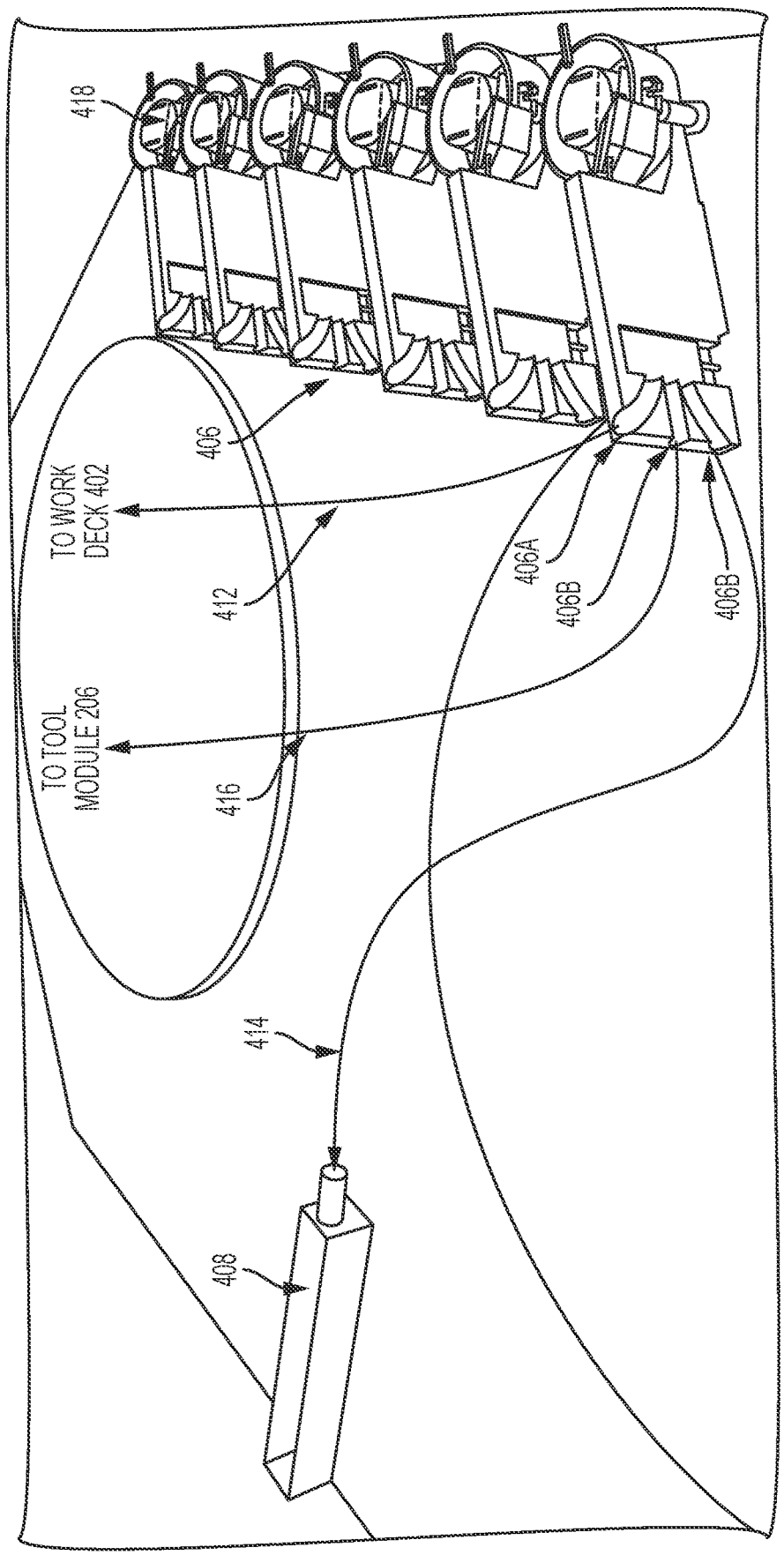
Figure 28:
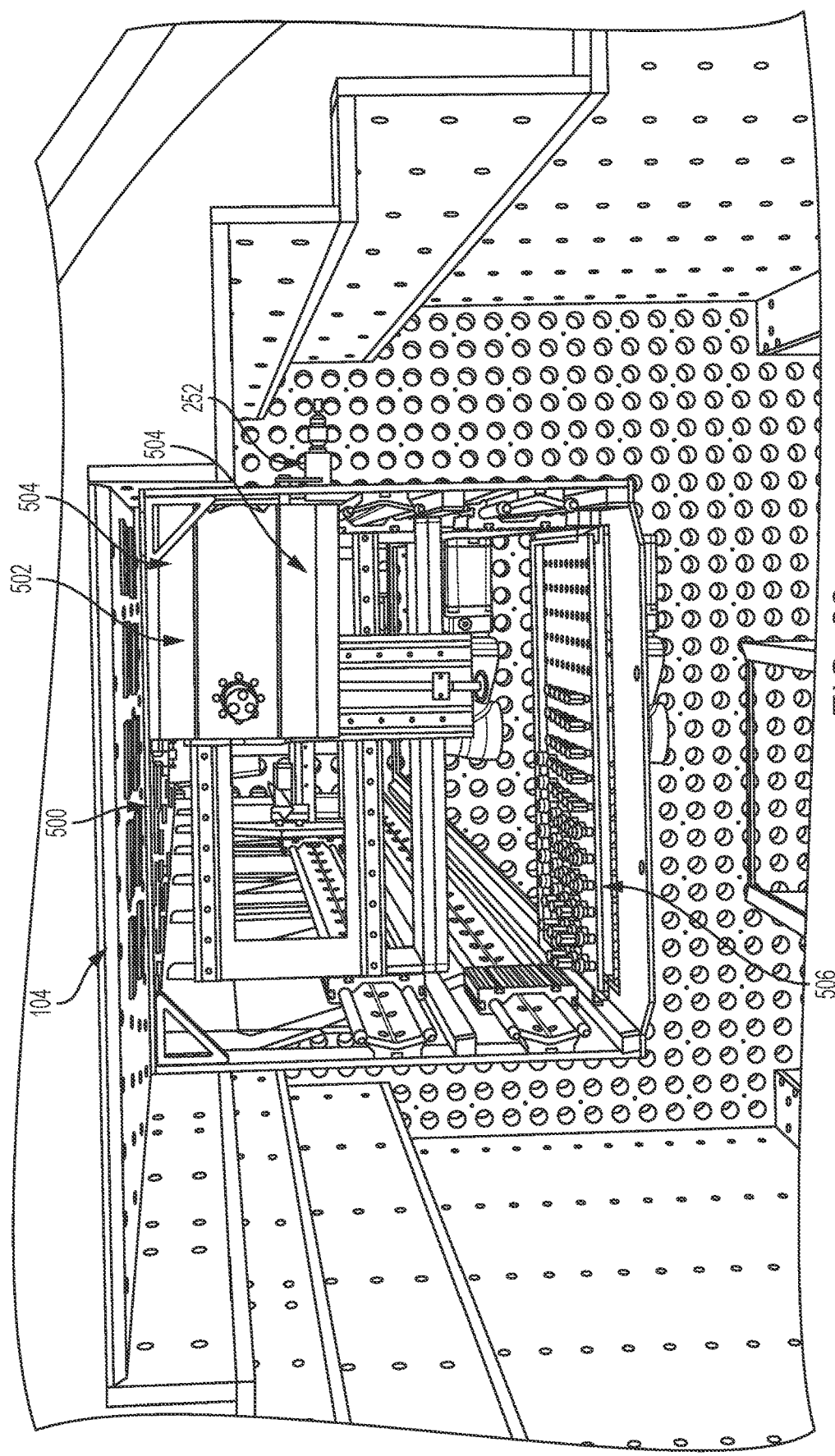
Figure 29:
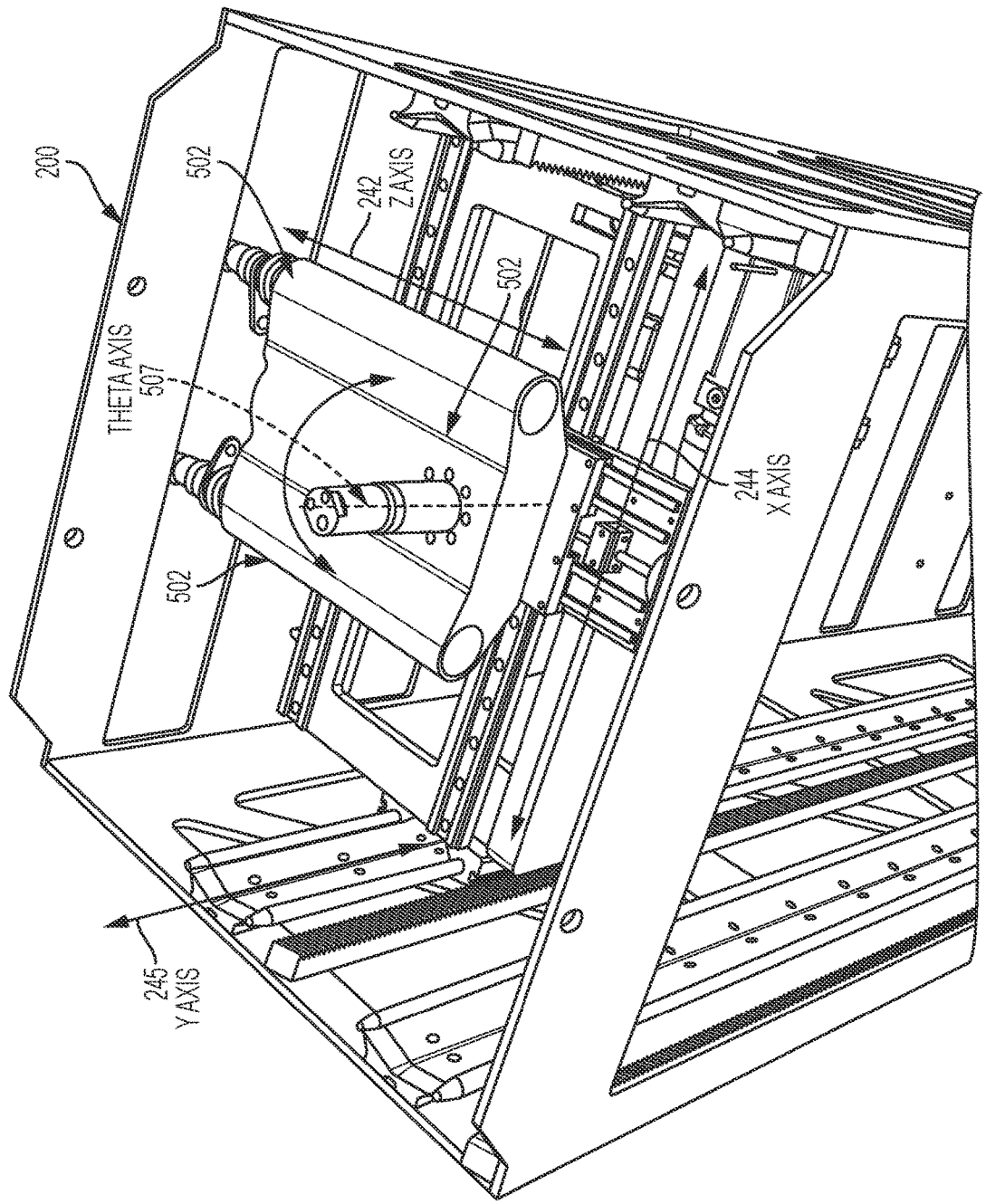
Figure 30:
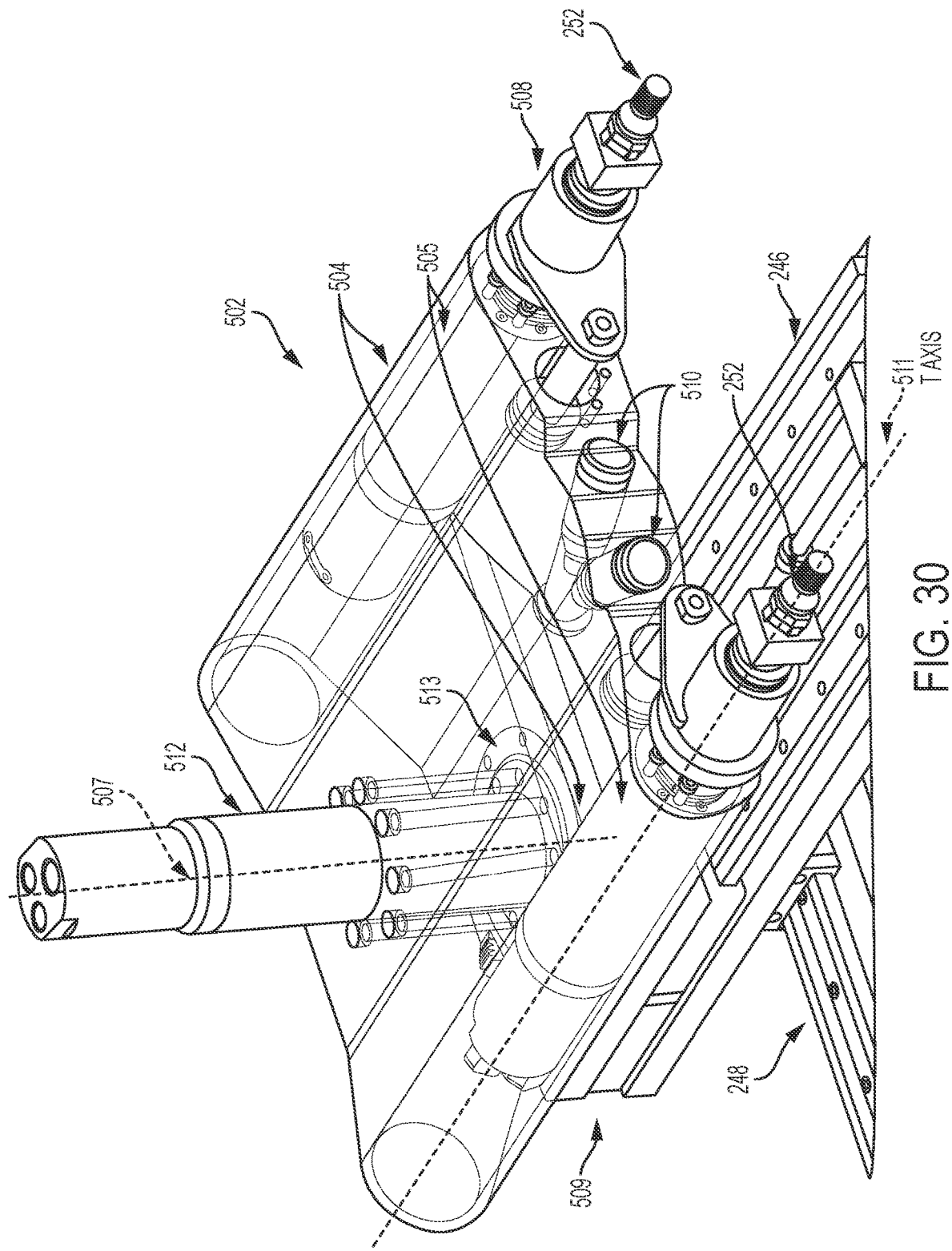
Figure 31:
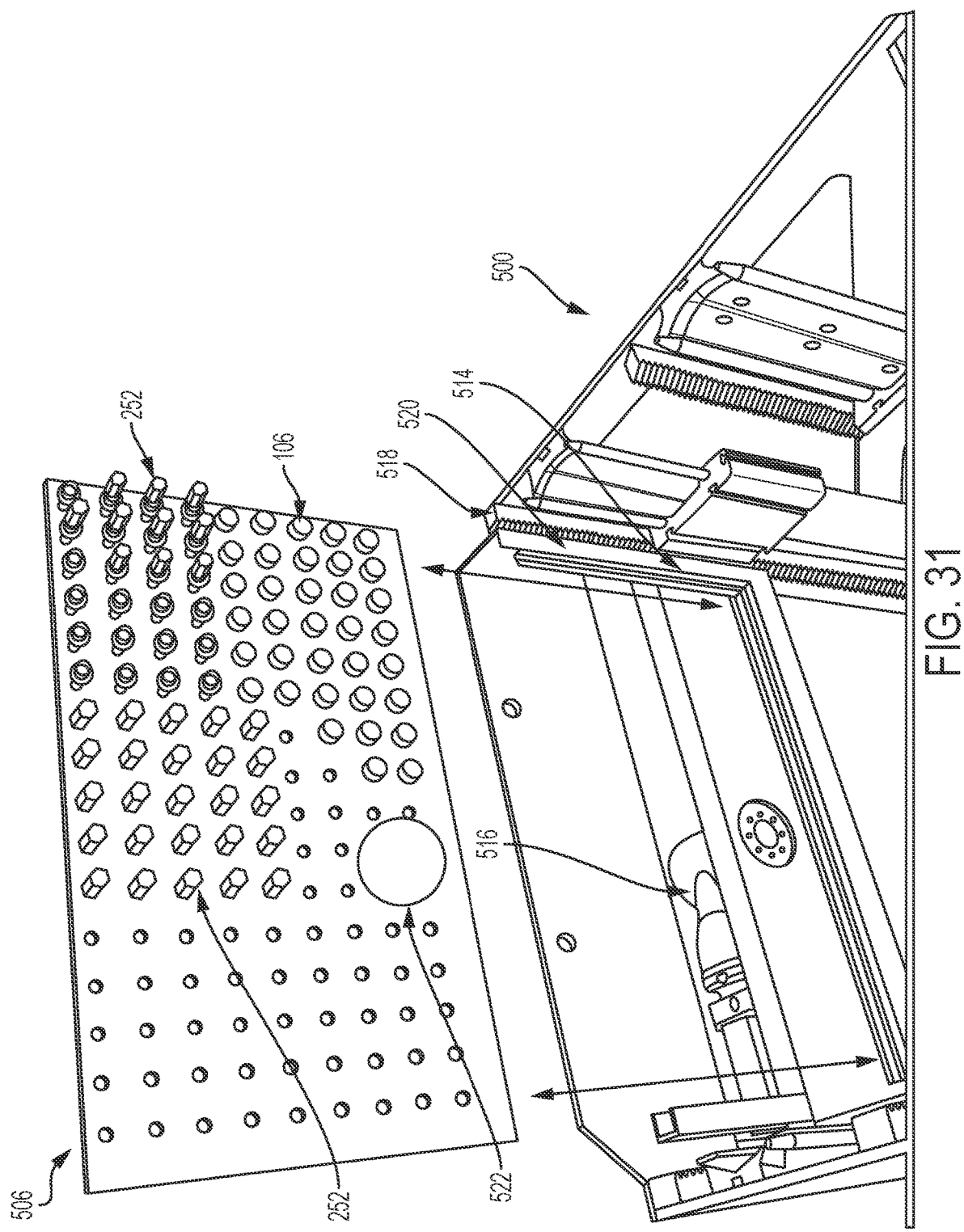

Having thus described the bolt repair platform in general terms, reference will now be made to the accompanying drawings, which are not necessarily drawn to scale, and wherein:

FIG. 1 is a perspective view of a reactor compartment according to an example embodiment;

FIG. 2 is a top down view of the reactor vessel with the core and closure head removed according to the example embodiment;

FIG. 3A is a top down view of a reactor internal support structure including baffle plates according to the example embodiment;

FIG. 3B is a partial perspective and schematic view of reactor internal support structures according to the example embodiment;

FIG. 3C are plan views of installed baffle bolts;

FIG. 3D is a section view of a degraded baffle bolt;

FIG. 3E provides photographic and microscopic views of a degraded baffle bolt;

FIGS. 4 and 5 are perspective views of baffle bolts installed in baffle plates according to the example embodiment;

FIG. 6 is a perspective view of bolt repair platforms installed on baffle plates according to the example embodiment;

FIG. 7 is a perspective view of a bolt repair platform as in FIG. 6;

FIG. 8 is a top down view of a bolt repair platform as in FIG. 6;

FIG. 9 is a perspective view of a bolt repair platform and gear rack as in FIG. 6;

FIG. 10 is a perspective view of a vertical drive assembly for a tool module according to the example embodiment;

FIG. 11 is a perspective view of a bolt repair platform as in FIG. 6 including bolt access apertures;

FIG. 12 is a top view of a bolt repair platform as in FIG. 6 installed on a short baffle plate;

FIG. 13 is a perspective view of a bolt repair platform as in FIG. 6 including bolt access apertures for edge bolts;

FIG. 14 is a perspective view of a bolt repair platform as in FIG. 6 including multiple tool modules;

FIG. 15 is a perspective view of a bolt repair platform as in FIG. 6;

FIG. 16 is a perspective view of an alignment of the tool coupler for a tool module according to the example embodiment;

FIG. 17 is a perspective view of the tool coupler as in FIG. 16 attached to a tool module;

FIGS. 18 and 19 are perspective views of a tool drive assembly of a tool module according to the example embodiment;

FIG. 20 is a perspective view of an example spline drive for use in the tool drive assembly of FIGS. 18 and 19;

FIGS. 21 and 22 are perspective views of an example engagement coupling for use in the tool assembly of FIGS. 18 and 19;

FIG. 23 is a sectional view of the tool drive assembly as in FIGS. 18 and 19, illustrating an example spline position lockout; and FIG. 24 is a perspective view of an example operating station according to the example embodiment;

FIGS. 25-27 are perspective views of an example tool conduit management system according to an example embodiment;

FIGS. 28-29 are perspective views of a baffle bolt repair platform with a rotatable tool module according to an example embodiment;

FIG. 30 is a perspective view of the tool module including internal components according to the embodiment of FIGS. 28-29;

FIG. 31 is a partial perspective exploded view of the tool changer rack according to the embodiment of FIGS. 28-29.

Figure 37:
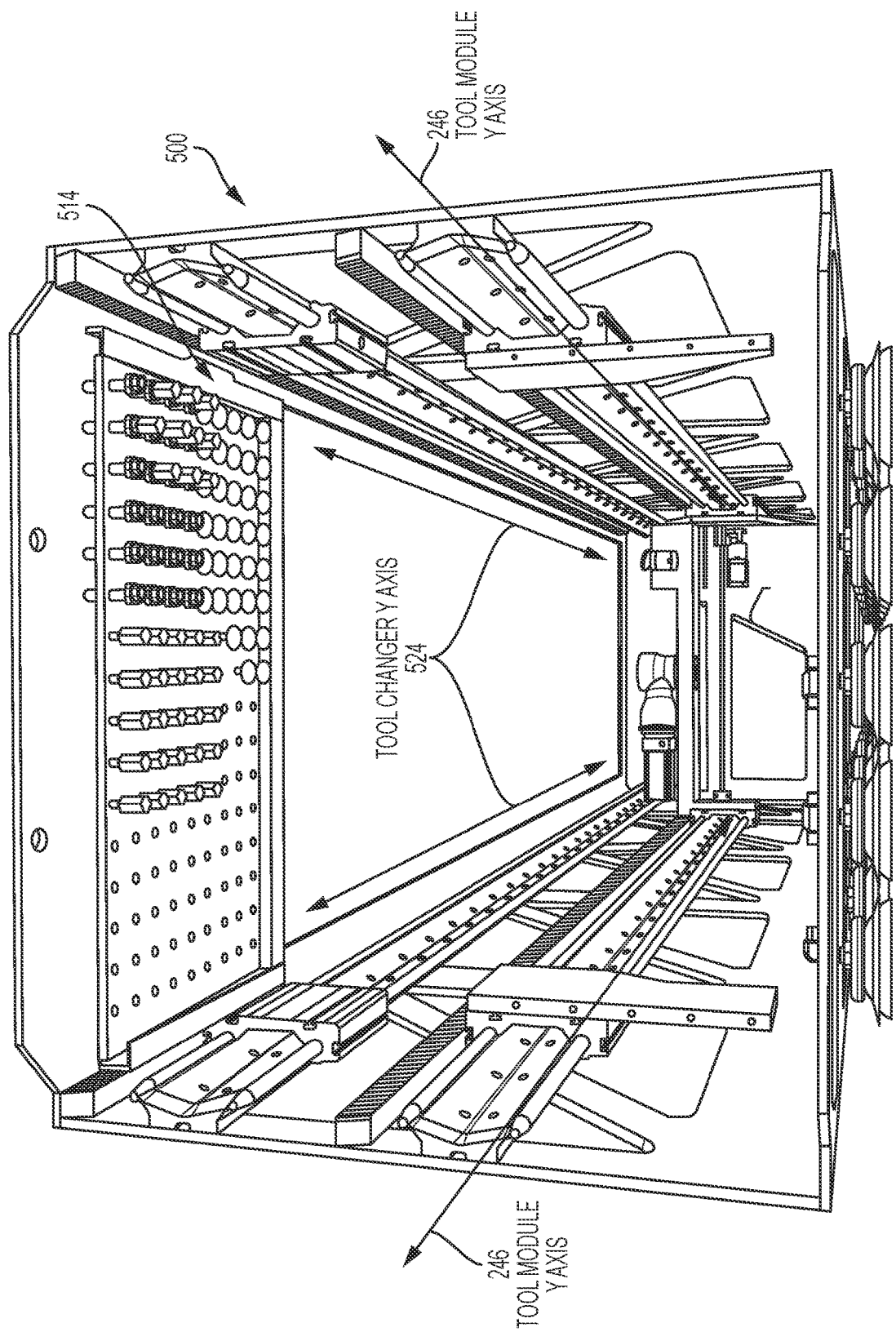
Figure 38B:
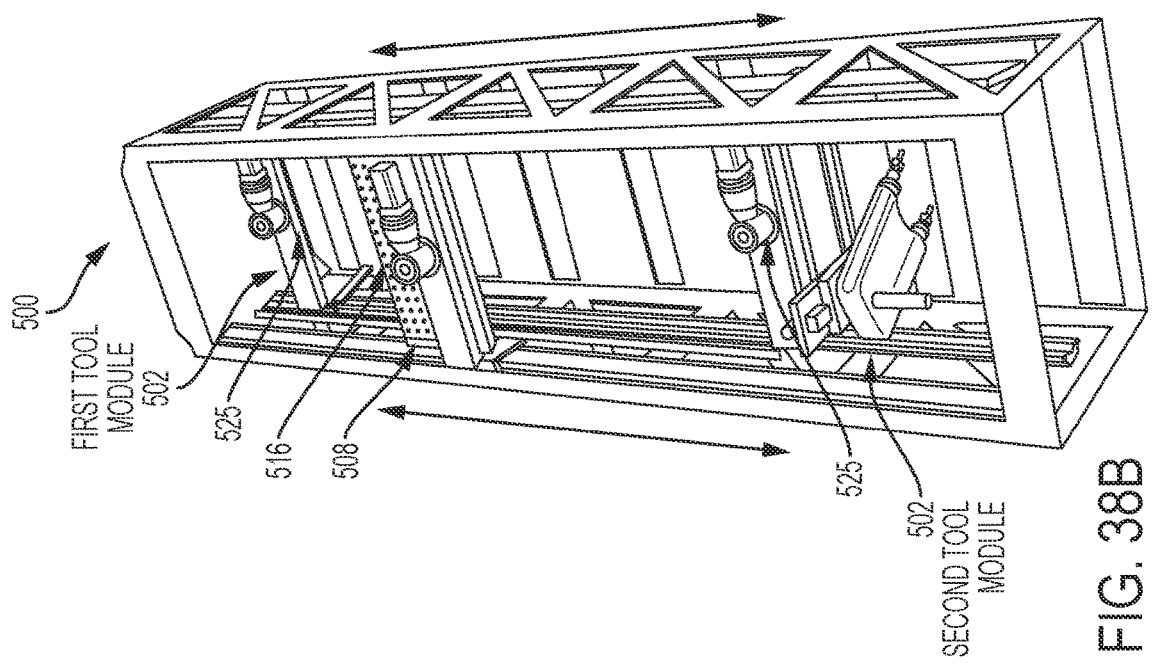
Figure 38A:
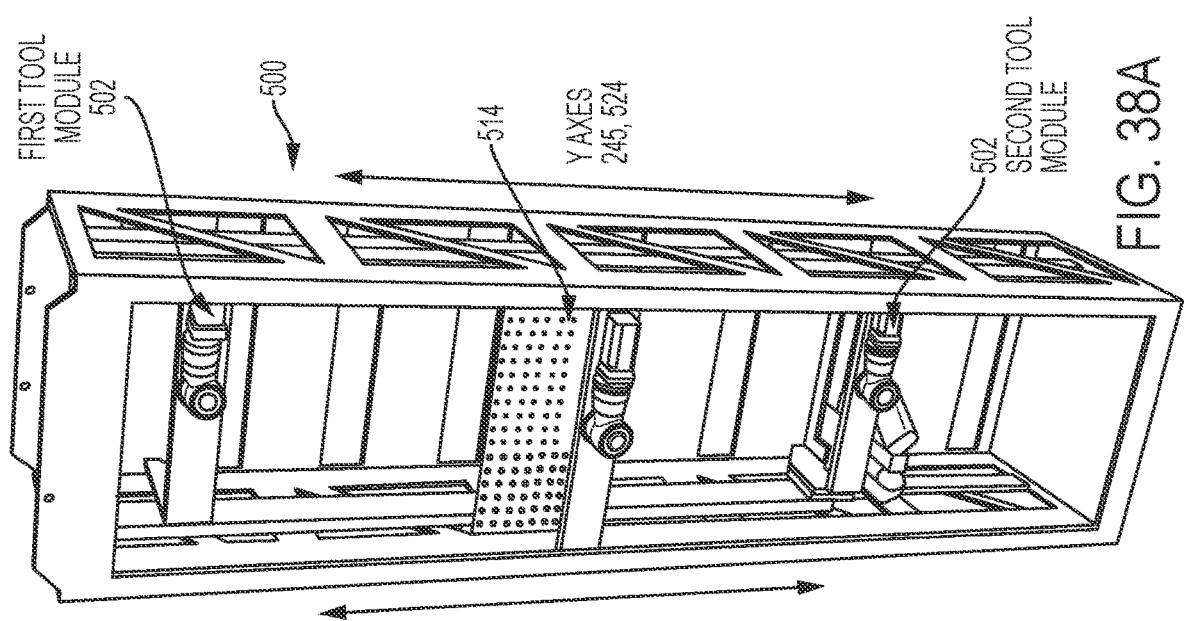
Figure 39B:
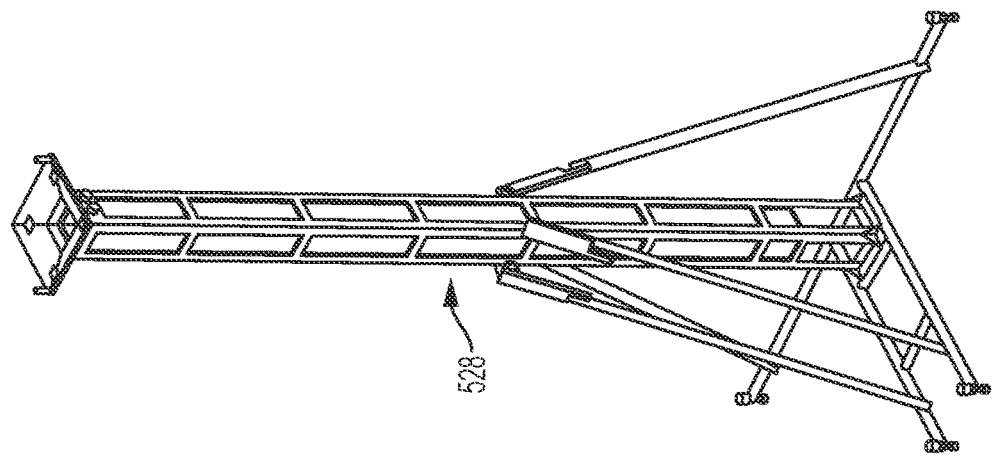
Figure 39A:
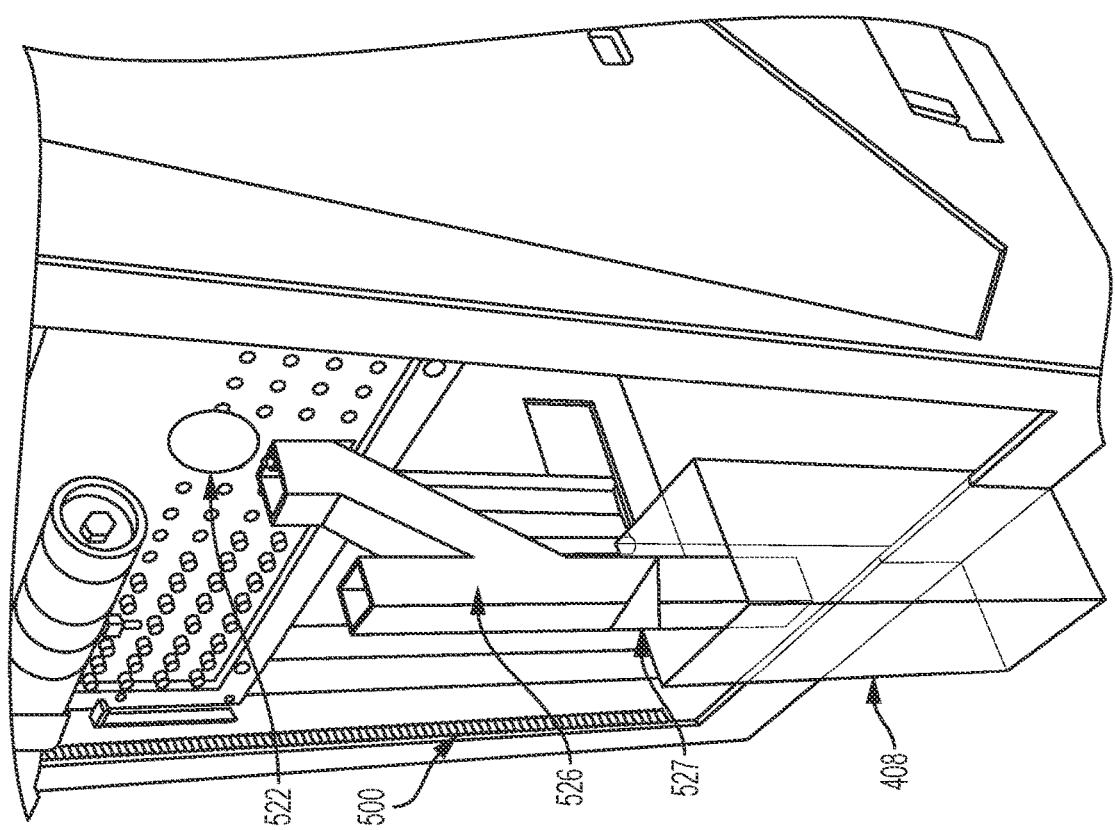
Figure 41:
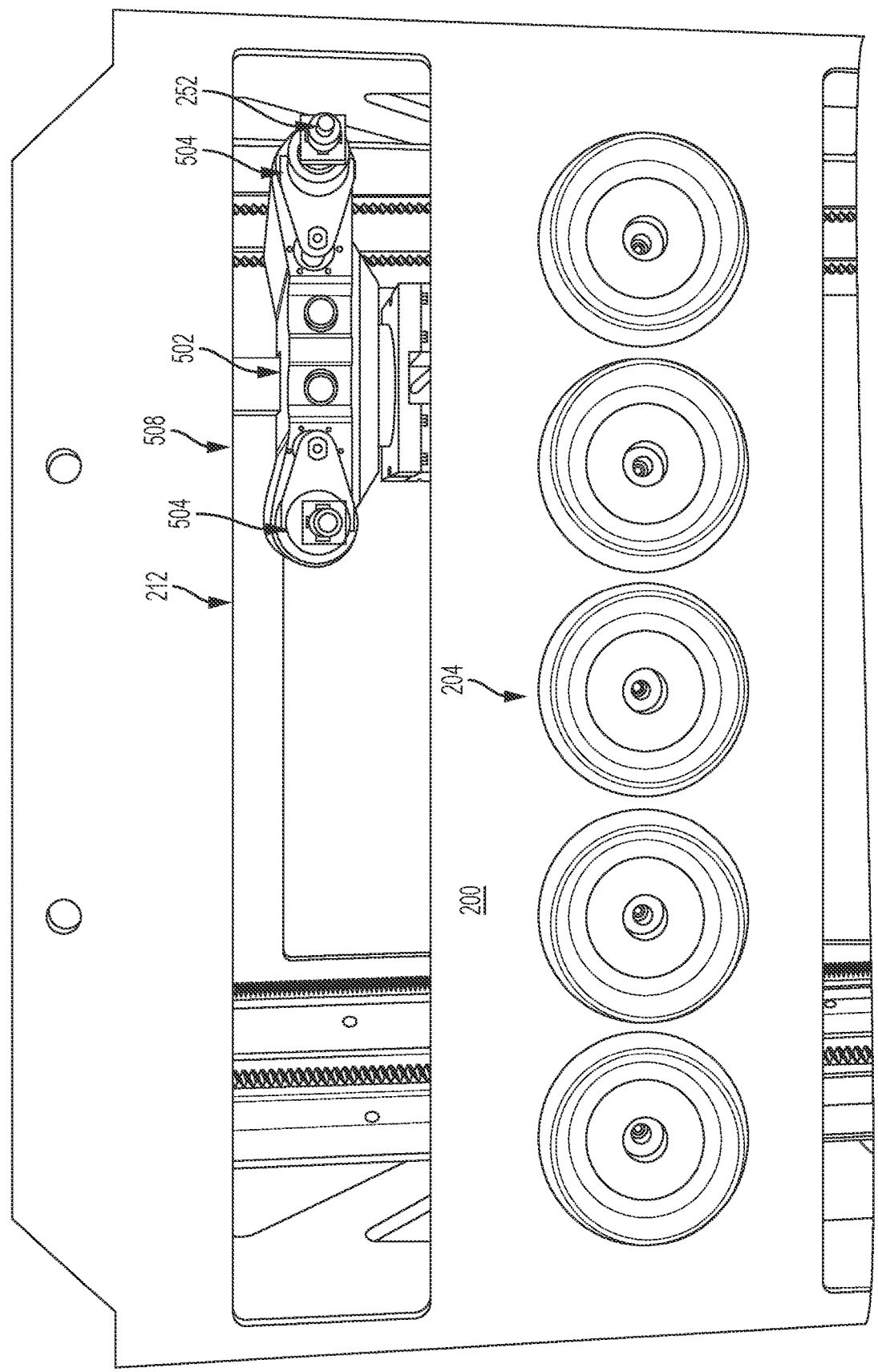
Figure 46:
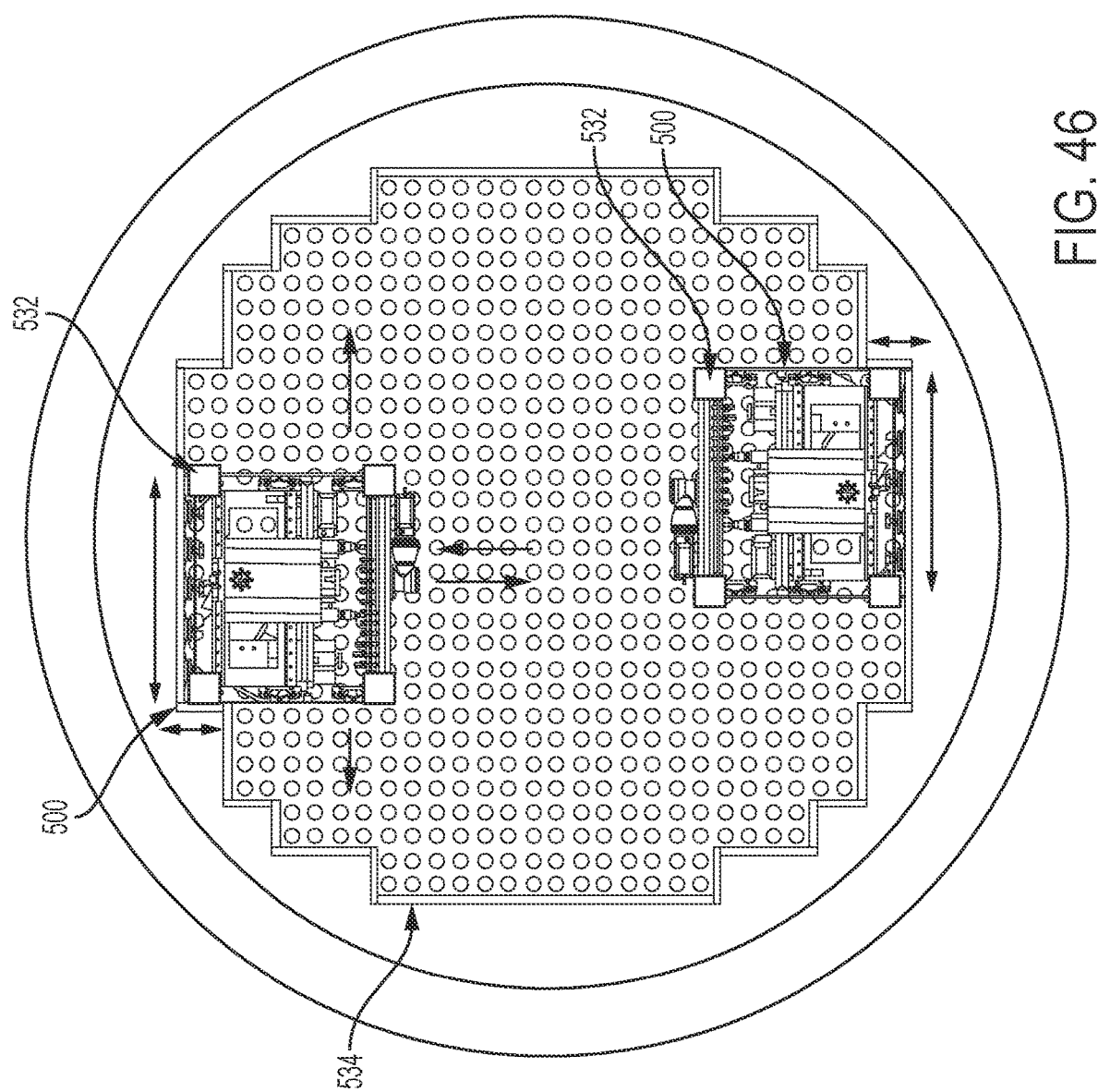
Figure 47:
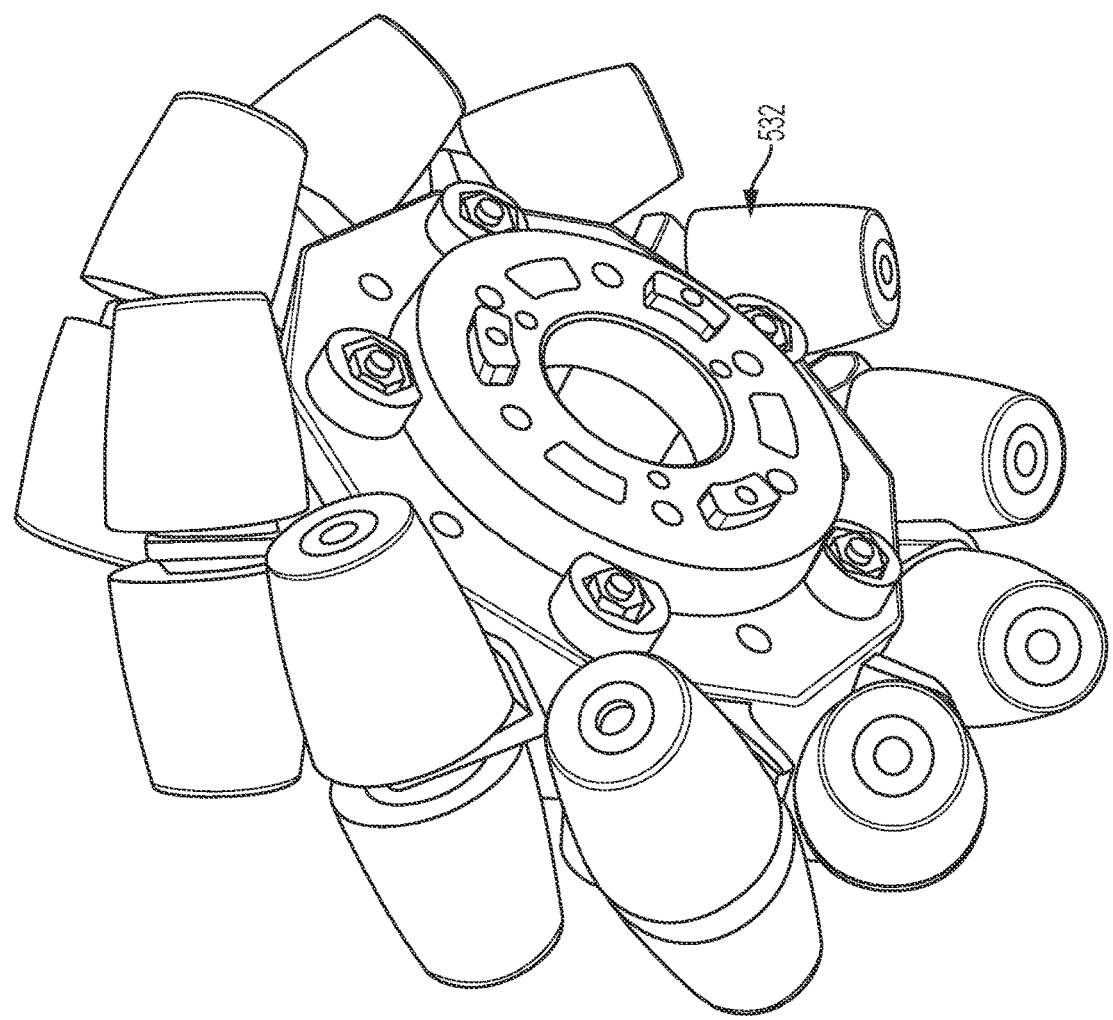
Figure 48:
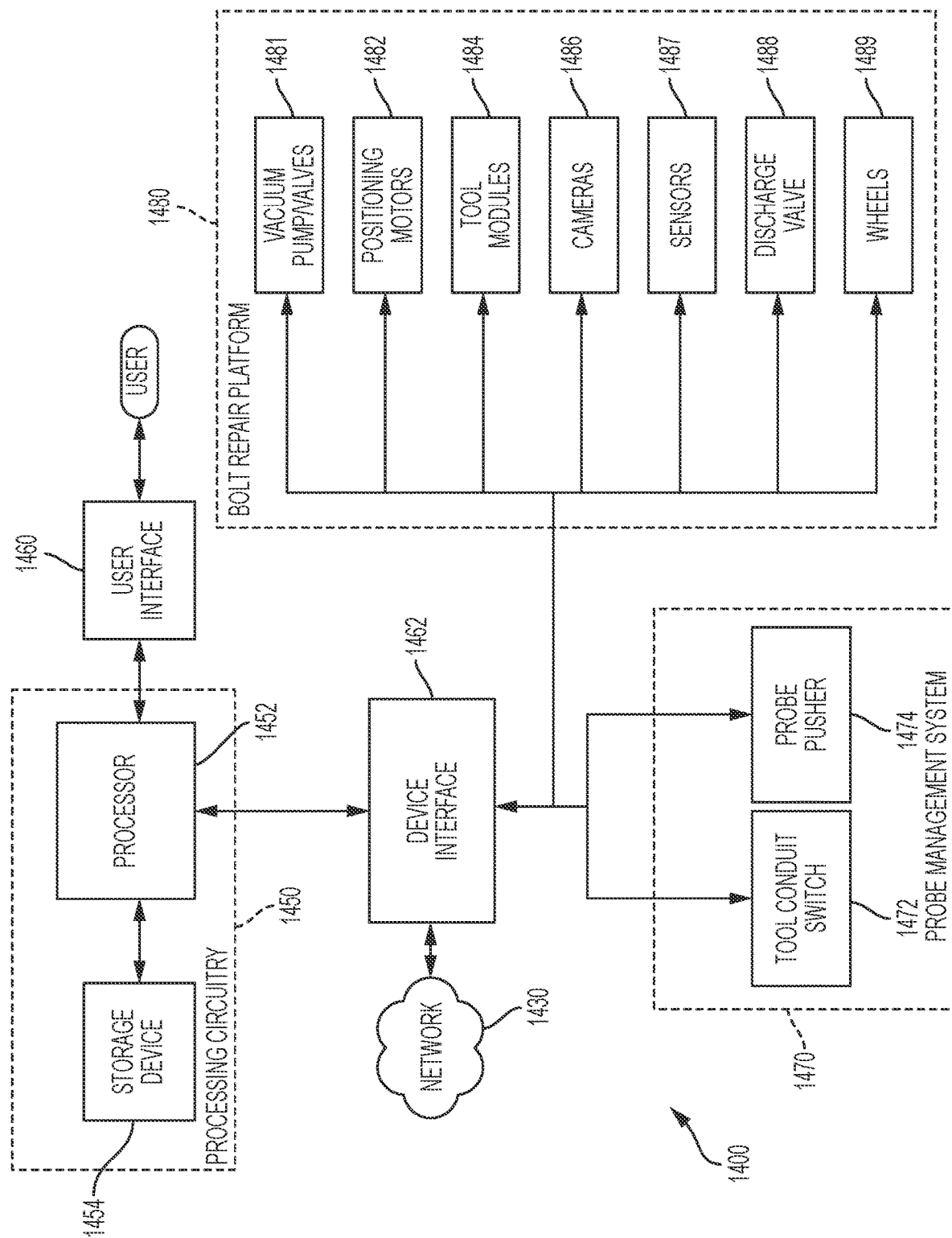

FIGS. 32-36 are perspective views of the system of FIGS. 28-29 during a tool install and change process;

FIG. 37 is a perspective view of the system of FIGS. 28-29 during movement of the tool module and tool changer rack;

FIGS. 38A and 38B illustrate perspective views of an example baffle bolt repair platform of the system of FIGS. 28-29 including multiple tool modules and a tool changer rack;

FIG. 39A is a perspective view of a an example baffle bolt chute and spent bolt container within the system of FIGS. 28-29;

FIG. 39B is a perspective view of a fuel waste storage container within the system of FIGS. 28-29;

FIG. 40 is a perspective view of an example baffle bolt insertion tool for use with the system of FIGS. 28-29;

FIG. 41 is a side view of the tool module, through a bolt access aperture of the system of FIGS. 28-29;

FIG. 42-45 are perspective views of a tool module of the system of FIGS. 28-29 working various baffle plates;

FIG. 46 is a top view of a baffle bolt repair platform of the system of FIGS. 28-29 including a plurality of wheels;

FIG. 47 is a perspective view of an example mecanum wheel for use with the system of FIGS. 28-29; and FIG. 48 is a schematic view of a control system configured for operation of the baffle bolt repair platform of the system of FIGS. 6-23 or the system of FIGS. 28-47.

Repeat use of reference characters in the present specification and drawings is intended to represent same or analogous features or elements of the invention according to the present disclosure.

DESCRIPTION OF THE PREFERRED EMBODIMENTS

Some example embodiments now will be described more fully hereinafter with reference to the accompanying drawings, in which some, but not all, example embodiments are shown. Indeed, the examples described and pictured herein should not be construed as being limiting as to the scope, applicability or configuration of the present disclosure. It will be apparent to those skilled in the art that modifications and variations can be made in such example embodiments without departing from the scope or spirit thereof. For instance, features illustrated or described in one embodiment may be used on another embodiment to yield a still further embodiment. Thus, it is intended that the present invention covers such modifications and variations as come within the scope of the appended claims, their equivalents, and the present disclosure. Like reference numerals refer to like elements throughout.

As used herein, terms referring to a direction or a position relative to the orientation of the core baffle and related apparatus, such as but not limited to "vertical," "horizontal," "upper," "lower," "above," or "below," refer to directions and relative positions with respect to the apparatus's orientation in its normal intended operation, as indicated in the FIGS. herein. Thus, for instance, the terms "vertical" and "upper" refer to the vertical direction and relative upper position in the perspectives of the figures and should be understood in that context, even with respect to an apparatus that may be disposed in a different orientation.

Further, the terms "or" or "one of," as used in this application and the appended claims, are intended to refer to an inclusive "or" rather than an exclusive "or." That is, unless specified otherwise, or clear from the context, the phrases "X employs A or B" or "X employs one of A and B"

are intended to mean any of the natural inclusive permutations. That is, each phrase is satisfied by any of the following instances: X employs A; X employs B; or X employs both A and B, and this is true regardless of the use of the phrase "at least one" before "A or B" or "A and B" otherwise in the specification and/or claims. In addition, the articles "a" and "an" as used in this application and the appended claims should generally be understood to mean "one or more" unless specified otherwise or clear from the context to be directed to a singular form. Throughout the specification and claims, the following terms take at least the meanings explicitly associated therein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment" or other similar phrase, as used herein, does not necessarily refer to the same embodiment, although it may.

A bolt repair platform system is provided to increase the rate at which baffle bolts can be repaired. The bolt repair platform may increase the number of work cells, e. g. tool modules that operate simultaneously, thereby increasing removal and replacement rates to, for example, approximately forty-fifty bolts per day. The bolt repair platform may be a frame configured such that, for example, four or five independent sub-frames, e. g. work platforms, each with integrated tool modules, may be deployed simultaneously in the work environment, e. g. a nuclear reactor internal structure. In some example embodiments, each individual work platform may have two or more active tool modules. The independent work platforms may simultaneously and independently work on respective reactor baffle plate surfaces, allowing the bolt repair platforms to work approximately eight-ten bolts at the same time. Further, multiplication of work cells may allow the bolt repair platform to remove bolts more easily and may reduce the impact of difficult bolts at a single cell in reducing overall production.

FIG. 1 is a perspective view of a reactor compartment 100 according to an example embodiment. Reactor compartment 100 includes a reactor vessel 102 and four steam generators 103. In the depicted example, the reactor core and closure head have been removed from reactor vessel 102 for purposes of illustration. Additionally, the reactor internal structures, e. g. support structures, including a core barrel and its baffle plates 104, have been removed from reactor vessel 102 and placed on a stand outside the reactor vessel for inspection and repair. In some example embodiments, a maintenance bridge 105 may be installed over reactor vessel 102 or the stand to allow for movement of equipment in and out of reactor vessel 102 or internal structures disposed outside the reactor vessel. The internal structures may be submerged in water in reactor vessel 102, or in a pool including the stand, for radiation shielding. The replacement of baffle bolts, described below, may occur beneath the water line, and components of the bolt replacement platform, described below, may be waterproof and/or radiation hardened.

FIG. 2 is a top down view of reactor vessel 102, with the reactor core and closure head removed, according to an example embodiment. The internal structures, including baffle plates 104, are positioned within reactor vessel 102. FIG. 3A illustrates a top down view of baffle plates 104 according to an example embodiment. Baffle plates 104 may support and/or orient reactor fuel and may direct coolant through a reactor core in the vertical direction. As should be understood, the reactor fuel assemblies are defined by one or more rectangular shapes, and baffle plates 104 are therefore arranged to define internal rectangular boundaries to retain such assemblies. Also, when cooling water is injected into reactor vessel 102 (FIGS. 1 and 2) from outside the baffle plates to the core, the baffle plates prevent the initially cold water from direct contact with the core, instead forcing the water up or down. As the water moves vertically, heat from the core indirectly warms the water, so that when the water reaches the top or bottom of the baffle, from which the water may then reach the core, the water is at a more preferred, warmer, temperature, as should be understood. As indicated in FIG. 3A, a perforated floor at the bottom end of the baffle plates may allow ingress of the warmer, diverted water from below in an up-flow configuration. Accordingly, baffle plates 104 laterally restrain the core and direct coolant flow through the core. Baffle plates 104 of various sizes and defining various internal shapes may surround the outer rim of the reactor fuel assemblies, depending on the size and shapes of the reactor fuel assemblies.

FIG. 3B illustrates the internal structures, e. g. reactor internal support structures, according to an example embodiment. Vertical baffle plates 104 are bolted to edges of former plates 108, which are, in turn, bolted to the inside surface of a core barrel 110. There may, typically, be several levels of former plates 108 located at various elevations within core barrel 110. Baffle-former bolts, e. g. baffle bolts 106, may secure baffle plates 104 to former plates 108. Former plates 108 may transition the generally linear or blocked shape of baffle plates 104 to the generally curved internal diameter shape of core barrel 110. Baffle bolts 106 may have multiple embodiments, depending on the internal structures being joined or bolted. For example, baffle bolts 106 may include baffle bolt edge bolts 106A, which may be a first length and configured to join an edge of a first baffle plate 104 to an edge of a second baffle plate 104. Baffle bolts 106 may also include a baffle plate-to-former plate bolt 106B, which may be a second length, longer than the first length, and configured to bolt a baffle plate 104 to a former plate 108. Baffle bolts may additionally include corner edge bracket baffle plate-to-former plate bolts 106C, which may be a third length, shorter than the first length, and configured to bolt a corner edge baffle plate 104 to a former plate 108.

FIG. 3C illustrates example baffle bolts 106 installed in baffle plate 104. Baffle bolt 106 may have a hex head, which may have a female or male configuration. The baffle bolt may be restrained in a bolted position by a lock tab 109, e. g. a metal bar, which passes through a grove in the bolt head. Lock tab 109 may be held in position by welds 111 between the lock tab and baffle plate 104 at each end of lock tab 109.

FIGS. 3D and 3E illustrate example baffle bolt degradation 107, to which baffle bolts 106 may be susceptible due to irradiated assisted stress corrosion cracking, loss of preload, thermal and irradiation embrittlement, high cycle fatigue/unzippering/overload, and/or steady-state pressure gradient across the baffle plates, or the like. The degradation may result in missing bolt heads, missing lock bars, cracked head bolts, cracked lock bar welds, or the like. As depicted in FIG. 3D, a crack 107A has formed between the bolt head and bolt shaft or shank. FIG. 3E depicts void swelling 107B in the bolt shaft of baffle bolt 106. The systems and methods provided herein may be utilized to repair, e. g. extract and replace, degraded baffle bolts.

FIGS. 4 and 5 illustrate baffle bolts 106 installed in baffle plates 104. Baffle bolts 106 may be installed in rows in baffle plates 104, which abut flush against former plates 108 (FIG. 3B) disposed on an opposing side of baffle plates 104, as discussed above with respect to FIG. 3B.

Referring to FIG. 6, one or more bolt repair platforms 200 may be installed in the internal structure to repair degraded baffle bolts 106 (FIGS. 4 and 5). Bolt repair platforms 200 may be configured such that multiple bolt repair platforms 200 may be installed and work baffle bolts 106 simultaneously. FIGS. 6-12 illustrates example bolt repair platforms 200 installed on baffle plates 104 according to an example embodiment. In the depicted example, four separate bolt repair platforms 200 are deployed simultaneously on short and long baffle plates 104, and, in one instance, two bolt repair platforms 200 are deployed on the same long baffle plate 104.

Bolt repair platform 200 is a frame upon which a tool module 206 is attached and travels vertically under the propulsion of a vertical drive assembly, as discussed below. Referring also to FIG. 7, bolt repair platform 200 may include one or more rollers 202 disposed on roller axles extending from a top edge of a working face of bolt repair platform 200. Each roller defines a central circumferential groove that receives a top edge of a baffle plate 104 so that the wheel and its axle supports at least some of the weight of bolt repair platform 200. Rollers 202 facilitate lateral movement of bolt repair platform 200 relative to baffle plate 104, where a hoist may be positioned on bridge 105 (FIG. 1) to laterally move the platform, so that the bolt repair platform traverses the baffle plate, moving on its rollers on the baffle plate top edges.

Bolt repair platform 200 may also include a plurality of vacuum cup attachments 204 disposed on the working face and/or side faces of the frame. Vacuum cup attachments 204 may apply vacuum force to a baffle plate 104 in contact with the vacuum cup attachment 204 to increase rigidity of bolt repair platform 200. The increased rigidity may increase a maximum force that may be applied by tool module 206 to a baffle bolt, in that the platform can withstand a greater reaction force before moving to a material degree. In an example embodiment, the vacuum force may be approximately 10,000 lbf. That is, as tool module 206 applies force to a workpiece, it may apply a reaction force up to about 10,000 lbf without dislodging the repair platform from its position on a baffle plate, due to the vacuum cups. The high rigidity of bolt repair platform 200 due to vacuum cup attachments 204 may allow for high force work applications by tool module 206, for example friction stud welding.

Further, vacuum cup attachments 204 may accommodate for warping or damage to the surface of the baffle plate 104, in that, even if certain of the vacuum cups cannot establish a gripping position, other vacuum cups are able to attach to an undamaged or non-warped portion of the baffle plate. In some example embodiments, vacuum cup attachments 204 are driven by a common vacuum source but may operate independently of each other. The vacuum system, for example, may include a respective flow-based automatic vacuum shutoff for each attachment 204 between the attachment and the common vacuum source, such as a ball float check valve, that, in operation, cut off vacuum to suction cup attachments 204 that have not sealed against a surface of a baffle plate 104, triggered by the resulting air flow that drives the ball float check valve shut. The vacuum may be applied to vacuum cup attachments 204 by a dual reservoir vacuum pump, which may apply vacuum to an upper reservoir and capture water and/or particulate matter in a lower reservoir. When vacuum has been established with baffle plates 104, a reservoir isolation valve between the upper reservoir and lower reservoir shuts, and the water drains from the lower reservoir. The vacuum pump and/or vacuum control valves may be controlled by an operator using the control system, as discussed below in reference to FIG. 48, to grip and/or release the baffle plates.

FIG. 8 illustrates a top down view of an example bolt repair platform 200 including vacuum cup attachments 204 that, by suction, couple a working face of bolt repair platform 200 to a first baffle plate 104 and a side face of the bolt repair platform to a second baffle plate 104. Each of rollers 202 includes a circumferential plate groove that sets on baffle plate 104. Due to their fixed positions with respect to the repair platform face panels, rollers 202 maintain the elongated repair platform front and side face panels a predetermined distance above the bottom of the internal structure, which may prevent damage to lower core plate pins and, due to the spacing of the plate groove from the bolt repair platform's working face, maintain bolt repair platform 200 a predetermined distance from baffle plate 104.

FIG. 9 illustrates a perspective view of an example bolt repair platform 200 and tool module 206 according to an example embodiment. Tool module 206 may be operably coupled to a tool platform 208 via a tool coupler 207 (see also FIG. 16). The tool platform is configured to travel vertically along a linear slide bearing 209 operably coupled to bolt repair platform 200. A gear rack 210 may be provided on one or both sides of linear slide bearing 209.

FIG. 10 illustrates a vertical drive assembly for a tool module 206 according to an example embodiment. The vertical drive assembly is operably coupled to tool platform 208 on bolt repair platform 200 and includes an actuator operatively between the frame and the tool, in this instance a vertical drive motor 216, such as an air motor, a hydraulic motor, electronic servo motor, electronic step motor, or the like. Vertical drive motor 216 drives a helical gear drivetrain 218. Helical gear drivetrain 218 may be configured to be operated in foreign material exclusion (FME) areas; e. g. each of the components of the helical gear drivetrain 218 may be retained in a housing to prevent the components from entering the FME area. Helical gear drivetrain 218 translates gear rack 210, causing the tool platform to move vertically as the gear drive train operates. The vertical drive assembly may also include a resolver position feedback sensor 220 that provides a signal that identifies a position of the tool platform, and therefore the tool module, on the repair platform frame to an operator of the bolt repair platform 200 based on the rotation of a gear of helical gear drivetrain 218. That is, since the rotation of the gear to which resolver sensor 220 is coupled is directly proportional to the tool platform's linear travel on repair platform 200, the signal from sensor 220 accumulates to thereby track the tool platform's position in the Y axis (see FIG. 15) on the repair platform. As indicated below in the discussion of FIG. 48, feedback sensor 220 outputs its position signals to processor 1452.

Upon disposition of the bolt repair platform at a predetermined position on a baffle plate and activation of the tool module, the operator may drive the tool platform 208 and tool module 206 to a predetermined calibration position on the repair platform. The calibration may occur prior to the bolt repair platform 200 entering the work area (where the first position sensor is disposed on the bolt repair platform) or may be performed after the bolt repair platform is placed in the work area, such as for recalibration or verification. In such example embodiments, the bolt repair platform's alignment at the predetermined position on the baffle plate (which may be effected, for example, by aligning a marked position on the bolt repair platform with a marked position on the baffle plate) aligns the bolt repair platform in a predetermined position with respect to all baffle bolts on that baffle plate and on any adjoining baffle plates accessible to the tool assemblies on the bolt repair platform. The respective positions of all such baffle bolts, and the position of the bolt repair platform when it is aligned in the predetermined position, are defined within a predetermined coordinate system and stored at storage device 1454 (FIG. 48). There are multiple such predetermined positions for the bolt repair platform around the baffle plates of the reactor internal structures, so that, collectively, the baffle bolt locations stored at storage device 1454 for all of the bolt repair platform predetermined positions encompasses all the baffle bolts of all the baffle plates of the reactor internal structures.

The tool module's predetermined calibration position on the bolt repair platform opposes a first position sensor on the repair platform or a baffle plate. The first position sensor, which may be disposed at a fixed position on repair platform 200 or a baffle plate, may be detected by a corresponding second sensor (the first and second sensors comprising, e. g., a laser or IR emitter/receiver pair or other light-emitting optical device configuration) attached to the tool module 206. The first and/or second sensor outputs a signal to processor 1452 (FIG. 48) that detectably changes when the sensors are aligned, so that the processor, while executing its computer instructions to effect the steps attributed to the processor herein, detects when the tool platform and module are at the predetermined position based on the output signal. To the extent that the second sensor on the tool module is offset by a distance and direction from a tool drive axis of a tool drive assembly (discussed below) on the tool module, the first sensor is offset by the same distance and direction from the predetermined calibration position for the tool drive axis. The processor drives a user interface 1460 (FIG. 48) to display data corresponding to the signal, so that an operator can determine when the tool module (e. g. as defined by the tool drive axis) is aligned at the predetermined position. Alternatively, the second sensor may be a camera 231 (FIG. 23) attached to the tool platform so that the camera's optical axis is parallel to the tool drive axis and at a predetermined offset distance and direction from the tool drive axis. The camera outputs its acquired images to processor 1452 via device interface 1462 (FIG. 48), so that the processor drives the images to user interface 1460. In this arrangement, the first sensor is a visible marker offset from the predetermined calibration position by the same distance and direction at which the camera axis and the tool drive axis are offset, so that when the camera optical axis aligns with the first sensor, as determined by the operator's observation, the tool drive axis is aligned at the predetermined calibration position. In either arrangement, when the operator viewing the user interface determines that the tool module is aligned with the predetermined calibration position on the repair platform or a baffle plate, the operator enters a signal to the processor via the user interface, causing the processor 1452 to store in memory an initial position of the tool drive assembly/tool module in the platform. The initial position may be, for example, a value defined by the output signal of resolver sensor 220 (a Y axis position) and a value defined by an output signal of a resolver sensor (discussed below) corresponding to a drive motor that drives the tool drive assembly and tool module in either X axis (see FIG. 15) direction with respect to the bolt repair platform and an opposing baffle plate (an X axis position).

Accordingly, when the bolt repair platform is located at a given predetermined position at a baffle plate, the location of the tool module and tool drive assembly at the predetermined calibration position locates the tool module and its tool drive assembly with respect to all baffle bolts accessible by the tool module when the bolt repair platform is at that position. Knowing the tool module's location at the calibration position, and having access to the bolt repair platform's position and the baffle bolts' positions from the stored data, processor 1452 can control the tool module's movements to those bolts, as described in more detail below. As the processor receives the position signals from sensor 220 and the X axis resolver sensor during tool module movements, the processor, again as executing the program instructions, dynamically updates the tool module's position by incrementing or decrementing the tool module's X/Y axis position data and storing the tool module's position with respect to the bolt repair platform faces and/or baffle plate faces, so that the stored position data always identifies the module's position relative to the platform faces, the baffle plate faces, and the baffle bolts. The operator may drive the tool module 206 to a second sensor position or otherwise known location to calibrate or verify calibration of the resolver position by comparing the resolver position to the known location of the second sensor position. In some example embodiments, vertical drive motor 216 and other position motors as described herein, and their corresponding resolver position feedback sensors, may be radiation hardened, such as operable with a dose in an Mrad scale, or the like.

As illustrated in FIG. 11, bolt repair platform 200 may include one or more bolt access apertures 212 therethrough that enable a portion of tool module 206 to access baffle bolts 106 through a working face of bolt repair platform 200. In an example embodiment, bolt access apertures 212 may be configured to allow access to one or more baffle bolts 106. Bolt access apertures 212 may be oriented with a line of baffle bolts, such as a row of baffle bolts associated with a former plate 108 (FIG. 3B).

FIG. 12 illustrates an example bolt repair platform 200 installed on a short baffle plate 104 (in that the horizontal length of the baffle plate is less than the total travel distance of the tool assembly in the horizontal directions) according to an example embodiment. A first roller 202A (and other rollers, not shown for clarity) may be in contact with the top of the short baffle plate 104, while one or more second rollers 202B is/are suspended by the roller axle not in contact with a baffle plate 104. In an example embodiment, bolt repair platform 200 includes edge bolt access apertures 214, as depicted in FIG. 13. When the bolt repair platform 200 is positioned on a short baffle plate 104, vertically-oriented edge bolt access apertures 214 may be aligned with baffle bolts 106, such as baffle plate edge bolts 106A (FIG. 3B). Referring to both FIGS. 12 and 13, bolt access apertures 212 and/or edge bolt access apertures 214 may be configured for any bolt pattern, and a single bolt access aperture may be configured for use with multiple different bolt patterns. In these embodiments, generally, a given bolt access aperture has a dimension of a length sufficient so that the bolt access aperture encompasses a plurality of baffle bolts when the repair platform is disposed at a predetermined position on the baffle plate. In an example embodiment, at least a portion of the working face of bolt repair platform 200 may be interchangeable with other working faces having differently configured and/or oriented bolt access apertures, such that different bolt access aperture configurations may be inserted based on a given bolt configuration.

FIG. 14 illustrates an example bolt repair platform 200 including two or more tool modules 206 according to an example embodiment. Tool modules 206 may be installed on the bolt repair platform in the same orientation or in opposing orientations. For example, a first tool module 206 may be disposed on top of the tool platform, face up, and the second tool module 206 may be disposed below tool platform 208, face down. In other embodiments, first tool module 206 may be oriented face down, and the second tool module 206 may be oriented face up. In still further embodiments, both tool modules 206 may be oriented face up or face down. Multiple tool modules 206 (those on the same bolt repair platform and/or on different bolt repair platforms) may be operated simultaneously, thus multiplying the number of baffle bolts 106 that may be worked simultaneously.

FIG. 15 illustrates example movement axes of a tool module 206 of a bolt repair platform 200 according to an example embodiment. Tool module 206 may have one or more movement axes relative to bolt repair platform 200. A first movement axis may be a vertical travel axis (Y axis 245), in which tool module 206 is positioned by helical gear drive train 218 (FIG. 10) and gear rack 210 (FIGS. 10 and 11). Referring also to FIGS. 12 and 13, a second movement axis may be a lateral positioning axis (X axis 244), in which the tool of tool module 206 may be laterally positioned to access a baffle bolt 106 through a bolt access aperture 212 or edge bolt aperture 214. In some embodiments, the tool may be offset toward one side of tool module 206 (e. g. when the tool module is centered in the X axis on a front face of the bolt repair platform and mounted to tool module platform 208 (FIGS. 9 and 10), the tool is disposed at one edge or the other of the module platform) so that the tool is off center with respect to the bolt repair platform face to allow the tool to access baffle bolts 106 that are positioned near an edge of the bolt repair platform face when the front face is secured opposite a baffle plate 104. Tool module 206 and tool platform 208, when coupled by coupler 207 (FIG. 9), form an assembly that may be received by and secured within bolt repair platform 200 either with the tool module facing up (with the tool module sitting above platform 208) or facing down (with the tool module hanging below tool platform 208). Thus, tool module 206 and tool platform 208 may be inverted and reinserted into the tool repair platform 200 to enable access to baffle bolts 106 that are on an opposite side from the tool offset side when oriented face up. A third movement axis may be perpendicular to an X, Y axis plane (Z axis) e. g. a tool axis, in which the tool may be moved toward and/or away from the working face and/or a baffle plate 104 to engage a bolt. The Z axis may include coarse positioning over a first long coarse Z axis 242 and a fine positioning over a second shorter fine Z axis 240. Alternatively, rather than driving the tool in the Z direction with respect to the frame of bolt repair platform 200, the frame may be moved toward the baffle plate to thereby move the tool into engagement with an opposing bolt.

As discussed above, tool module 206, and therefore the tool, may be operably coupled to tool platform 208 by a tool coupler 207. FIGS. 16 and 17 illustrate alignment and coupling of tool coupler 207 for a tool module 206. In some example embodiments, control electronic signals or control hydraulics may be provided to respective electric or hydraulic motors of a tool drive assembly 230, as described herein, through an electrical or hydraulic connection manifold associated with tool coupler 207, via a control system (e. g. as shown at FIG. 48). Additionally or alternatively, control electronic signals or control hydraulics may be provided to the tool drive assembly through one or more connectors 222 on tool module 206 mating with connectors 223 on tool platform 208. Tool module 206 and/or tool platform 208 may include rounded or beveled edges 224, which may assist in laterally aligning tool module 206 and tool platform 208. Tool coupler 207 may also include beveled edges on a male and female coupling for aligning the respective female and male couplings on tool module 206 and platform 208 with each other. In an example embodiment, tool module 206 may be decoupled and replaced with a second tool module 206 or specialized tool by decoupling tool coupler 207. The replacement of tool module 206 may be accomplished using an equipment pole from bridge 105 (FIG. 1), without removing bolt repair platform 200, the tool platform, or the like or pausing work performed by other tool modules associated with the same bolt repair platform. Such tool module replacement may require less time utilizing the presently-described embodiments than prior systems, which may require that the entire tool system be extracted and rinsed or decontaminated prior to tool replacement. Additionally, baffle bolts 106 may continue to be worked by one tool module 206 during the replacement of a different tool module 206, not only on other bolt repair platforms 200, but on the bolt repair platform 200 undergoing the tool module replacement.

FIGS. 18 and 19 illustrate a tool drive assembly 230, e. g. a unified tool system package, of a tool module 206 (FIGS. 7, 9-14) according to an example embodiment. Tool drive assembly 230, and therefore the tool 252, may move laterally in X axis 244 on a first sub-frame, in this instance a first linear slider 248, and in the fine Z axis 240 on a second sub-frame, in this instance a second linear slider 246, that moves with the tool drive assembly in the X direction on linear slider 248, aligned perpendicular to linear slider 248. Tool drive assembly 230 may be driven along the first or second linear slider 246, 248 by one or more respective actuators, e. g. positioning motors such as air motors, electronic servos, electronic step motors, or the like, operatively coupled to the sliders, for example, as discussed below with respect to FIG. 30. Thus, each actuator is operatively disposed between its respective sub-frame and the tool and, as the sub-frames are mounted to frame 200 (FIG. 14), between the frame and the tool. In example embodiments, the positioning motors may drive a pinion along a rack and pinion assembly or turn a lead screw to position the tool drive assembly. Each positioning motor is coupled to a resolver sensor that outputs its signal to processor 1452 (FIG. 48) so that the resolver sensor signal changes with the tool drive assembly's movement in the X or Z axis, respectively. Movement in the Y axis by the vertical drive assembly and in the X axis by the linear slide assembly 248 may be precision movements to align the tool drive assembly with the location of a given baffle bolt 106, as described above.

In an example embodiment, a given tool 252, secured in a spline drive 254, may be moved in coarse Z axis 242 through a tool conduit 250 that operably couples at a first end to spline drive 254 and at a second end to an operator station outside of the work area, such as on bridge 105 (FIG. 1), at a second end, as discussed below with respect to FIG. 24. Tools 252 may be pushed through tool conduit 250 with spline drive 254, as described below. Example tools 252 for engaging baffle bolts as described herein may include an electro discharge machining (EDM) drill head 252A configured to remove a locking tab 109 (FIG. 3C), a bolt extractor, e. g. easy out 252B, a hole bore 252C, a hex drive 252D (male and/or female), or the like. The spline drive 254 includes tool collet 253 (FIG. 23) configured to axially retain the tool 252 at the working end of spline drive 254. Each tool 252 is, in addition, shaped with flats, keys, splines, or the like, that are received by mating corresponding surfaces at the interior of spline drive 254 so that the tool, when secured at the predetermined working position at the end of the spline drive, is rotationally fixed to the spline drive. Thus, rotationally driving the spline drive by the tool drive assembly's rotary driver also rotationally drives the tool 252.

Tool module 206 (FIG. 7, 9-14) may utilize one or more tools 252 to remove lock tab 109 (FIG. 3C), extract the baffle bolt 106 (FIG. 3B), and replace the baffle bolt 106 with a new baffle bolt 106. In some example embodiments, a baffle bolt 106 may be broken or may break during removal. The tool module may be further configured to remove the remaining portion of the broken baffle bolt, such as by drilling a hole in the baffle bolt shank by EDM drill head 252A and engaging bolt extractor 252B in the resulting hole to engage and lock to the sides of the drilled hole. In some embodiments, tool module 206 may mill the entire baffle bolt 106 and clear bolt threads in baffle plate 104. In further example embodiments, a bolt hole in baffle plate 104 may not be properly aligned with the corresponding former plate 108 (FIG. 3B). Tool module 206 may be configured to enlarge the bolt hole to achieve alignment prior to replacement of a baffle bolt 106, such as by drilling or milling the bolt hole. In an example embodiment, tool module 206 may be further configured to crimp or press fit a bolt head of a replacement baffle bolt 106, which may retain the baffle bolt in the installed position. In an example embodiment, in which tool module 206 has enlarged a hole for a baffle bolt 106, tool module 206 may be configured to install an oversized baffle bolt 106.

In some example embodiments, and referring also to FIG. 12, such as when bolt repair platform 200 is installed on a short baffle plate 104A, tool 252 may be a long reach tool. The long reach tool may be configured to work a baffle bolt 106 on a second baffle plate 104B, e. g. an offset baffle plate, that is in front of/opposes the working face that bolt repair platform 200 but on which the rollers 202 do not ride, or with which the vacuum cups do not engage (e. g. the baffle plate 104B opposite the working face below roller 202B that is parallel to but offset from the baffle plate 104A opposite the working face below roller 202A). In some example embodiments, a support arm may extend from tool module 206, tool platform 208, or bolt repair platform 200 to the second baffle plate 104B to engage and provide rigidity to tool module 206 for working baffle bolts 106 on the second baffle plate. The ability to work baffle bolts 106 in the proximate baffle plate 104 and the second baffle plate 104 may allow additional baffle bolts 106 to be worked without need to move bolt repair platform 200.

In an example embodiment, tool conduit 250 may be formed of a polyethylene or other polymer conduit, such as a semi-rigid polymer conduit. In some example embodiments, tool conduit 250 may be formed of stainless steel wire rope with or without a hydraulic line. Tool conduit 250 may be utilized to pass tools to and from tool module 206 and an operator station, as discussed further below.

In some example embodiments, tool drive assembly 230 may include a camera 231 to allow an operator at the operating station to view the working area during bolt repair. Camera 231 may be a radiation hardened camera, such as capable of operation with a dose in an Mrad scale, or the like disposed within and mounted to the housing of tool drive assembly 230 so that the camera's optical axis extends through and is concentric with an aperture through the housing, as indicated in FIG. 18. As should be understood, it is known for cameras to have the capability to acquire data in video format that can be stored and uploaded to computers and other systems in batch form or that can be output in real time. Accordingly, the construction and operation of such cameras is not provided in further detail herein. In the embodiments described herein, the camera video data is output in real time, via a suitable data cable that connects to an output port of the camera and extends through and from the housing of tool drive assembly 230 through a harness (not shown) at the back of the tool drive assembly. The camera cable, along with electric and/or hydraulic power lines, and electric signal cables, also extend from the harness and from the tool drive assembly, through a conduit (not shown) that extends between the tool drive assembly, and to the control system located on bridge 105 (FIGS. 1 and 24) or other control location and discussed below with regard to FIG. 48. It should be understood, however, that such an arrangement is for purposes of example only and that camera data can be acquired and uploaded in batch form as well. Additionally, tool drive assembly 230 may also include or be associated with a debris suction port 233. Debris suction port 233 may be disposed around or proximate to spline drive 254. In an example embodiment, debris suction port 233 may be operably coupled to a vacuum tube that may exit tool drive assembly 230 or tool conduit 250 and discharge into a debris filter. Debris suction 233 may clear the field of view of camera 231 and prevent radiological degradation of water by unrestricted movement of radioactive particulate debris, e. g. EDM swarf. In an example embodiment, the debris filter may filter particulate matter of approximately two millimeters or smaller, e. g. about two micrometers.

Referring to FIGS. 18 and 19, a rotary driver, e. g. a tool drive motor 232, drives clockwise or counterclockwise rotation of spline drive 254 through interengagement of gears on the two components. Tool drive motor 232 may be an electronic servo motor, an electronic step motor, an air motor, a hydraulic motor, or the like. In an example embodiment, tool drive motor 232 may be a radiation hardened motor, e. g. capable of operation with a dose in an Mrad scale, or the like. In some embodiments, tool drive motor 232 may be a high torque motor, e. g. 300 ft-lb, 400 ft-lb, or the like. The rotational force of tool drive motor 232 may be transferred to spline drive 254 via a drive gear 235. In an example embodiment, the drive gear 235 comprises a portion of a helical gearing system, discussed further in regard to FIG. 21 below.

In some example embodiments, tool drive assembly 230 also includes a resolver position feedback sensor 234. Resolver position feedback sensor 234 may determine the rotation and/or position of spline drive 252 and/or tool drive assembly 230 based on rotation of drive gears 235. In some embodiments, resolver position feedback sensor 234 may be radiation hardened, e. g. capable or operation with a dose in an Mrad scale, or the like.

In an example embodiment, a torque sensor (indicated at 1487 in FIG. 48) such as a strain gauge applied to a precision torque bar system and/or other sensors are configured to determine a torque value for extraction and replacement of baffle bolts 106 (FIG. 3B). In an example embodiment, a torque measurement may be based upon the level of an electric current applied to tool drive motor 232 or a hydraulic or pneumatic pressure applied to tool drive motor 232, as detected by an electric current sensor at the electric input to the motor or by a pneumatic or hydraulic pressure sensor on pressure or hydraulic lines to a pneumatic or hydraulic motor, as the case may be, or upon a direct torque measurement by a strain gauge. In an example embodiment, such a torque sensor is used to determine the torque value, for example by measuring electric current or hydraulic or pneumatic pressure applied to tool drive motor 232 and converting (at processor 1452, FIG. 48) the electrical, hydraulic, or pneumatic signal to torque based on a prior calibration. Such sensor signals are output from the sensors to the processing circuitry via electrical connections effected through the conduit discussed above. The extraction torque may be indicative of the baffle bolt's integrity or degradation. Excess running torque for extraction may be indicative of void swelling, thread galling, or the like. In an example embodiment, an expected extraction torque may be approximately 150 ft-lbs. The replacement torque may be monitored for quality assurance of the baffle bolt's engagement with baffle plate 104 and the corresponding former plate 108 (FIG. 3B). An example replacement torque may be approximately 110 ft-lbs. Via the sensor output, the processor may monitor the torque needed to drive the replacement bolt into position once the original bolt is removed. The processor may compare this replacement torque with predetermined torque levels considered necessary to properly secure the replacement bolts and automatically stop application of torque to the replacement bolt when that torque is reached. It will be understood, however, that various methods may be used to monitor torque in the replacement bolt and that the replacement bolt may be driven without torque monitoring.

Referring also to FIG. 20, a spline drive 254 according to an example embodiment may be hollow, defining, for example, a through or countersunk bore 256 that receives a given tool of the one or more tools 252. In a countersunk configuration, the countersunk shoulder of bore 256 provides a shelf to engage an opposing ledge of a tool 252. The spline drive 254 is operably coupled to the end of a push-pull probe 262 (FIG. 23), such that an operator can move a given tool of the one or more tools 252 (disposed in the spline drive at the end of push probe 262) by inserting push-pull probe 262/spline drive 254 into the tool conduit 250 from the maintenance bridge 105 and pushing the probe and spline drive through tool conduit 250 to the tool drive assembly 230 (FIG. 23). Spline drive 254 may include one or more engagement slots 258 configured to transfer torque from drive gears 235 to spline drive 254 via a drive coupler (discussed below). In some example embodiments, engagement slots 258 may include a curved or sloped portion 259 (e. g. a portion having a centerline or edges disposed at an acute angle with respect to a plane that includes the center axis of spline drive 254 and the centerline or either edge of the main portion of slot 258, upstream of curved portion 259) on a leading edge of spline drive 254. Each sloped portion 259 depends inward toward the spline drive center axis. That is, considering a line following the lowest position in the trough of a given slot 258, that line is parallel to the spline drive axis in the main portion of the slot upstream from sloped portion 259 but, as it follows into the slot's forward sloped portion 259, moves away from the above-noted plane at a constant or increasing acute angle and, simultaneously, depends inward toward the spline drive axis. Sloped portions 259 bias the drive coupler toward engagement regardless of the position of spline drive 254 at the start of a mating operation. Referring also to FIG. 21, the drive coupler may include a bearing drive coupler 260 having a cylindrical portion and a row of teeth 236 affixed thereto, which are complementary to the drive gear 235 and form a portion of the helical drive system. Torque applied to the teeth 236 rotates both the teeth 236 and the cylindrical portion. Bearing drive coupler 260 may include one or more ball bearings, such as twelve stainless steel ball bearings, that are received in through holes in the cylindrical portion of the drive coupler 260 and that extend from the through holes into respective engagement slots 258 about the outer circumference of spline drive 254. Accordingly, and also referencing FIG. 48, when the user actuates the tool drive motor 232 (FIG. 19, and indicated in FIG. 48 at 1482) via the user interface 1460, processing circuitry 1450, and device interface 1462 to rotate drive gear 235 (FIG. 19), the drive gear rotates teeth 236 of drive coupler 260 through interengagement of the gear teeth, thereby causing the drive coupler's cylindrical portion, and therefore the bearing balls, to rotate about the tool axis. The interengagement between the bearing balls and slots 258, in turn, transfers the torque from drive gears 235 through bearing drive coupler 260 to spline drive 254. As depicted in FIG. 22, sloped surface 259 may create torque that automatically aligns the bearings of bearing drive coupler 260 into engagement slots 258.

As noted above, the center bore of spline drive 254 may be shaped to transfer torque from the spline drive to a tool 252 (FIG. 18) engaged within the bore hole 256. For example, the spline drive 254 may have a hexagonal shape complementary to a hexagonal outer perimeter of tools 252. Rotation of spline drive 254 thereby rotationally drives a tool via engagement of the complementary faces of the spline drive's center bore and the outer perimeter of the tool 252.

Referring to FIGS. 18 and 23, tooling operations, such as insertion or removal of tools 252 from the tool drive assembly, may be performed by an operator using the push-pull probe 262 in the coarse Z axis 242 (FIG. 15). As noted above, a tool 252 may be attached to the spline drive 254 coupled to the end of the push-pull probe, and the operator, standing at maintenance bridge 105 (FIGS. 1 and 24), pushes push-pull probe 262, spline drive 254, and tool 252 by a semi-rigid flexible cable, at the opposite end of which the push-pull probe is attached, through tool conduit 250 until the spline drive 254 holding the tool 252 engages the ball bearing of the a bearing drive coupler 260. The tool's operative end extends outward of and forward from the spline drive's open end. The cable, being semi-rigid, provides sufficient force in the tool's axial direction to maintain the tool in position during the tool's engagement with a baffle bolt.

In an example embodiment, tool drive assembly 230 may include a spline position lockout 270 as shown in FIG. 23. Spline position lockout 270 may be configured to lock a center axis of the spline drive 254, e. g. a tool axis, coaxially with the center of the Z axis, which may limit or prevent wobble of the spline drive 254 during work operations and may resist the spline drive's axial movement. In an example embodiment, spline position lockout 270 may be a conical collar device or collet, which applies a locking force radially inward toward spline drive 254 when actuated. Tool drive assembly 230 may include a constriction ring 272 or collet, an outer surface of which defines a complementary angle to the conical shape of spline position lockout 270. Accordingly and also referencing FIG. 48, when the user actuates the spline position lockout 270 via the user interface 1460, processing circuitry 1450, and device interface 1462, one or more valves of the tool module 230 (indicated as 1484 in FIG. 48), may open and apply hydraulic or pneumatic pressure, shifting the spline position lockout 270 forward against into the constriction ring 272 which, in turn, applies a radial force to spline position lockout 270.

Similar to the spline position lockout 270, the spine drive 254 may include a tool collet 253 configured to retain a tool 252 (FIG. 18) in the bore hole 256. The tool collet 253 may also align the tool 252 axially in the Z axis. The tool collet 253 applies a locking force radially inward toward the tool 252 when actuated. Accordingly and also referencing FIG. 48, when the user actuates the tool collet, via the user interface 1460, processing circuitry 1450, and device interface 1462, one or more valves of the tool module 230 (indicated as 1484 in FIG. 48), may open and apply hydraulic or pneumatic pressure shifting the tool collet inward against the tool 252, thereby apply a radial force to the tool that may retain the tool both axially and rotationally.

In an example embodiment, the cable, the tool conduit, the spline position lock out, and the spline drive define an electric current conduit that may supply electric current to a given tool 252, such as EDM or MDM drilling head 252A (FIG. 18), that requires electric power, e. g. for EDM (electro discharge machining) operations. In one such example, the tool conduit 250 and spline drive lockout 270 may be formed from an insulating material and the cable, push-pull probe 262, and spline drive 254 may be formed of a conductive material, such that electrical current may be supplied to the tool 252 through the cable, push-pull probe 262, and spline drive 254. Alternatively, the cable and push-pull probe 262 may be formed of an insulating material, and the tool conduit 250, spline drive lockout 270, and spline drive may be formed of a conductive material to supply the electrical current to the tool 252.

Some work operations, such as EDM procedures, may require precision positioning in fine Z axis 240. Second linear slider 246 may provide fine Z axis 240 travel of the tool drive assembly 230 during such precision operations. Additionally the user may control the tool drive assembly 230 during the precision operations, in the fine Z axis 240, forward and backward, in opposing direction by operation of the user interface, as described with respect to FIG. 48.

FIG. 24 illustrates an example operating station 400 according to an example embodiment. The operating station may support one or more tool modules 206 (FIGS. 7, 9-14), e. g. two tool modules 206, four tool modules 206, eight tool modules 206, or the like. Operating station 400 may be operated by one or more operators, such as one operator per tool module 206, one operator per bolt repair platform 200, multiple operators per tool module 206, or the like.

Operating station 400 is disposed above and with respect to reactor vessel 102 to allow an operator to install and remove tools from the spline drive and to remove and dispense with spent bolts. If radiation levels are sufficiently low, the operating station may be located on bridge 105 immediately above the reactor vessel, though it should be understood that the station may be disposed to the side of the bridge, or off of the bridge, as well. From the operating station, the operator installs tools 252 (FIG. 18) in respective spline drives 254 (FIG. 18) and retracts spent bolts from the tool drive assemblies for disposal in a spent bolt container 408. The operator controls the operation of each of the one or more tool drive assemblies 230 (FIGS. 16, 18, 21, 23), each of which is located in one of the tool modules 206 (FIG. 7) disposed within the reactor vessel, via a user interface 1460 and processing circuitry 1450 (FIG. 48) that are part of a computer system, which may be located at the operating station or remotely, such as external to the reactor compartment to reduce exposure to equipment and operators. As described above, the operator installs tools into the spline drive and installs or retracts the spline drive/tool from the tool drive assembly (FIG. 16) utilizing a push-pull probe 262 (FIG. 23) attached at the end of a semi-rigid, flexible cable that the operator pushes into and pulls from tool conduit 250. The rearward portion of each tool conduit 250 (for clarity, only one of which is shown in FIG. 24) extends from its respective tool drive assembly 230 (FIG. 16) and is received in and secured in a respective through hole in a work deck 402 at the operating station so that the open rear end of each conduit faces upward for the operator's access. As shown in the example of FIG. 24, work deck 402 secures eight tool conduit ends, reflecting the use of four bolt repair platforms 200 (FIG. 7) in reactor vessel 102 and the mounting of two tool modules 206 (FIG. 16) per bolt repair platform, as discussed herein. Behind the eight tool conduit ends at work deck 402 are eight respective spools 401 of semi-rigid, flexible cable. The cables are sufficiently flexible to bend around the curves that occur in tool conduit 250, and so that the cable can wrap around the spool, but sufficiently rigid that the operator can move the push-pull probe from the work deck to the tool drive assembly by pushing the cable down in and through the conduit. In one or more embodiments, the cable is a ½ inch diameter cable made of helical steel, semi-rigid polymer, or other suitable material, though it will be understood that cables of other constructions and materials may be used. During a working operation in which the push-pull probe 262 is pushed toward a baffle plate 104, the rigidity of the tool conduit 250 and flexible cable may resist reactive force applied to the push-pull probe 262 so that the tool retains its axial position during use.

Each cable is rolled on its spool so that a free end of the cable extends outward from the system wall above the work deck, within the operator's reach. To install a tool 252 (FIG. 18) in a spline drive of a given tool drive assembly 230, the user grips an end of the cable above the end of the tool conduit at work deck 402 that leads to the desired tool drive assembly and pulls the cable outward from its spool. Although operation of the cable is described below as manual operations by the operator, the cable may, additionally or alternatively, be operated by a motor, such as an electric motor or probe pusher 418 described in reference to FIG. 27, to pay out or wind the cable about a spool. The operator or a robot retrieves the desired tool 252 and inserts the tool 252 into the bore 256 (FIG. 20) of the spline drive 254 (FIG. 20) at the end of a push-pull probe 262 (FIG. 23). The push-pull probe may be permanently fixed to the end of the cable or may be removably attached to the cable by a suitable latch, e. g. a cooperating pin/yoke arrangement, between the cable end and the probe. The operator, through the user interface, causes the system processor to actuate the tool collet 253 (FIG. 23) to restrain the tool 252 in the bore hole of the spline drive 254. The operator, manually or through control of a robot, then inserts the push-pull probe 262, spline drive 254, and tool 252 into the open end of the corresponding tool conduit 250 and, by further pushing the semi-rigid, flexible cable down into the conduit as the cable plays out from its spool, pushes the spline drive 254 and tool 252 through the tool conduit into the tool drive assembly 230. As the spline drive 254 is inserted into the tool drive assembly 230, the leading edge of the sloped surface 259 of the engagement slots 258 may cause the ball bearings of the bearing drive coupler 260 (FIGS. 22 and 23) to align with respective engagement slots.

Also referring to FIG. 48, and with the tool secured at the spline drive, the operator controls the tool drive assembly's operation via user interface 1460, processing circuitry 1450, device interface 1462, and one or more of positioning motors 1482, tool modules 1484, cameras 1486, position sensors 1487, and discharge valves 1488, as described below with respect to FIG. 48 and otherwise herein. In particular, the operator controls the tool drive assembly to position the assembly so that the tool secured to the assembly opposes a baffle bolt and then controls the positioning motors and the drive motor at which the tool is secured to control movement of the tool drive assembly, tool module, and tool platform on the bolt repair platform in the Y direction, and of the tool drive assembly on the tool module and tool platform in the X direction, and thereby move the tool into the bolt head and, in some instances, simultaneously rotate the tool to thereby work the bolt. To retrieve or exchange a tool, the operator pulls the cable back through the tool conduit 250, as the cable's spool rolls up the exiting cable, until the probe and tool emerge from the tool conduit. This or similar processes can be repeated for one or more of the other tool drive assemblies in the reactor vessel, so that multiple tool drive assemblies are simultaneously operable. In an instance in which a spent bolt is attached to the tool, the cable may be withdrawn past a conduit switch and subsequently inserted to a spent bolt container for disposal, as described below.

In some example embodiments, operating station 400 and tool conduits 250 include an integrated decontamination and/or drying system 404 within the path of each of the tool conduits 250. System 404 comprises a housing that encloses a volume that is closed except for respective openings at the bottom of the enclosure for tool conduits 250. That is, each tool conduit from the respective tool drive assemblies 230 (FIG. 18) connects to an enclosure so that the interior of the tool conduit fluidly communicates with the enclosure interior volume. The top side of the enclosure includes corresponding through holes, opposing the tool conduit entry openings at the enclosure bottom, at which the tops of the tool conduits attach and from which the tool conduits extend through the holes in work deck 402 to the tool conduits' open ends. The enclosure may be a cylinder with an internal diameter larger than the cable extending between the opposed openings in the top and bottom of the enclosure to guide the push-pull probe from the upper opening for a given tool conduit 250 to its corresponding opening in the enclosure bottom, thereby defining the paths of the respective tool conduits 250 within the enclosure. Spray nozzles connected to a pressurized source of deionized water are disposed within the enclosure and directed to the path of the cable so that, when activated, the nozzles spray deionized water onto the cable, push-pull probe, and/or tool. The enclosure may also include a drain in fluid connection to a radioactive fluid retention tank. The deionized water may drain from the enclosure to the radioactive fluid retention tank for disposal. Electronically controlled relays control one or more valves in the water line that activate and deionized water flow to the nozzles. Device interface 1462 (FIG. 48), in turn, controls the electronic relays. Accordingly, to activate the decontamination system, the operator at operating station 400 actuates the spray nozzle valve(s) via user interface 1460, processing circuitry 145, and device interface 1462. When the operator pulls the cable, including the push-pull probe (and, if present, a tool 252 (FIG. 18) attached to the push-pull probe's opposing end), up through the tool conduit from its tool drive assembly, the operator activates the spray nozzles via user interface 1460 (FIG. 48). Once activated, the water nozzles spray the cable, push-pull probe, and/or tool(s) 252 with deionized water to flush particulate matter from the probe and tool surfaces. Additionally, or alternatively, the enclosure may include an absorbent material, such as lint free cloth or other suitable absorbent material, to remove at least some of the deionized water from the cable, push-pull probe, spline drive, and/or tool. In some embodiments, the enclosure may include one or more heating elements that deliver warm air to the probe, spline drive, and tool to assist in drying the cable, push-pull, probe, and/or the tool. The heating element may be selectively connected to a power source via one or more switches in the electrical conductors between the power source and the enclosures. The switches may be manually operated by the operator at the operating station or the processing circuitry 1450 and device interface 1462 may control the switches, either in direct response to instructions the operator provides through the user interface or responsively to programming instructions executed by processor 1452 and stored at device 1454 upon detection of the processor's deactivation of the spray nozzles. The operator pulls the cable attached to the probe/tool upward until the probe, spline drive, and tool pass through and out of the end of the tool conduit. The decontamination process is continuous as the cable, probe, spline drive, and/or tools are pulled through the tool conduit toward the operating station. The operator may then manually disengage the tool from the probe by deactivating the tool collet from the spline drive, and place the tool onto work deck 402 or into predetermine receptacles therefor formed in or adjacent to work deck 402. Integration of the decontamination system into the tool conduit path reduces the time needed for decontamination compared to methods executed following the probe's extraction from the tool conduit.

In one or more embodiments of the systems and methods as discussed herein, the system may utilize various structures and methods for securing spent bolts removed by a given tool drive assembly. As discussed herein, once the operator (at bridge 105) secures a tool 252 (FIG. 18) and a spline drive 254 (FIG. 18) into a tool drive assembly 230 (FIG. 16), and controls (via user interface 1460, processing circuitry 1450, and device interface 1462; FIG. 48) the tool drive assembly's drive motors to move the tool into engagement with a baffle bolt 106 (FIG. 4) in a baffle plate 104 (FIG. 3A) and rotationally drive the tool as it engages the baffle bolt, the tool, such as easy out 252B, may secure itself to the baffle bolt. The operator's further rotational control of the tool and positional control of the tool drive assembly (via control of the drive motors through the computer control system of FIG. 48) removes the bolt from the baffle plate, with the spent bolt being secured at the tool's working end.

In example embodiments, and referring to FIGS. 4, 16, 18, 24, and 48, the system includes a path for the cable and push-pull probe in order to allow the operator to deposit the spent bolt, and/or tool 252, in a container while withdrawing the bolt from a tool drive assembly 230, before withdrawing the push-pull probe and cable from the tool conduit in preparation for a subsequent operation. For this purpose, a respective switch 406 is disposed operatively within each tool conduit 250 to allow the operator to selectively alternate the open conduit path between the open end of tool conduit 250 at work deck 402 and (a) the tool drive assembly and (b) a spent bolt container 408. Switch 406 may be a three-way mechanical valve that the operator controls to connect the valve's input port, which connects to the part of conduit 250 extending to the open conduit end at work deck 402, to either of two output ports, one of which connects to the body of tool conduit 250 extending to its tool drive assembly 230 and the other of which connects to a section of tool conduit (formed in the same manner as tool conduit 250) that extends to spent bolt container 408. The mechanical movement within switch 408 can be driven by various means, as should be understood in view of the present disclosure, e. g. by an armature controlled by a solenoid drive or a piston controlled by hydraulic or pneumatic force. The operator controls the valve's position, and therefore defines the conduit flow path, through instructions the operator enters at user interface 1448. Processing circuitry 1450 receives these instructions from the user interface and, based on the computer code executed by processor 1452, controls device interface 1462 to, in turn, control the solenoid drive/hydraulic motor/pneumatic motor (indicated within the general reference to the tool conduit switch at 1472, FIG. 48) that controls tool conduit switch 1472/406. The programming at processing circuitry 1450 maintains the tool conduit switch in a default position to connect the tool conduit end at work deck 402 in communication with the section of the tool conduit extending to the tool drive assembly, so that when the operator initially inserts the push-pull probe, spline drive, and cable into the tool conduit end at work deck 402 and pushes the cable downward, the probe and spline drive move through the switch and into conduit 250 and to the tool drive assembly 230. In operation, the operator removes a spent bolt from a tool drive assembly 230, as described above, by pulling the cable, and with it the attached probe, spline drive, tool, and spent bolt, back up through the tool conduit and through conduit switch 1472/406. When the probe, spline drive, tool, and spent bolt reach a position within conduit 250 above switch 406, the operator changes the state of switch 406 so that the switch's input port is operatively connected to the conduit leading to spent bolt container 408 rather than to the tool drive assembly. In an example embodiment, the cable may include markers to indicate the payout distance for an operator to determine the push-pull probe's/spline drive's position relative to the switch 406, spent bolt container, and/or the tool drive assembly. Additionally or alternatively, the processing circuitry may receive, and indicate on the user interface, a measurement of the payout distance of the cable, such as from a payout sensor associated with the cable spool 401. The payout sensor may measure the rotations of the spindle or cable discharged or returned through an outlet of the cable spindle. The operator then pushes back down on the cable, thereby moving the probe and the spent bolt toward and into container 408. Once the spent bolt and/or tool are within the spent bolt container, the operator disengages tool 252 from the spline drive by deactivating the tool collet 253. The tool and spent bolt may fall due to gravity to the bottom of the container 408. An operator may also deposit contaminated tools 252, without an attached spent baffle bolt in the container, as appropriate, using a similar process.

Spent bolt container 408 may be an enclosed container including an opening for the conduit leading to the container from switch 406, so that the operator may remove the container from the reactor vessel (or pool when the support structures are removed from the reactor vessel) by an equipment pole or other means. In some embodiments, a camera (not shown) is disposed at or near the container 408, such that the camera's field of view encompasses the end of the conduit at the opening to container 408. The camera communicates with processing circuitry 1450 and device interface 1462, as indicated in FIG. 48. Prior to depositing a spent bolt into container 408, the operator activates the camera via interface 1460 and processing circuitry 1450, which transmits a signal to the camera responsively to the input from the interface. Receiving the request signal, the camera begins acquiring video images or sequential still images and transmitting the images up to processing circuitry 1450. Processing circuitry 1450, in turn, provides the images to user interface 1460, which displays the images for the user on a display screen. Accordingly, upon depositing the spent bolt in the container, the operator may view and examine the bolt and record information concerning its condition for purposes of replacement and system repair. The operator may take such notes manually or key or otherwise record the notes through the user interface and the processing circuitry for storage at storage device 1454.

Spent bolt container 408 may have an internal volume sufficient to receive one or more baffle bolts 104, such as twenty or more baffle bolts. However, the number of baffle bolts 104 and tools deposited into the spent bolt container may be limited, due to high dose rates associated with the devices. For example, a spent baffle bolt may have a dose rate of 30-40 kR/hr. As such, the operator may dispose of three bolts, four bolts, and associated tools, or the like and then replace the spent bolt container prior to exceeding radiation limits for storage or shipping. In an example embodiment, the spent bolt container is disposed so that it is reachable by the operator on bridge 105 using an equipment pole. Thus, when the basket or container receives a predetermined or otherwise maximum number of spent bolts and tools, the operator removes the container from the reactor vessel or pool for storage or shipment. In some example embodiments, the spent bolt container may be a commercially available debris canister formed in a shape substantially similar to a fuel rod, as discussed in reference to FIG. 39B, which may be stored in a spent fuel pool.

In the embodiments described above, the flexible cable spools are located at work deck 402, which is within arm reach of the operator at bridge 105, so that the operator can manually deploy the push-pull probe and the flexible cable into and out of the tool conduits. This requires the semi-rigid, flexible cable to be sufficiently long that it can extend from the work deck to its respective tool drive assembly through a corresponding tool conduit. In the embodiment as illustrated in FIGS. 25-27, the internal structures of the reactor, including a core basket 113, are removed from reactor vessel 102 (FIG. 1) and placed within a pool on a stand offset from the reactor vessel, as discussed in reference to FIG. 1. The cable spools 401 (FIG. 24) are replaced with respective probe pushers 418 and are moved from work deck 402 (FIG. 24) to a position outside the core basket 113 in the pool. This configuration allows shorter lengths of cable that can make independent extensions from a cable spool associated with the probe pusher 418 to the work deck, the tool drive assemblies, and spent bolt container, without having to extend entirely between any two of those destinations. Disposition of the conduit management system outside the core basket also allows its placement in water to, thereby, reduce the operator's work area to exposure to radiation from the spent bolts.

Because the probe pushers are located outside core basket 113, an assembly of downward-facing U-shaped sleeves 410 extends through a hot leg through hole for passage of tool conduits 250 therethrough. Tool conduits 250, being made of a polymer, could be subject to wear if directly contacting the edge of the core basket at the hot leg through hole as the probe and cable pass therethrough and could be subject to entanglement with each other. The sleeves of assembly 410 are affixed to each other, thereby avoiding wear and entanglement of the individual conduits 250.

With particular reference to FIGS. 26 and 27, the conduit management system (also indicated generally at 1470, FIG. 48) includes a plurality of conduit switches 406, one-to-one for each tool drive assembly located in the reactor vessel. Each switch is a four-way valve, selectively connecting the valve input port with any one of three valve output ports 406A, 406B, and 406C. The valve input port (not shown) of each switch 406 receives push-pull probe 262 and spline drive at the end of a cable that winds around a spool located in a respective probe pusher 418. When the cable is in its fully retracted state, the probe and spline drive are located in the input port, upstream from the three output ports. Each output port 406A receives a tool conduit extending to a respective cabling hole in work deck 402 (FIG. 24) so that the opposed opening of the conduit line is facing upward for the operator's access, as shown in FIG. 24 with respect to the earlier embodiment, thereby forming a group of conduits 412. Although not shown in FIGS. 25-27, the tool conduits 250 of group 412 may pass through a decontamination/drying station 404, as discussed above with respect to the earlier embodiment and FIG. 24. The decontamination station is configured and operates as discussed above. Each output port 406B receives a tool conduit 250 from a respective tool drive assembly and U-shaped sleeve 410, forming a group 416 of tool conduits 250. Each valve output port 406C receives a tool conduit extending to spent bolt container 408, thereby forming a group of conduit lines 414.

Each probe pusher 418 includes a spool upon which the assembly's cable winds and an electric or other suitable motor (indicated at 1474 in FIG. 48) having a rotatable output operatively connected to the spool. Control system 1400 (FIG. 48) controls the probe pusher motors from device interface 1462 in response to a signal from processing circuitry 1450 in response, in turn, to an instruction signal received from the operator via user interface 1460. Each probe pusher motor is bidirectional, and the programming at processing circuitry 1450 is configured to present to the operator at user interface 1460 a selection between paying the spooled cable out and spooling the cable in. Thus, in response to the operator's instruction received via the user interface, the processing circuitry not only actuates the probe pusher motor but, also, actuates the probe pusher motor in either of two directions to thereby wind or unwind the cable, as defined the operator's selection at the user interface.

Each conduit switch 406 includes a movable switch member that is selectively movable among three positions and that defines a through bore such that, at each of the three positions, the switch member defines an open path between the valve input port and a respective one of valve output ports 406A, 406B, and 406C. An electric motor or solenoid arrangement (indicated, together with the switch member, at 1472 at FIG. 48) controls the switch member's position in response to a signal from device interface 1462 in response to a signal from processing circuitry 1450 in response, in turn, to an instruction signal received from the operator via user interface 1460. The programming at processing circuitry 1450 is configured to present to the operator at user interface 1460 a selection among the switch member's three possible positions. Thus, in response to the operator's instruction received via the user interface, the processing circuitry actuates the tool conduit switch motor or solenoid arrangement at 1472 via device interface 1462 to move the switch member to the desired position as indicated by the user's instruction received via user interface 1462.

Assume, in operation, that the probe pusher for a given tool drive assembly is in a state at which its cable is wound on the spool to its completely retracted state, so that the push-pull probe and spline drive are disposed in the valve's input port, and that the operator wishes to insert a tool into the push-pull probe and spline drive. Via user interface 1460 (FIG. 48), the operator identifies the tool drive assembly at which the operator desires to install the tool, thereby identifying to the processing circuitry which probe pusher 418 and conduit switch 406 are to be controlled. The operator then enters an instruction via the user interface to drive the push-pull probe and spline drive to work deck 402. Due to its programming, processing circuitry 1450 responds to receipt of this instruction by sending a control signal to the device interface to control switch 406 (indicated at 1472, FIG. 48) having the conduit 250 within conduit group 416 leading to the desired tool drive assembly to move to a position in which the switch valve input port is connected to output port 406A, thereby connecting the switch valve's input port to the conduit cable of group 412 leading to the work deck. After a time sufficient to switch the valve member, or in response to a signal from a sensor at the switch that the valve member is in the desired position, the processing circuitry sends a signal to the device interface (indicated at 1474, FIG. 48) via device interface 1462, and specifically to the push probe motor, to drive the motor so that the spool unwinds the cable. Due to the valve member's position, the spool drives the cable, and therefore the probe and spline drive, up to the work deck. When the probe and spline drive emerge from the conduit at the work deck, the operator installs a desired tool into the spline drive's working end and activates the tool collet to retain the tool therein.

The operator then enters an instruction at user interface 1460 to install the tool at the tool drive assembly. Due to its programming, the processing circuitry responds to receipt of this instruction by sending a signal to the probe pusher drive motor to actuate in the reverse direction, thereby reeling in the cable about the spool and withdrawing the probe and spline drive (now holding the tool) through port 406A and back to the conduit switch's input port. Upon detecting that the spool has been sufficiently reeled in, e. g. by detection of the probe's location in the input port by a sensor or by a sensor's detection of the spool's resistance to further rotation, the processing circuitry drives the valve member to a second position, in which the switch valve input port is connected to output port 406B. Upon expiration of a sufficient time to complete this movement, or detection of a sensor output indicating the position has been achieved, the processing circuitry sends a signal, via the device interface, to the probe pusher to drive the cable outward, thereby driving the probe, spline drive, and tool through the conduit 250 connected to that conduit switch. As described above with respect to the earlier embodiment, when the push-pull probe reaches the tool drive assembly, spline drive 254 engages the bearing drive coupler 260 and the spine position lockout is activated, securing the tool in position. Upon receiving a sensor signal from the tool drive assembly indicating that the tool has been installed, or upon receiving a signal from the probe pusher motor indicating a resistance to further pushing of the cable sufficient to indicate that the tool has been installed, the processing circuitry deactivates the probe pusher motor. The motor may maintain a locked condition when inactive, thereby resisting movement from the cable so that the cable is maintained in its played-out condition until the motor receives an instruction to actuate in reverse to thereby reel the cable back in. The operator then controls the tool drive assembly to remove a baffle bolt via the user interface, processing circuitry, and device interface, as discussed above with respect to the earlier embodiment. Part of this process includes the operator entering an instruction to the processor via the user interface for the tool to engage the baffle bolt opposite the tool. Upon receiving this instruction, the processor causes the Z-axis position motor to actuate and thereby move the tool drive assembly toward the baffle plate, thereby bringing the tool into engagement with the baffle bolt. The operator then enters an instruction to actuate the tool drive assembly to work the bolt, e. g. causing the processor to rotationally drive the rotary driver, while the operator views images uploaded by the camera to the processor and displayed on the user interface to thereby monitor the operation. Upon determining that the work is complete, the operator enters an instruction at the user interface that causes the processor to move the tool drive assembly back, away from the baffle plate, in the reverse Z direction by reversing the Z-axis actuator. In such an example, the tool may carry the spent bolt away from the baffle plate.

To remove a spent bolt, the operator provides an instruction to the processing circuitry, via user interface 1460 (FIG. 48), indicating the tool drive assembly for which removal is desired and indicating an instruction to remove the bolt. The processing circuitry programming causes the processing circuitry, upon receiving this instruction signal, to activate the push probe motor to reel the cable back in. The probe pulls the spline drive and the tool (to which the spent bolt is secured) back up from the tool drive assembly and through the tool conduit. When the processing circuitry receives a signal from a sensor indicating that the probe has reached the conduit switch's input port, or from the probe pusher motor indicating a resistance to further spooling sufficient to indicate that the probe has reached that position, the processing circuitry deactivates the probe pusher motor and controls the switch member and motor (indicated at 1472) to move to its third position, connecting the switch valve's input port with output port 406C, leading to the spent bolt container. The processing circuitry then controls the probe pusher motor (via device interface 1462) to drive the spool to play out the cable. Due to the valve member's position, the probe pusher thereby drives the probe, spline drive, tool, and spent bolt into and through the cable spool's conduit of group 414 to spent bolt container 408. Upon receiving a signal from a sensor located at spent bolt container 408 indicating that the probe has reached the container, the processing circuitry deactivates the probe pusher motor and causes the spent bolt and/or the tool to be released into the spent bolt container, such as by deactivating the tool collet.

The system having released the spent bolt and/or tool, the processing circuitry controls the probe pusher motor to reel in the cable, thereby pulling the cable and probe back up through the conduit of group 414 toward the conduit switch. Upon receiving a signal, as described above, indicating that the probe and spline drive have returned to the conduit switch's input port, the processing circuitry provides a corresponding notice to the operator at user interface 1460.

If there is a need to replace a tool at some interim point during the above-described process, the operator may provide an instruction to the processing circuitry via user interface 1460 to return the tool to the work deck. In response to receipt of this instruction, the processing circuitry controls the tool conduit switch valve member to its position connecting the conduit switch input port to output port 406A, connected to the conduit leading to the work deck. Upon detecting that the valve member has reached that position, the processing circuitry controls the probe pusher motor to play out the cable, thereby driving the probe, spline drive, and tool up to the work deck, at which the operator removes the tool from the spline drive, if necessary. Upon completing this step, the operator provides an instruction to the processing circuitry via user interface 1460 to retract the probe. In response to receipt of this instruction from the user interface, the processing circuitry activates the probe pusher motor in the reverse direction, reeling in the cable. When the processing circuitry receives a signal, as described above, indicating the probe has and spline drive have reached the conduit switch's input port, the processing circuitry deactivates the probe pusher motor. The process may then repeat for other tool drive assemblies.

The description of one or more position sensors or resistance measurements for determining the position of the push-pull probe in the conduit management system is merely illustrative. One of ordinary skill in the art would immediately appreciate that other sensors may be used to determine the position of the push-pull probe, such as a payout measurement sensor configured to measure the rotations of the spool and/or a direct measurement of the cable payed out from or wound into the spool at a spool outlet.

As should be understood in this art, spent bolts may emit 30-40 kRad/hr. To reduce radiation exposure to the operator's work area, switches 406, conduit group 414, and container 408 may be disposed under the water outside the core basket, such that these components are covered with water six feet or more in depth. Given their proximity to the switches, probe pushers 418 are also located under water. Accordingly, electronic portions of switches 406 and probe pushers 418 are disposed in watertight containers.

FIG. 28 illustrates a baffle bolt repair platform 500 according to an example embodiment. Baffle bolt repair platform 500 may be may be a frame substantially similar to the frame of baffle bolt repair platform 200 discussed above with regard to FIGS. 7-23, with modification as discussed below. Baffle bolt repair platform 500 may include one or more, e. g. two, tool modules 502, which may include two tool drive assemblies 504. Tool drive assemblies 504 may be assembled and operate in a manner substantially similar to the tool drive assembly 230 discussed above in reference to FIG. 18, except, e. g., that tool drive assemblies 504 of tool module 502 do not include tool conduits 250 (FIG. 19) for the installation and removal of tools 252 between the bolt repair platform and a position remote from the bolt repair platform, such as operating station 400 (FIG. 24). Instead, baffle bolt repair platform 500 includes a tool changer rack 506 that holds and secures tools 252 and that is local to the tool module and accessible to the tool drive assemblies, so that the tool drive assemblies can directly retrieve and deposit tools from the rack without need for the operator to manually manipulate the tool. Tool changer rack 506 may hold one or more of each tool 252 used for extracting and replacing baffle bolts 106 (FIG. 3B). Tool rack 506 may be disposed on or as a portion of the baffle bolt repair platform 500, such as attached to or as a portion of a rear wall, e. g. facing away from baffle plates 104 (FIG. 3A) so that the tool rack does not interfere with the tool drive assemblies' access to baffle bolts through the front or side walls of the bolt repair platform. Tool module 502 may be configured to rotate about a theta axis that is vertical and parallel to the vertical travel axis (Y axis 245), as depicted in FIG. 29. The rotation of tool module 502 in the theta axis 507 may be at least 180 degrees in the clockwise direction, counter-clockwise direction, or both directions. The rotation of tool module 502 enables the tool module to rotate to face the tool changer rack 506 and/or baffle bolts disposed in side baffle plates 104, as discussed below.

FIG. 30 illustrates an example tool module 502 including internal components. Referring also to FIG. 29, tool drive assemblies 504 may, similar to tool drive assembly 230 (FIG. 16), move laterally in X axis 244 on a first sub-frame, in this instance a first linear slider 248, e. g. a linear beam bearing, and in the Z axis 240 on a second sub-frame, in this instance a second linear slider 246 that travels with the drive assembly on linear slider 248 in the X directions (see also FIG. 18, as the mechanisms to move a tool drive assembly in the two X directions and the two Z directions described with respect to the embodiment of FIGS. 29 and 30 are also applicable to the embodiment of FIGS. 16-19). Tool drive assembly 504 may be driven along the first or second linear slider 246, 248 by one or more actuators, e. g. positioning motors such as electronic servos, electronic step motors, air motors, hydraulic motors, or the like mounted in the tool drive assembly. In some embodiments, the positioning motors may be coupled to a lead screw, and tool module 502 may be coupled to a follower nut, such that rotation of the positioning motors rotates the lead screw, thereby causing the follower nut to exert lateral force on the tool drive assembly, and therefore the tool, to move laterally along linear slider 246, 248. A respective resolver sensor (not shown in FIG. 29 or 30 but indicated at 1487 in FIG. 48) may be operatively connected to each of the X axis, Z axis, and theta axis motors so that outputs from these resolver sensors, which are directed to processor 1452 (FIG. 48), provide position information describing the tool drive assembly's X position with respect to the repair platform or a baffle plate, the tool drive assembly's Z axis position with respect to the tool platform or baffle plate, and the tool drive assembly's theta axis angle with respect to the theta axis, each with respect to a predetermined zero position established at a calibration step.

Movement in the Y axis by the vertical drive assembly (as described above with respect to FIGS. 10 and 11) and in the X axis 244 by the linear slide assembly 248 may be precision movements (and the corresponding X and Y drive motors may be stepper motors or other precision-controlled devices) to align the tool drive assembly with the location of a given baffle bolt 106 (FIG. 3B) or to align the tool drive assembly with a tool or bolt in tool changer rack 506 (FIG. 28). Referring also to FIG. 48, the operator at the work deck controls the positioning motors (indicated at 1482) via user interface 1460, processing circuitry 1450 and device interface 1462. Processing circuitry 1450 presents user interface options at 1460 by which the operator can select a given tool drive assembly 504 and direction of movement. The processor, executing the program instructions and upon receipt of such an instruction from the operator and the user interface, translates the instruction into corresponding driver signals that the processing circuitry outputs to device interface 1462 which, in response to the instructions, outputs control signals to the appropriate positioning motor(s) 1482 so that the activated positioning motors move the tool drive assembly in the direction indicated by the interface instructions. Accordingly, the operator, through such control system, can move the tool drive module to place one (or both) of the tool drive assemblies opposite tool rack 506 (FIG. 28) or a baffle bolt 106 (FIG. 3B) for retrieval or deposition of a tool therein or therefrom or operation on an existing baffle bolt. Additionally, the user may utilize a display of the position of the tool drive assembly and/or module based on feedback from position sensors 1487 associated with one or more of the positioning motors, and/or images from cameras 510, as discussed below.

Each tool drive assembly 504 may include a rotary driver, such as tool motor 505 that rotationally drives an output shaft that is in rotational engagement with a tool drive coupler chuck 508 which, in turn, grips tool 252, so that the tool is rotationally fixed to the motor's output shaft. Actuation of the tool motor causes the output shaft to rotate a tool 252 about a tool axis 511. Tool motor 505 may be an air motor, a hydraulic motor, an electric motor, or the like. In an example embodiment, tool motor 505 is a high torque air motor capable of applying approximately 300 ft-lb of torque. In some embodiments, the drive force, e. g. a pressurized air or hydraulic source connected to the motor by suitable pneumatic or hydraulic lines, may be positioned outside of the water, to minimize contamination of systems beyond those necessarily mounted on the bolt repair platform. Tool motor 505 may drive the tool coupler chuck 508 configured to retain and release a tool 252. Tool drive coupler chuck 508 may be an air chuck configured to shift between an open state to accept tools 252 and a closed state to retain a tool captured by the chuck. Tool drive coupler chuck 508 may shift between the open state and the shut state due to application of high pressure air to the chuck. In some embodiments, tool drive coupler chuck 508 may be biased, such as by one or more springs, toward one of the open state or shut state and shift to the opposite state when air pressure is applied.

Tool drive module 502 may include an actuator, such as a tool rotation motor 512, configured to rotate the tool module 502 about the theta axis 507, as discussed above. The tool drive module 502 may be mounted to the second linear slider 246 by a rotatable assembly 513 including a first, e. g. outer, ring attached to a carriage 509, which is mounted to the second linear slider and a second, inner, ring mounted to the tool drive module. The rotatable assembly may also include a stationary gear about which a positioning gear attached to the output shaft of the tool rotation motor moves to position the tool drive module. In some embodiments, the rotatable assembly includes one or more friction reduction elements, such as bearings. Tool rotation motor 512 may be a positioning motor similar to those described above including, without limitation, an air motor, an electronic servo, an electronic step motor, or the like. Tool rotation motor 512 may rotate the tool module 502 90 degrees, 180 degrees, 270 degrees, 360 degrees, or the like in either or both the clockwise and counter-clockwise directions about theta axis 507. In some embodiments, tool rotation motor 512 may not have a rotational limit; for example, the tool rotation motor may rotate the tool module 502 about the theta axis 507 multiple times without limitation.

Turning to the configuration of tool drive assemblies 504 of tool module 502, the two tool drive assemblies 504 may be respectively disposed on opposing sides of tool rotation motor 512 with respect to a plane that includes axis 507 and is perpendicular to X axis 244, so that the tool axes 511 for the two tool drive assemblies are parallel to each other and to the plane. This arrangement extends the tool module's effective range of motion in X axis 244. As discussed herein, X axis 244 extends parallel to the generally planar baffle plates that are immediately in front of the tool drive assemblies and to which the tool module assemblies will apply their tools 252. Thus, the operator controls the tool module's movement in the X axis directions on linear sider 248 (via control of the corresponding motor between the tool module and linear slider 248 via the computer system as discussed with respect to FIG. 48) to thereby move the tool module in the X direction until one or both of the tool drive assembly axes 511 aligns with the axis of a spent bolt. Motor 512 is attached to and immediately above the coupler that attaches module 502 to the tool platform at linear slider 248. Because each tool drive assembly is offset to one side or another (in the X direction) from motor 512, when the operator controls the tool module to move to one or the other extreme end of the tool module's range of travel on X-axis linear slider 248, one or the other tool drive assembly extends a distance beyond the coupler's travel range. Thus, the arrangement extends the tool modules' effective X axis range (over what the range would be if the tool drive assembly were mounted at the motor position) by a distance on each side of the X axis travel equal to the distance between the vertical pane and a parallel vertical plane that includes tool axis 511. In one such example, the X axis stroke length, e. g. distance of lateral movement, is approximately 30.25 inches. The increase in tool reach, over tool module 206 discussed above (having a single tool drive assembly with a tool axis aligned in the middle of, or offset to one side of the middle of, the tool module), may enable complete access to baffle bolts 106 in the horizontal axis without inversion of tool module 502, as discussed above with regard to tool platform 208 (FIG. 16).

Tool module 502 may include one or more cameras 510, which may be similar to cameras 231 discussed above with respect to FIG. 18, positioned and operated to allow an operator at the operating station to view the working area during bolt repair. Each camera 510 may be a radiation hardened camera, such as capable of operation with a dose in an Mrad scale, or the like. Each camera is disposed in the tool module housing so that the camera's field of view encompasses the end of a respective one of the tools 252, and the camera's optics are focused at that point, so that the image that the camera captures provides a view of the tool's workspace. Referring also to FIG. 48, when the processing circuitry receives an instruction from the operator via user interface 1460 to activate one or the other of the tool drive assemblies 504, the processing circuitry programming automatically causes processor 1452 to activate the corresponding camera 1486 via device interface 1462 and to thereafter receive a still and/or video image signal feed from the camera. The processing circuitry then drives a display at user interface 1460, thereby allowing the operator to view the workspace as the operator controls the tool drive assemblies. In other embodiments, the operator provides direct commands to the processor via the user interface to activate and deactivate the camera. The user interface provides a display through which the operator can select a camera for a given desired tool drive assembly. Upon receiving an instruction to activate, which includes identification of the corresponding tool drive assembly (and, therefore, the particular desired camera), the processing circuitry activates the selected camera 1486 via the device interface. Once activated, the camera sends its image signals up to the processor, which in turn drives the display of such images at user interface 1460.

Although each tool drive assembly 504 is capable of independent operation, including simultaneous operation, an operator may limit operations to one tool drive assembly at any given time, as desired. In an example embodiment, the operator ensures that only one of the tool drive assemblies 504 of a tool module 502 has a tool 252 installed. In some example embodiments, each tool drive assembly at a given tool module 502 includes a mechanical lock that, when actuated, blocks actuation of the tool drive assembly (e. g. by blocking rotation of the tool drive assembly's output shaft or blocking application of electric power to the tool drive assembly) and that is actuated by actuation of the other tool drive assembly at that tool module. For example, each tool drive assembly may include a switch in the power line that provides electric current to the tool assembly motor and that is controlled by electric current detected in the power line to the other tool drive assembly in that tool module. In other embodiments, the lockout mechanism is embodied by the computer code at processing circuitry 1450. As discussed above, the code causes processor 1452 to provide a display at user interface 1460 at which the operator selects a particular tool drive assembly (e. g. by first selecting the desired tool module and then selecting which of the two tool drive assemblies on that tool module is desired) to operate. When the processor receives that instruction, the processor precludes (as a matter of its programming) actuation of the other tool drive assembly on that tool module while the first tool drive assembly is actuated, regardless of instructions thereafter received from the operator.

Although a lockout mechanism may be provided to preclude operation of a tool drive assembly 504 simultaneously with operation of another tool drive assembly on the same tool drive module 502, the operator may operate a second tool drive assembly 502 simultaneously with a first tool drive assembly where the two tool drive assemblies are on different tool drive modules on the same baffle bolt repair platform 500. For example, while the programming at the processing circuitry blocks operation of one tool drive assembly on a tool drive module when the operator operates the other tool drive assembly on the same tool drive module, the programming does not block the operator's use of a tool drive assembly on a given tool drive module when the operator simultaneously uses a tool drive assembly on another tool drive module (which is movable and operable on the bolt repair platform independently of the first tool drive module). As a tool drive assembly 504 associated with a first tool module, e. g. the upper tool module, as depicted in FIGS. 38A and 38B, may be operated simultaneously with a tool drive assembly 504 of second tool module 502, e. g. the lower tool module, the user interface provides an option for the operator to activate and control (and deactivate) multiple tool drive assemblies simultaneously, with the restriction that only one tool drive assembly can be active any one tool drive module. Correspondingly, the user interface provides the operator, or operators, an option to simultaneously operate multiple cameras corresponding to the simultaneously and independently operating tool drive assemblies, or the processing circuitry programming can automatically activate the multiple cameras when the operator simultaneously activates the cameras' corresponding tool drive assemblies. The processing circuitry programming is configured to drive user interface 1460 to provide the operator an option to select one of the simultaneously operating tool drive assemblies 504 so that the user interface displays the camera feed from only that tool drive assembly and, in some embodiments, an option to display multiple camera feeds respectively corresponding to the simultaneously operating tool drive assemblies in corresponding portions of the user interface display.

In some example embodiments, the programming at the processing circuitry may include a collision avoidance threshold. The collision avoidance threshold may be a minimum distance between tool modules 502 to prevent the tool modules from colliding, which could otherwise damage tool modules 502 or dislodge a tool 252 or other components. In an example embodiment, the collision avoidance threshold may be half an inch, one inch, two inches, or other suitable distance. The processing circuitry may dynamically determine the distance between the tool modules 502 on the bolt repair platform 500 and repeatedly determine therefrom whether the collision avoidance threshold is satisfied. In an instance in which the collision avoidance threshold is not satisfied, e. g. where the distance between the tool modules is less than or equal to the collision avoidance threshold, the processing circuitry causes both tool module positioning motors 525 (FIG. 38B) to be deactivated, e. g. by discontinuing electric, pneumatic, hydraulic power, as the case may be. The processing circuitry may then enable movement of each tool module 502 in a direction opposite to that of the other tool module.

FIG. 31 illustrates an example tool changer rack 506 according to an example embodiment. Tool changer rack 506 is disposed in a rack cradle 514 that retains the rack within a groove defined by at least a portion of three sides of the rack, e. g. each lateral side and a bottom. Tool changer rack 506 is slidably received in the side grooves of rack cradle 514 such that the tool changer rack may be slidably removed and replaced from and into the rack cradle through the rack cradle's open side, e. g. its top. In some embodiments, baffle bolt repair platform 500 may be constructed, above the rack cradle's open top, in an open manner so that the tool changer rack is accessible from the operator's work area and bridge 105 (FIG. 1). Thus, from the bridge and utilizing an equipment pole, the operator can extend the pole down from the bridge to the top of the tool changer rack, manipulate the equipment pole to secure the top of the rack, and pull the tool changer rack up, out of the rack cradle, and up to the bridge. At that point, the operator may insert, remove, or exchange tools 252 and baffle bolts 106 into and out of the tool changer rack. Upon completion of such tasks, the operator may again secure the tool changer rack with the equipment pole and, using the pole, lower the tool changer rack back down into the reactor vessel or, if the reactor internal structures are removed from the reactor vessel as discussed above, into the enclosure defined by the internal structures and into position within rack cradle 514. In other embodiments, the tool changer rack is installed and removed by a robot, which may shuttle between the bridge and the rack cradle. An exemplary such robot, sold under the name ZR 100 by BWX Technologies, Inc. of Lynchburg, Va., is described in U.S. Pat. Nos. 8,746,089, 9,273,985, and U.S. patent application Ser. No. 15/055,178, the entire disclosure of each is incorporated herein for all purposes. Referring to FIG. 48, the operator controls the operation of the ZR 100 robot 1420 via user interface 1460, processing circuitry 1450, and device interface 1462.

Tool changer rack 506 is formed from a generally planar sheet of plastic, steel, or other suitable material, through which extends a plurality of through-holes into which tools 252 and replacement baffle bolts 106 are received and retained. Flexible rings or grommets, deflectable C-clips, or other detents may be respectively provided in each such aperture, extending inward from the aperture's edge to an inner diameter smaller than the outer diameter of the tool or bolt the aperture is intended to receive, so that the device is a detent that holds the tool or bolt in place when inserted into the aperture. Initially, before use of the tool drive assemblies to remove a set of bolts, the operator inserts a sufficient number of tools into tool changer rack 506 for use by all of the tool drive assemblies the operator expects to operate and inserts at least as many new baffle bolts 106 into respective holes as the operator expects to replace in the baffle plates before next retrieving the tool changer rack from the reactor vessel. The operator may leave the tool changer rack with some number of bolt apertures open, i. e. without tools or bolts inserted, but, in other embodiments, all the apertures are filled. When the operator wishes to change out the tools on the rack or insert new baffle bolts, the operator removes the tool changer rack from the rack cradle, pulls the tool changer rack up to the bridge, removes one or more tools, replaces the tools with new tools and/or inserts new replacement baffle bolts, reinserts the tool changer rack into the rack cradle, and repeats the process. Alternatively, where the tool rack is exposed to swarf from the EDM, the operator may utilize a robot or crane to remove the rack from the frame and place the rack into a water-filled pool for disposal, replacing the rack into the frame, with new tools and bolts, and the process repeats.

Similar to the bolt repair platform 200 discussed above, the position of the tool modules 502 of the bolt repair platform may be calibrated and dynamically updated as the operator controls the tool module. For example, the operator may drive tool module 502, via the user interface 1460 and processing circuitry 1450 (FIG. 48), to a first predetermined target point on the tool changer rack 506. The operator may align the camera axis of the tool module 502 with the first predetermined target point and determine a first resolver or encoder position (e. g. in terms of the resolver signals from the X and Y position motors). The operator then drives the tool platform in the Y direction and the tool module in the X direction to align the camera with a second predetermined target point, during which the resolvers or encoders dynamically increment or decrement in the X and Y directions. The processing circuitry 1450 may then determine the relative positions of the tool module 502 and each tool drive assembly 504 in reference to the tool changer rack 506 based on known distances between the camera optical axis and the T-axes of the tool drive assemblies 504 and the resolver values at the first and second predetermined target positions. Additionally, the processing circuitry 1450 may determine the location of the tools 252 and/or baffle bolts 106 in the tool changer rack based on known distances between the tools 252/and or baffle bolts 106 and the first and second predetermined target positions. The processing circuitry may determine the Z and theta positions for corresponding resolver sensors in relation to predetermined zero positions established at manufacture.

Figure 32:
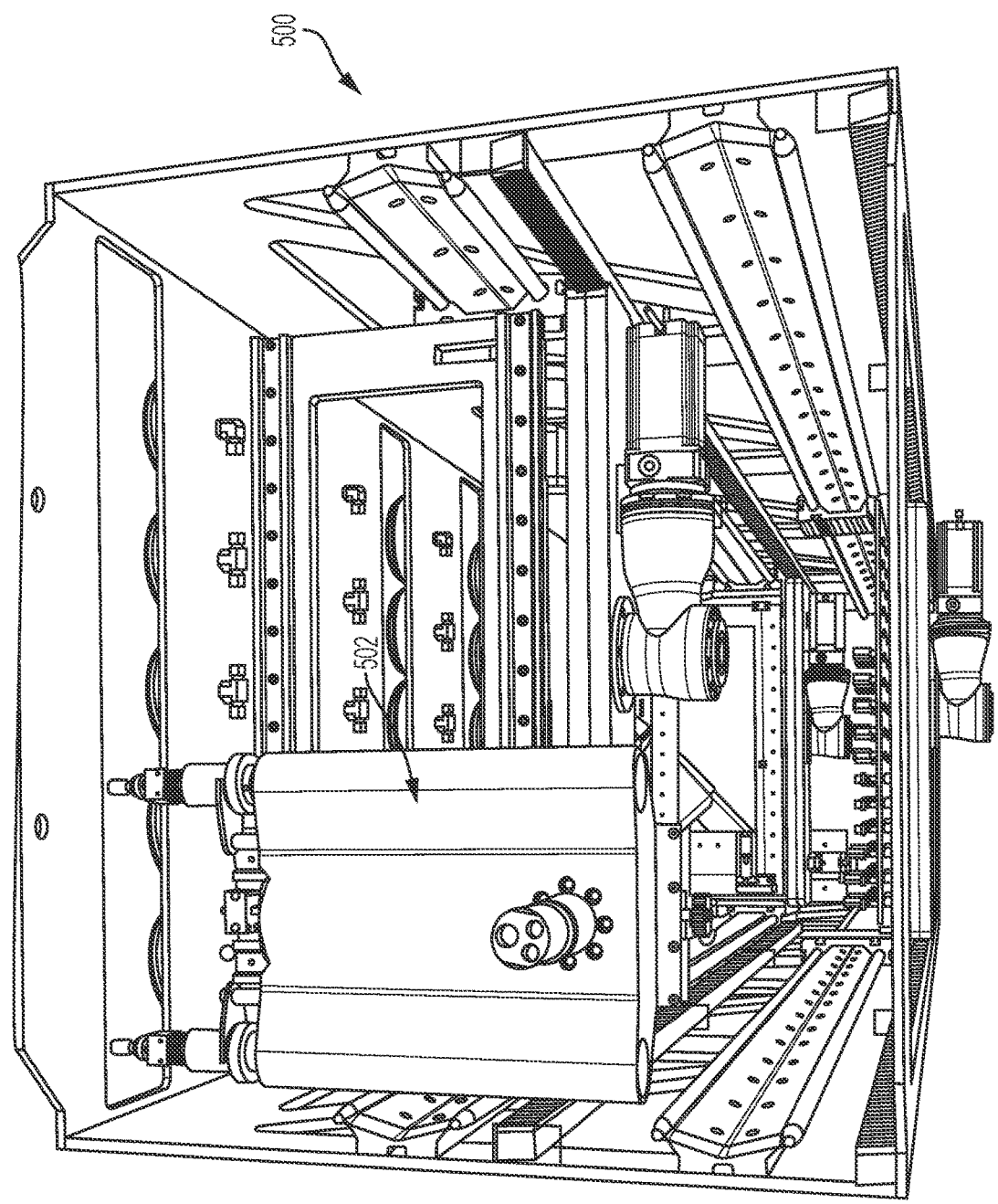
Figure 33:
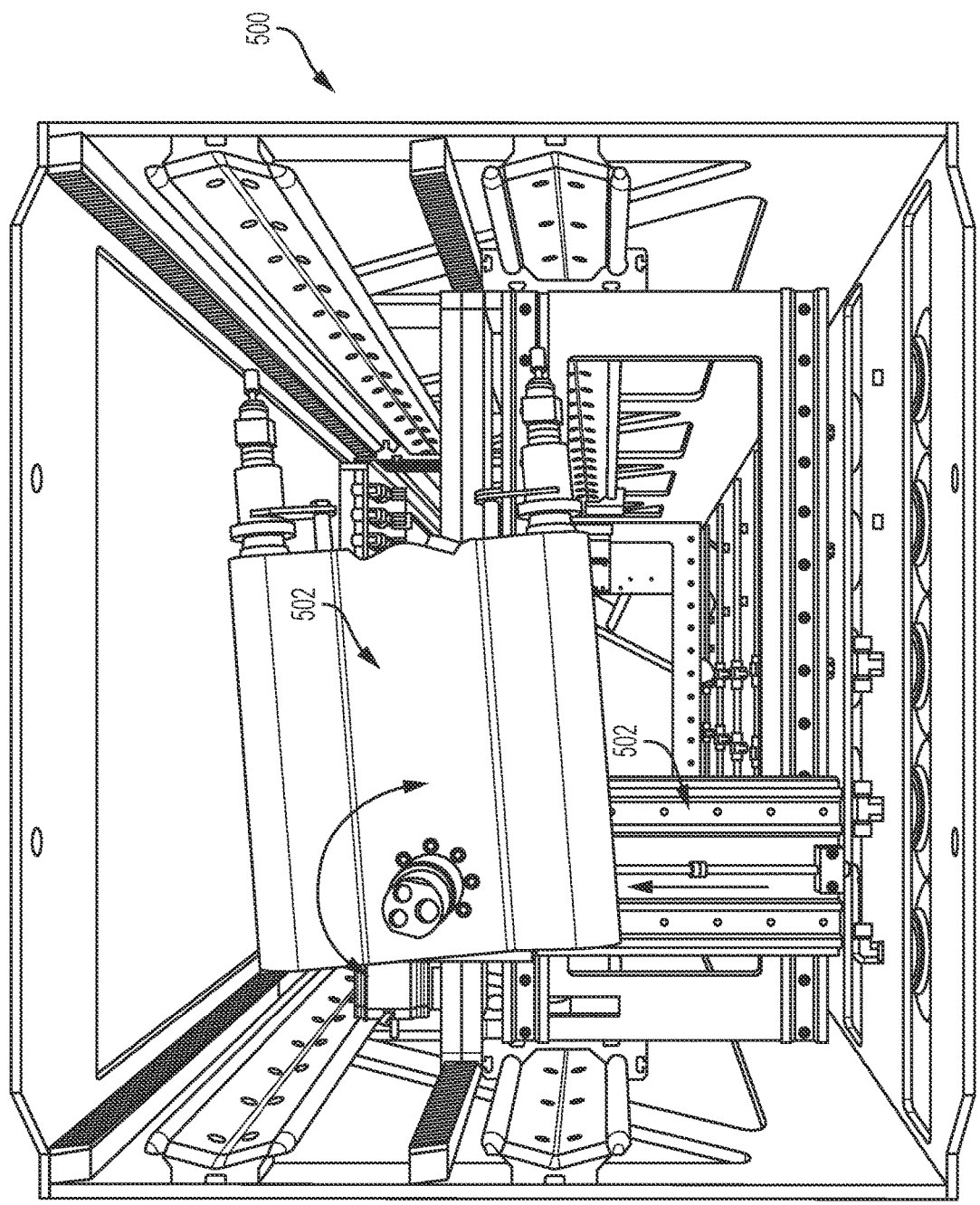
Figure 34:
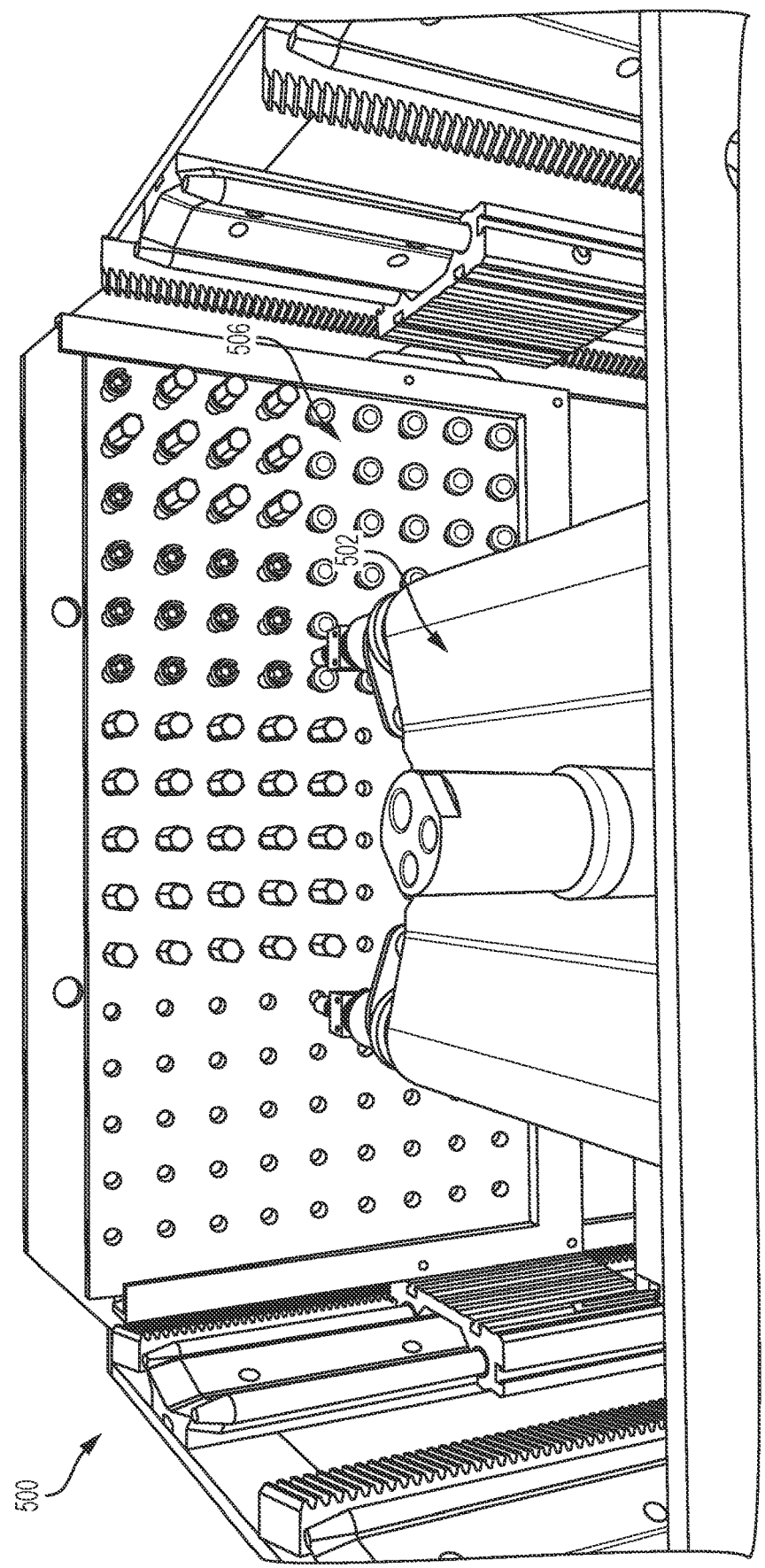
Figure 35:
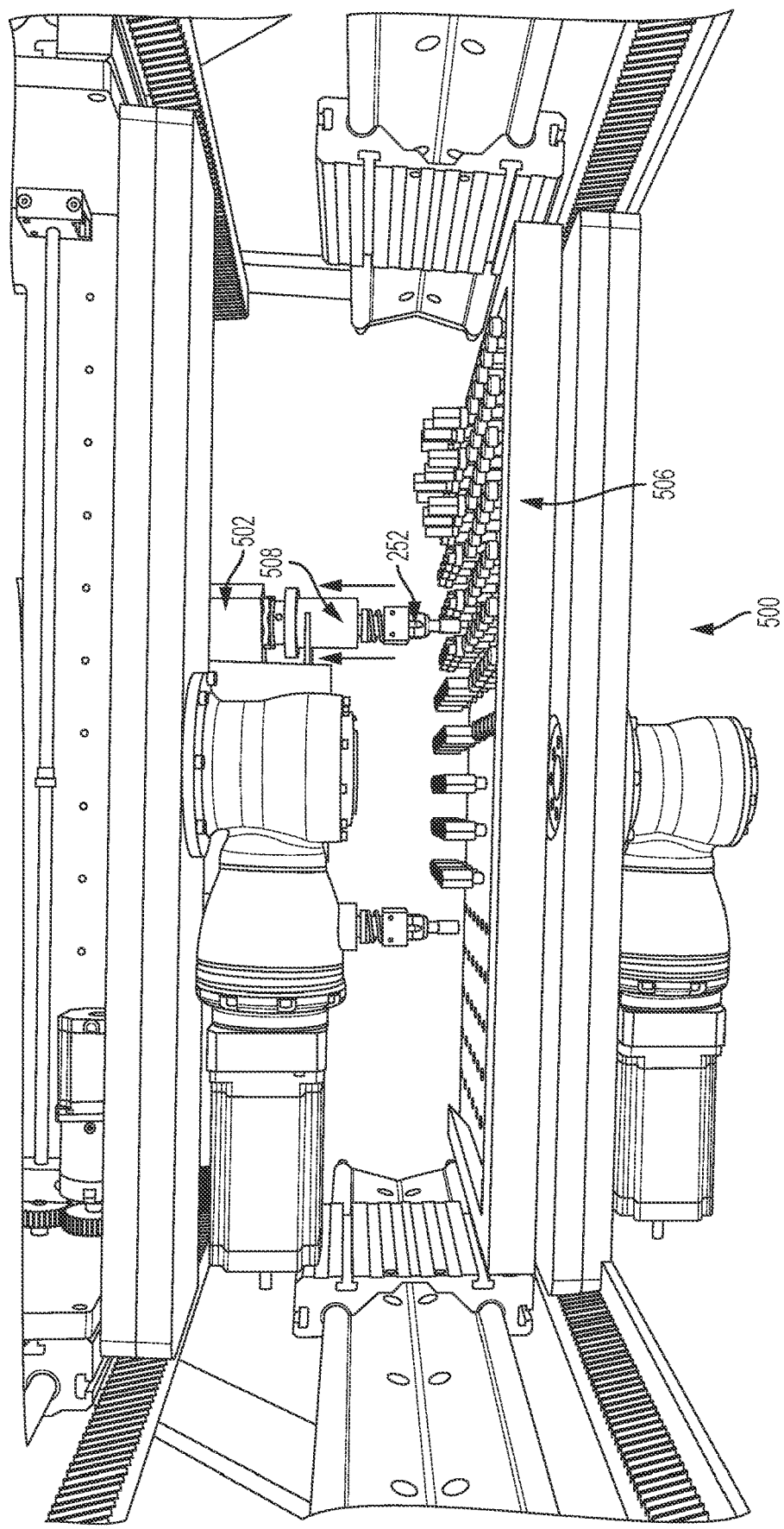
Figure 36:
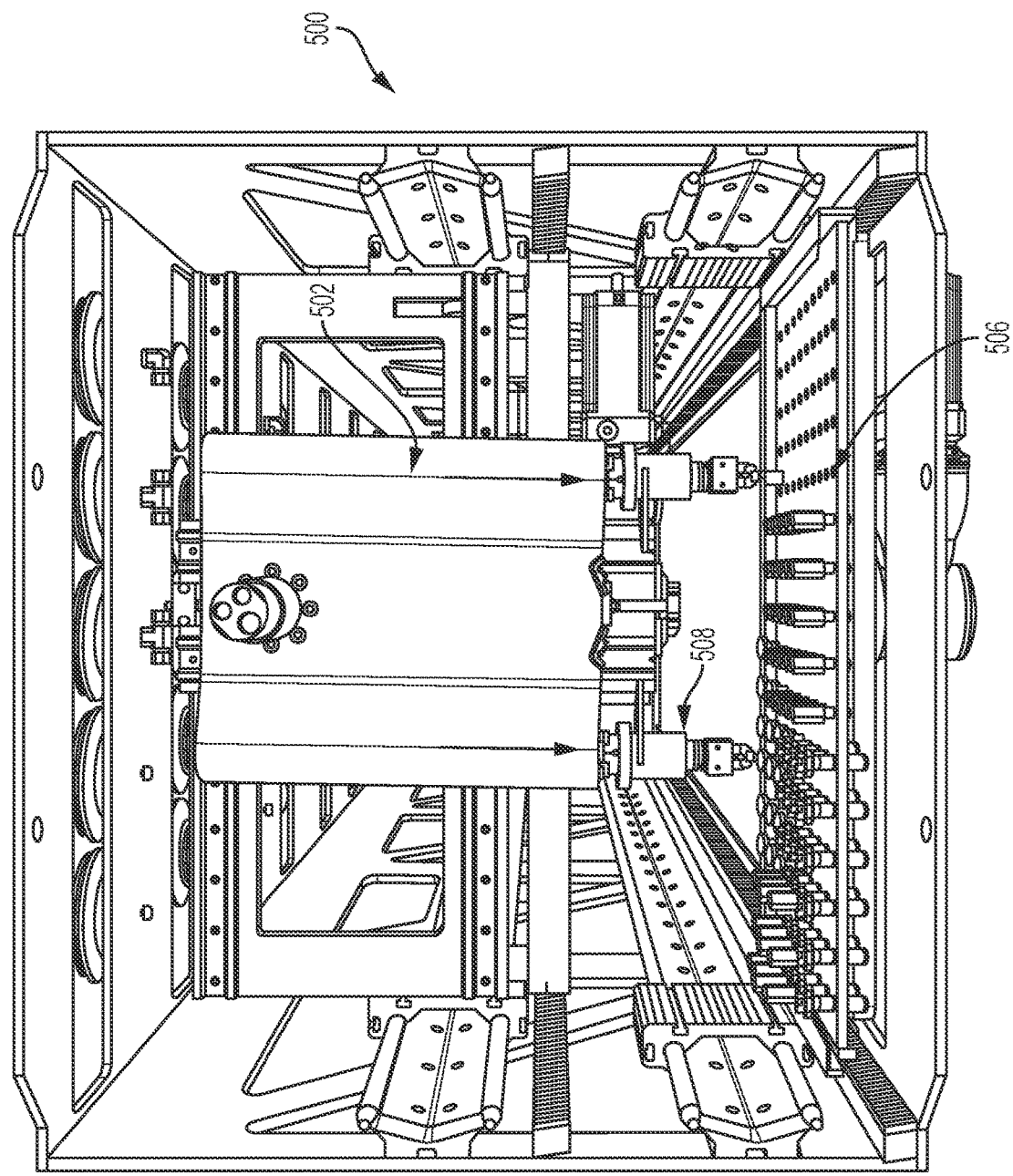

To install a tool 252 in a tool drive assembly 504, and with reference to FIGS. 34-36, assume that a tool module is in an initial position facing a baffle plate (e. g. so that the open ends of the tool chucks at the end of the tool drive assemblies face toward the baffle plate). Through control of motors 1482/512 and linear sliders 246, 248, as described above with respect to FIGS. 18, 30, and 48 via user interface 1460, processing circuitry 1450, and device interface 1462, the operator provides instructions to the processing circuitry through the user interface that causes the programming and processor to control the motors to rotate tool module 502 clockwise or counter clockwise, as depicted in FIG. 33, so that the tool assemblies now face tool changer rack 506, as depicted in FIG. 34. As indicated above, the camera(s) in the tool module housing are active during this movement, so that the operator can see where the tool module is facing at user interface 1460 as the operator executes the operation. Generally, the work area in front of the camera may be sufficiently lit to enable the user to see the work area. In some embodiments, one or more lights, such as LEDs, may be provided in association with the camera to illuminate the area and may be activated with the activation of the camera, such as by operation of the user interface. Referring also to FIGS. 30, 32, and 33, the operator rotates tool module 502 180 degrees about theta axis 507, via use of the control system to rotate motor 512 from the working position facing a baffle plate to the tool change position facing tool changer rack 506, as in FIG. 34. Where such rotation would cause the tool module to strike other system components or the sidewalls of baffle bolt repair platform 500, the operator may also change the tool module's positions along X axis 244 and/or Z axis 242 (FIG. 29) through appropriate instructions entered through the user interface, causing the processing circuitry (via the device interface) to drive positioning motors to move the tool module in an X and/or Z direction along linear sliders 246 and/or 248, thereby moving the tool module away from the potential obstruction. Furthermore, once the operator rotates the tool module so that the tool chucks face the tool changer rack, the operator can also make additional X/Y adjustments through control of the X axis and/or Y axis positioning motors and linear sliders 246, 248 to finally align the open end of the chuck with the desired tool secured in the rack, as indicated at FIGS. 35 and 36. The operator may verify alignment of the open end of the chuck and the desired tool visually by the camera image of the end of the tool assembly and/or by automatic or manual comparison of the resolver feedback position and the predetermined resolver position associated with the desired tool based on the position calibration.

Once the operator aligns one or the other tool drive assembly axes 511 with the center axis of the tool which the operator wishes to secure in the chuck, the operator actuates a control option at user interface 1460 (FIG. 48), causing the user interface to generate a command to the processing circuitry to actuate Z axis positioning motor associated with linear slider 246 (FIG. 18) to drive the tool drive module forward in the Z direction, toward the tool changer rack. When the chuck moves forward sufficiently that the chuck receives the selected tool in its central bore, a sensor at the tool drive assembly senses a resistance to the tool drive assembly's continued forward motion, which is reflected in the sensor's signal back to processor 1452. Upon receiving this signal, the processor deactivates the forward movement of positioning motor associated with linear slider 246, stopping the tool module's forward motion. The operator then executes a second instruction through user interface 1460, causing the processing circuitry to actuate the air drive valve to the chuck so that the chuck closes on the tool. As described below in reference to FIG. 40, the tool may have a floating head, which allows the tool drive motor to fully engage the tool and allow for over travel without damaging the tool, the tool module, or the tool changer rack. Additionally, the travel distance of the tool may be limited to approximately the longitudinal travel of the floating head. The chuck having gripped the tool, the operator issues an instruction through the user interface for the tool module to move away from the tool changer rack, so that processor 1452 controls positioning motor associated with linear slider 246 to move in the opposite Z axis direction. The chuck's grip on the tool overcomes the detent's grip on the tool, and the tool module thereby removes the tool from the tool changer rack. Re-insertion of the tool occurs in a reverse sequence. The operator controls the tool module's position so that the tool drive assembly axis 511 (FIG. 30) is aligned with an available open tool changer rack aperture axis and then controls tool module's movement in the forward Z-axis direction until the chuck/tool module pushes the tool into the open aperture. The operator then issues a command through the user interface to open the chuck, causing the processor to actuate a valve that releases air pressure to the chuck. As the chuck is mechanically biased to an open position, release of the closed-biasing pressurized air causes the chuck to open. The operator then issues an instruction via the user interface to move the tool module away from the tool changer rack. As the tool module moves back, the detent in the tool changer rack holds the tool, separating the tool from the chuck. The operator utilizes the tool module to remove new replacement baffle bolts from the tool changer rack, using a process similar to that for retrieving a tool.

In some example embodiments, one or more of these steps may be automated. For example, instead of issuing individual commands for the tool module to execute each of the movements described above, the operator enters a command option using the user interface to "get tool no. ##" or "replace tool no. ##," and the processing circuitry 1450 may control all of the tool module movements and chuck activities to accomplish that instruction. The processing circuitry may base the movements on the known distances and the position calibration discussed above, such that the processing circuitry drive the tool module and compares the dynamic resolver feedback position to the resolver position determination for the tool 252, baffle bolt 106, or other component. The processing circuitry 1450 may perform the positioning of the tool drive assembly 504 to align the chuck with the desired tool location in the X/Y axis and/or positioning of the tool drive assembly 540 in the Z axis to remove or replace a tool 252 or baffle bolt 106, which may also include automatic operation of the chuck.

Having secured a tool in the chuck, the operator, by issuing similar commands to the processing circuitry through the user interface, controls tool rotation motor 512 (FIG. 30) to rotate the tool module 180 degrees (or 90 degrees, if working on a side baffle plate) so that the chuck and tool face a baffle plate having baffle bolts in need of replacement. Relying on the camera images and using commands via the user interface as described above, the operator moves the tool module in directions along the X and Y axes to align one or the other tool drive assembly axes 511 (FIG. 30) with the longitudinal axis of a baffle bolt installed in the baffle plate. The operator then provides an instruction via the user interface to activate the tool motor 505 (FIG. 30), thereby causing the motor to rotationally drive the chuck and tool, and to actuate positioning motor associated with linear slider 246 to move the tool module forward in the Z axis direction so that the now-rotating tool engages the baffle bolt. Assuming that a bore hole has previously been drilled using an EDM drill head, and that the tool is a screw extractor, e. g. an "easy out" 252B (FIG. 18), this causes the easy out tool to bore into the bolt until the flutes of the easy out engage and lock into the side of a hole in the bolt, causing the bolt to rotate out of the bolt hole. Once the easy out tool starts to rotate out of the bolt hole, the operator issues an instruction, via user interface 1460, to the processing circuitry that causes the processing circuitry to move the tool module rearward in the Z axis direction.

Having removed the bolt from the baffle plate, the operator issues instructions via user interface 1460 (FIG. 48) to motor 512 (FIG. 30) to rotate the tool module back 180 degrees, or 90 degrees, depending up on the baffle plate upon which the module works, so that the chuck and the now-removed baffle bolt face tool changer rack 506. The operator then issues instructions via the user interface to control the operation of positioning motors associated with linear sliders 246 and 248 (FIG. 18) to move the tool module in the X and Y directions until the tool drive axis 511 (FIG. 30) for the tool drive assembly at which this chuck and tool are disposed is aligned with a spent baffle bolt port 522 (FIG. 31), e. g. an aperture extending through tool changer rack 506. A spent bolt chute and receptacle are attached to the spent baffle bolt port 522 on a side of the port opposite the tool module to receive a spent bolt, as discussed in more detail below. Having aligned the tool with the spent baffle port, the operator issues a control command through the user interface, causing positioning motor associated with linear slider 246 to actuate and drive the tool module forward until the chuck, tool, and spent bolt extend through the aperture and into the spent bolt chute, as indicated by the image provided from the camera. The operator then issues an instruction via the user interface for the processing circuitry to open the chuck, causing the tool and the spent bolt to fall into the spent bolt chute 526. In some example embodiments, the spent baffle bolt port 522 may include a grommet, ratcheted lip, or the like which allows the spent baffle bolt to pass and provides resistance to the baffle bolt withdrawing. This resistance provides pressure to the baffle bolt and/or tool to remove them from the chuck and fall into the spent baffle bolt chute 526. Alternatively, the operator issues a control command through the user interface, causing positioning motor associated with linear slider 246 to actuate and drive the tool module forward until the chuck, tool, and spent bolt extend through the aperture and into the spent bolt chute. The operator issues a control command through the user interface to cause the chuck to open, and then repositions the tool module such that the spent baffle bolt and/or tool are at least partially obstructed by a perimeter of the sent baffle bolt port 522. The operator then issues a control command through the user interface, causing positioning motor associated with linear slider 246 to actuate and drive the tool module backward away from the tool rack, which may cause the spent baffle bolt and/or tool to be pulled out of the chuck by the perimeter of the spent baffle bolt port and fall into the spent baffle bolt chute.

Spent baffle bolts 106 may also be stored in tool changer rack 506, temporarily. Similar to a tool change procedure, as detailed above, the operator may control the tool module to align the corresponding tool drive axis 511 (FIG. 30) with the center axis of an open bolt aperture in the tool changer rack. The operator then controls the positioning motor associated with linear slider 246 to move the tool module forward in the Z axis direction until the spent bolt is inserted into the aperture and secured by its detent. At this point, the operator instructs the system to open the chuck, thereby releasing the bolt and, in some instances, the easy out tool 252B (FIG. 18). The operator then withdraws the tool module in the reverse Z direction, moves the tool module in the X and Y directions to secure the next tool, and the process repeats. Additional detail regarding disposal of spent baffle bolts 106 is provided below, with reference to FIGS. 39A and 39B.

Referring to FIGS. 37, 38A, 38B and 48, a single tool changer rack 506 may be used to provide tools and replacement baffle bolts to multiple tool modules 502 operating on a single baffle bolt repair platform 500. As described above, in certain embodiments, the tool rack changer 506 is maintained in a single position on baffle bolt repair platform 500, and the operator manipulates the tool modules on baffle bolt repair platform 500 to move to the tool changer rack. In addition, tool changer rack may be movable on baffle bolt repair platform in Y axis direction 524 parallel to the tool module Y movement axis 245. For this purpose, a tool rack positioning motor 516 is fixedly disposed on an outward surface of rack cradle 514. Tool rack positioning motor 516 is similar to the positioning motors discussed above and may comprise, for example, an air motor, an electronic servo motor, an electronic step motor, or the like. Positioning motor 516 rotates one or more drive gears that travel along a rack 518 coupled to baffle bolt repair platform 500. In some example embodiments, the one or both sides of rack cradle 514 may include a U-shaped guide that partially surrounds the rack, such as contact guides on either side of the rack, to provide stability as the rack cradle (in which the tool rack changer is disposed, as described above) is driven in either vertical direction in tool changer Y axis 524. To move the tool changer rack and the rack cradle, the operator selects a control option provided at user interface 1460, causing the user interface to send an instruction signal to processing circuitry 1450, in turn causing the processing circuitry to control positioning motor 516 (indicated at 1482 in FIG. 48) to move the rack cradle and tool rack changer in the desired direction indicated by the user interface instruction.

FIGS. 38A and 38B illustrate an example baffle bolt repair platform including a first tool module 502, e. g. an upper tooling module, and a second tool module 502, e. g. a lower tooling module. Rack cradle 514 may service both the upper and lower tool modules 502. Thus, the user, via the control system, may drive the tool rack vertically in the tool changer Y axis 524by tool rack position motor 516 to be approximately aligned with a tool module 502 for tool installation and/or tool changes. As discussed above, upper and lower tool modules 502 may be driven vertically, such as by tool module positioning motor 525, in the tool module Y axis 245 to access baffle bolts 106 of a baffle plate 104 and/or the tool changer rack 506. Accordingly, once the operator has moved the tool changer rack to a position proximate one of the two tool modules 502, the operator then controls the tool module's position, in a manner as discussed above, to align one of the tool drive assembly axes with a tool or replacement bolt axis in order to then secure the tool or replacement bolt with the corresponding tool drive assembly's chuck, as discussed above.

FIG. 39A illustrates an example baffle bolt chute 526 and spent bolt container 408. Baffle bolt chute 526 is coupled to tool changer rack 506 and/or rack cradle 514, such as by rivets, welding, screws, or the like, so that an upper opening of chute 526 is immediately below spent baffle bolt port 522 on the side of the tool changer rack opposite the tool drive assemblies. A vertical extension may be provided on the spent baffle bolt chute 526 to mount a camera for visual verification of the spent baffle bolt entering the spent baffle bolt container 408. The camera's field of view encompasses the spent baffle bolt chute 526 and the opening to container 408. The camera communicates with processing circuitry 1450 and device interface 1462, as indicated in FIG. 48. Prior to depositing a spent bolt (and, possibly, a tool) into container 408, the operator activates the camera via interface 1460 and processing circuitry 1450, which transmits a signal to the camera responsively to the input from the interface. Receiving the request signal, the camera begins acquiring video images or sequential still images and transmitting the images up to processing circuitry 1450. Processing circuitry 1450, in turn, provides the images to user interface 1460, which displays the images for the user on a display screen. Accordingly, upon depositing the spent bolt in the container, the operator may view and examine the bolt and record information concerning its condition for purposes of replacement and system repair. The operator may take such notes manually or key or otherwise record the notes through the user interface and the processing circuitry for storage at storage device 1454.

Spent bolt container 408 is secured to a bottom cross member of baffle bolt repair platform 500. Thus, as the operator moves the tool changer rack and rack cradle upward and downward within the baffle bolt repair platform, baffle bolt chute 526 moves away from and toward the spent bolt container, respectively. In the view illustrated in FIG. 39A, the tool changer rack is at a low position within the baffle bolt repair platform, so that the lower end of the baffle bolt chute extends into the interior volume of the spent bolt container. Chute 526 is open at the bottom, and so when spent bolts and tools are deposited in the chute's top opening, they fall through the chute and into the container by the force of gravity. When the operator moves the tool changer rack and rack cradle upward, so that the chute moves out of the container volume, spent bolts inserted into the chute nonetheless still fall into the container, as the chute remains directly above the container. To deposit a spent bolt in the chute, the operator drives a tool module 502, via the control system as discussed above, so that one of the tool module's tool drive assemblies is aligned with the spent baffle bolt port and the tool assembly's chuck, tool, and spent bolt extend through the spent baffle bolt port, directly above the chute's open upper end. The operator, again through the control system, operates the chuck to release the tool and the spent bolt, so that both fall down into the chute and, therefore, into the container, as described above. In some embodiments, the upper opening of spent baffle bolt chute 526 may be flared or include a widened opening to act as a funnel to assist spent baffle bolts 106 (FIG. 3B) and tools in entering baffle bolt chute 526 and preventing or limiting the spent bolts from missing the chute. In some embodiments, spent bolt chute 526 may include a discharge valve or shutter 527 to prevent a spent baffle bolt from being discharged through the spent bolt chute when the chute does not extend into or above a spent bolt container 408. The operator may control discharge valve 527 via actuation of a servo motor, air motor or the like, via the control system (e.g. through user interface 1460, processing circuitry 1450 and device interface 1462, FIG. 48) or through a mechanical lever attached to the valve that is actuated by the physical engagement of the spent bolt chute 526 with the spent bolt container 408.

As should be understood, spent bolts and tools, and spent nuclear fuel, may be stored by submersion in a pool of water. For this purpose, and referring also to FIG. 39B, spent bolt container 408 is sized so that any and all cross sectional perimeters of container 408 fit within the cross sectional inner perimeter of spent fuel container 528 and have sufficient height to accommodate two or more spent bolt containers 408. Thus, an operator may deposit spent baffle bolts from the embodiment of FIG. 39A by removing container 408 from its position on bolt repair platform 500 and depositing container 408, with its spent bolts and tools, into the top of container 528, so that containers 408 are stored within container 528 in the spent fuel pool. The movement of containers 408 may be performed by an equipment pole, crane, or other suitable method.

FIG. 40 illustrates a tool 252E that may be used in conjunction with tool changer rack 506 (FIGS. 34-36) to grip and remove replacement baffle bolts 106 from the tool changer rack. Tool 252E includes a rear, generally cylindrical portion 531 that is received within a central bore of a chuck 508 in FIG. 30. The collet or jaws of the chuck engage the cylindrical portion and circumferential depressions 533 therein so that the tool is rotationally and axially (with respect to the tool body axis) fixed to the chuck. Baffle bolt insertion tool 252E includes a drive head (not shown), such as a hex drive, square drive, triangle drive, or the like having a geometry so that the drive head is received by a complementary-shaped bolt head of baffle bolt 106. When the operator controls the tool drive assembly, as discussed above, to insert the tool's forward end into a baffle bolt 106 that is secured in one of the through-holes in the tool changer rack, the tool's drive head extends into the bolt head so that clips 530 also pass over the baffle bolt's top end and engage an outer circumference of the bolt head's outer surface. Clips 530 are flexible and, when not gripping a bolt, normally extend inward of a periphery defined by the bolt head's outer circumference. Thus, the bolt body pushes the clips radially outward (with respect to an axis of the tool and the aligned bolt) as the tool drive assembly pushes tool 252E into the bolt head. The clips, therefore, retain the bolt on the tool by friction with sufficient force that, when the operator moves the tool drive assembly rearward away from the tool changer rack after the tool's engagement of the bolt, overcomes the resistance force exerted by the tool changer rack's detent on the bolt. Thus, the tool drive assembly and tool 252E remove bolt 106 from the tool changer rack. Alternatively, the baffle bolts may be preloaded, e. g. inserted into the tool 252E, and then inserted into the tool rack, such that the tool drive assembly engages the cylindrical portion 531, to remove the tool and baffle bolt, similar to removing other tools, as discussed above. As also described above, the operator may then control the tool module to move the tool drive assembly into alignment with a threaded baffle bolt hole in a baffle plate 104 (FIGS. 1, 2, and 3A) and then move the tool drive assembly axially forward (with respect to the bolt's axis) until a threaded lower end 535 of baffle bolt 106 is received in the threaded hole. Again through the control system (FIG. 48), the operator provides an instruction through the user interface that causes the processing circuitry, through the device interface, to actuate drive motor 232 (FIG. 19) to rotationally drive spline drive 254 (FIG. 18) or to actuate tool motor 505 to rotationally drive chuck 508 (FIG. 30), tool 252E, and bolt 106 in a rotational direction that threads the bolt into the baffle plate hole. The mating geometry between the tool's drive head and the complementary bolt head allows the tool drive assembly and the tool to rotationally drive the bolt into threaded connection with the baffle plate in the hole. Once the bolt is threaded into position, the operator controls the tool module to move axially rearward, away from the baffle bolt. The bolt's threaded connection in the baffle plate hole is stronger than the frictional force exerted by clips 530 onto the bolt's periphery, and so tool 252E moves away from the bolt, causing clips 530 to pass back over the bolt head to disengage from the bolt.

In some example embodiments, the tool, such as tool 252E, may include a floating head 537. The floating head 537 may be forward biased by a spring 535 such that the floating head allows limited longitudinal travel against the spring 535 to prevent damage to the baffle plate 104, tool 252, tool module 502, or the like. The floating head 537 may also include an outer housing operably coupled to the tool head and a complementary inner housing operably coupled to the cylindrical portion 531. The outer housing and inner housing may be triangle shaped, square shaped, rectangular, hexagonal, or other suitable shape that resists rotation of the outer housing about the inner housing.

FIG. 41 illustrates a view of tool module 502 through bolt access aperture 212 according to an example embodiment. As discussed above, the lateral offset of tool drive assemblies 504 enables tools 252 to reach baffle bolts 106 at the furthest extension of bolt access aperture 212, without the tool module's rotation about Z axis 242 (FIG. 29), e. g. flipping the tool module upside down. In some embodiments, such as the embodiment depicted in FIG. 41, suction cup attachments 204 may be substantially circular.

Figure 42:
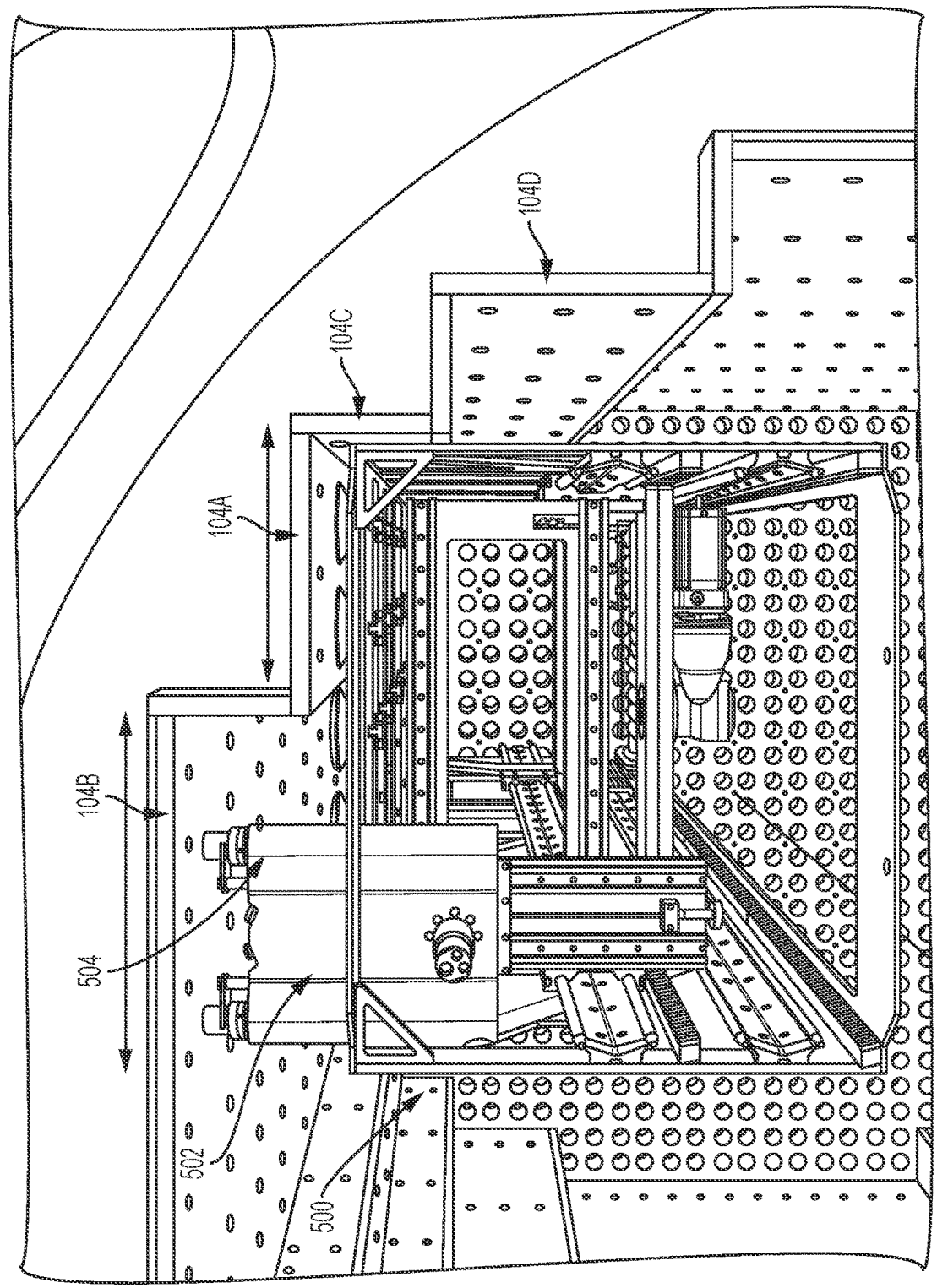

FIG. 42 illustrates an example embodiment of a tool module working an offset baffle plate 104 according to an example embodiment. Similar to the embodiments of FIG. 12, the baffle bolt repair platform 500 may be installed on a short baffle plate 104A, such as by suction cup attachments 204, as depicted in FIG. 41. The tool module 502 may be driven by the positioning motors in X axis 244 and Z axis 242 (FIGS. 15 and 29) to work bolts on the short baffle plate and the offset baffle plate 104B. The tool module 502 may be driven forward in the Z axis, toward the offset baffle plate 104B, and at least partially through bolt access aperture 212 to position the tool dive assembly 504 to work the offset baffle plate 104B.

Figure 44B:
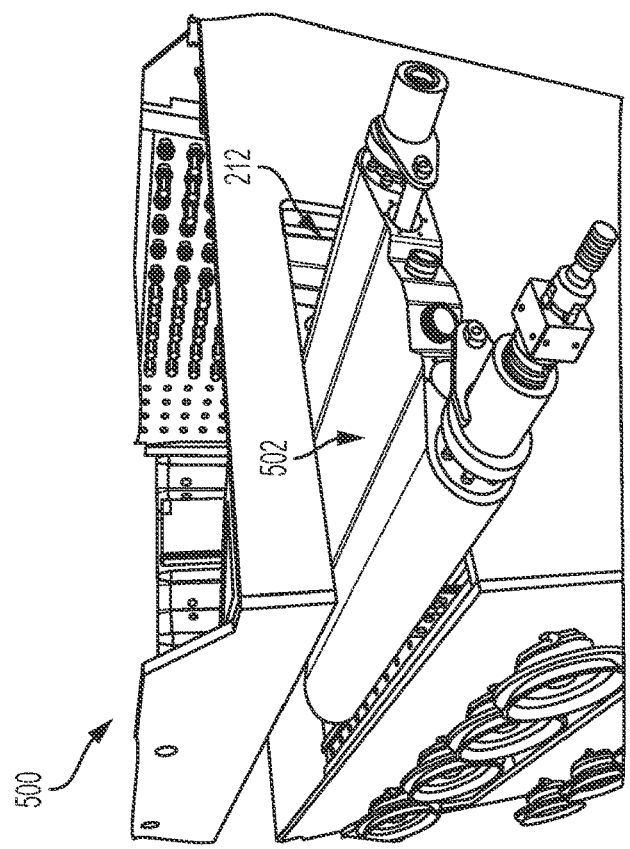
Figure 44A:
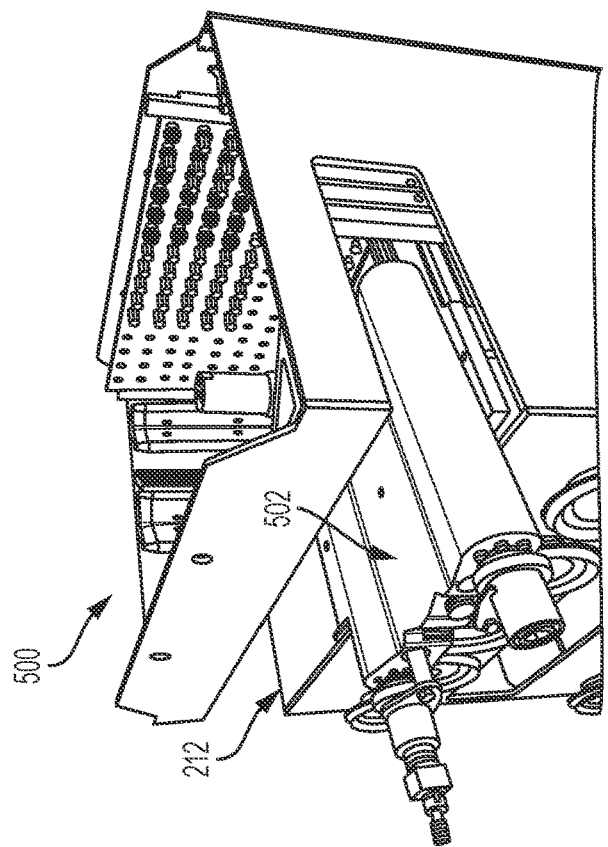
Figure 45:
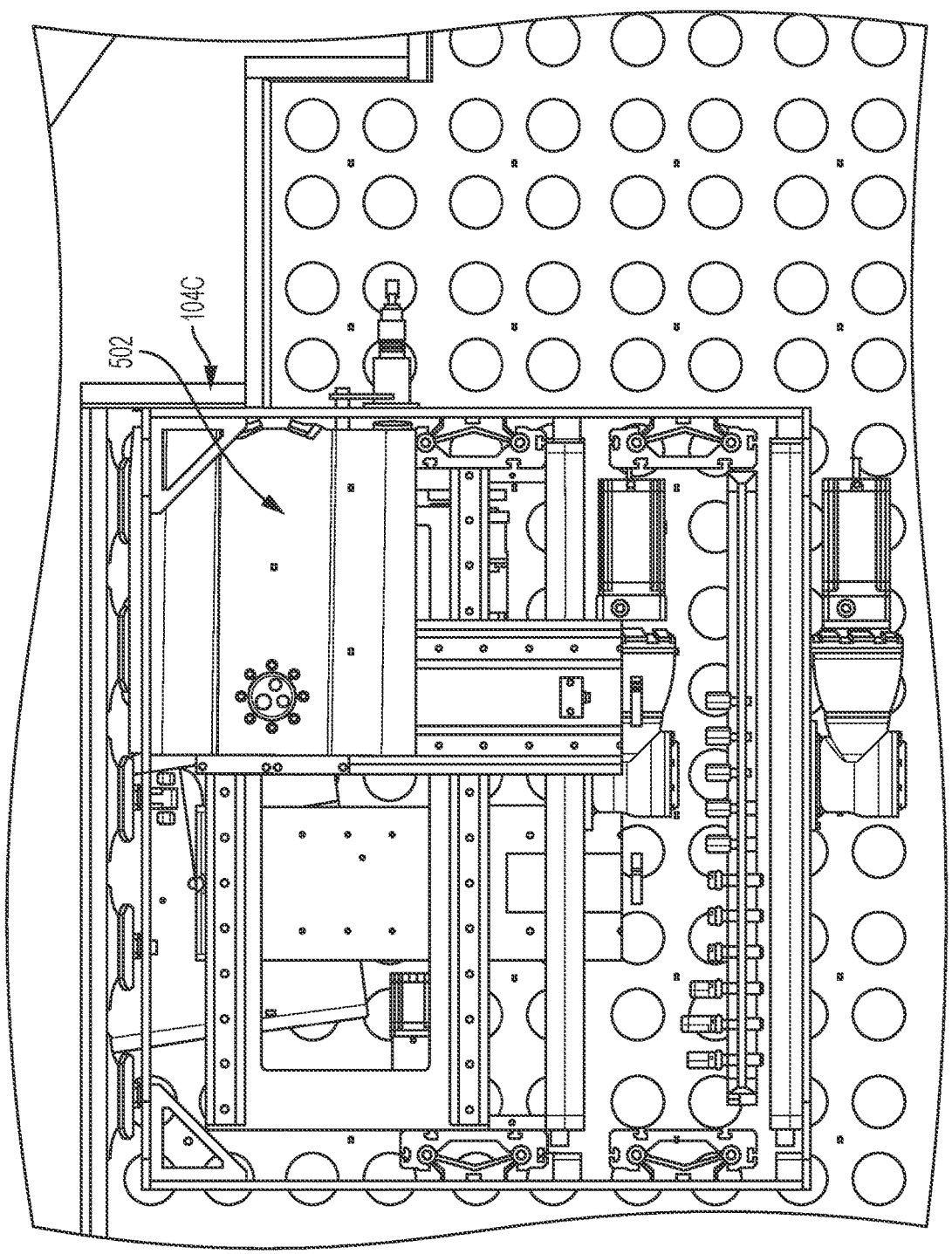

In some embodiments, such as the embodiment depicted in FIG. 43, the bolt access aperture may extend across the working face and at least partially around the side of baffle bolt repair platform 500. The extension of bolt repair aperture 212 to the side of bolt repair platform 500 may allow the tool module 502 to be rotated 90 degrees to work baffle bolts on a side baffle plate 104C (FIG. 42), e. g. a baffle plate abutting a side of baffle bolt repair platform 500. Similar to working the offset baffle plate 104B (FIG. 42), the tool module may be driven in X axis 244 (FIG. 15) at least partially through the side facing portion of the bolt access aperture 212 to work a side offset baffle plate 104D (FIG. 42). FIGS. 44A and 44B illustrate tool module 502 extended through the forward face of the baffle bolt repair platform 500 to work baffle bolts 106 on an offset baffle plate 104B and a tool module extended through the side face of baffle bolt repair platform 500 to work baffle bolts on a side offset baffle plate 104D. FIG. 45 illustrates a top down view of a tool module 502 rotated to work a side baffle plate 104C.

FIG. 46 illustrates a baffle bolt repair platform 500 including a plurality of wheels 532 to enable movement of the baffle bolt repair platform across the core bottom 534. A foreign material exclusion (FME) barrier, such as a rigid polymer or metal sheet, may be placed over the core bottom 534 to protect the core bottom from damage or abrasion from wheels 532 or foreign material entering one or more of the flow holes in the bottom of the core basket. The wheels may be a mecanum wheel, such as mecanum wheel 532 depicted in FIG. 47, which may enable movement of the baffle bolt repair platform in any direction. Wheels 532 may be electrically driven, pneumatically driven, hydraulically driven, or the like, such as by the control system. In embodiments including wheels, the weight of baffle bolt repair platform 500 may be supported by the wheels, and baffle bolt repair platform 500 may not include not include the rollers 202. Omnidirectional movement of baffle bolt repair platform 500 may reduce crane operations to initial placement of baffle bolt repair platform 500 in the core and final removal of baffle bolt repair platform 500 at the end of the repair. Each of the intermediate movements of baffle bolt repair platform 500, to various repair positions, may be performed by operation of wheels 532.

Example Control System

FIG. 48 illustrates a control system 1400 configured for operation of the baffle bolt repair platform. Control system 1400 may be provided entirely at the operation station 400 (FIG. 24) or may be a distributed system operating a plurality of devices in a plurality of locations, including remote locations outside of the reactor compartment to limit exposure. In an example embodiment, the control system 1400 includes processing circuitry 1450 that is configured to perform application execution and other processing and management services. In one embodiment, processing circuitry 1450 may include a storage device 1454 and a processor 1452 that are in communication with or otherwise control a user interface 1460 and a device interface 1462. As such, processing circuitry 1450 may be embodied as a circuit chip (e. g. an integrated circuit chip) configured (e. g. with hardware, software or a combination of hardware and software) to perform operations described herein. However, in some embodiments, processing circuitry 1450 may be embodied as a portion of a server, computer, laptop, workstation, or even one of various mobile computing devices. In situations where processing circuitry 1450 is embodied as a server or at a remotely located computing device, user interface 1460 may be disposed at another device (e. g. at a computer terminal or client device) in communication with processing circuitry 1450 via device interface 1462 and/or a network 30.

In an example embodiment, storage device 1454 includes one or more non-transitory storage or memory devices such as, for example, volatile and/or non-volatile memory that may be either fixed or removable storage device 1454 that store computer program instructions or the like that are executable by processor 1452, as well as data used by the processor in executing the instructions, to carry out various functions in accordance with example embodiments of the present invention as described herein. For example, storage device 1454 could be configured to buffer input data for processing by processor 1452. Additionally or alternatively, storage device 1454 could be configured to store instructions for execution by processor 1452. As yet another alternative, storage device 1454 may include one of a plurality of databases that may store a variety of files, contents or data sets. Among contents of the storage device 1454, applications may be stored for execution by processor 1452 in order to carry out the functionality associated with each respective application.

Processor 1452 may be embodied in a number of different ways. For example, processor 1452 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, processor 1452 may be configured to execute instructions stored in storage device 1454 or otherwise accessible to processor 1452. As such, whether configured by hardware or software methods, or by a combination thereof, processor 1452 may represent an entity (e. g. physically embodied in circuitry) capable of performing operations according to embodiments of the present invention while configured accordingly. Thus, for example, when processor 1452 is embodied as an ASIC, FPGA or the like, processor 1452 may be specifically configured hardware for conducting the operations described herein. Alternatively, as another example, when processor 1452 is embodied as an executor of software instructions, the instructions may specifically configure processor 1452 to perform the operations described herein.

User interface 1460 is in communication with processing circuitry 1450 to receive an indication of a user input at user interface 1460 and/or to provide an audible, visual, mechanical or other output to the user. As such, user interface 1460 may include, for example, a keyboard, a mouse, a joystick, a display, a touch screen, a microphone, a speaker, mobile device, or other input/output mechanisms. In embodiments where the control system is embodied at a server or other network entity, user interface 1460 may be limited or even eliminated in some cases. Alternatively, as indicated above, user interface 1460 may be remotely located.

Device interface 1462 may include one or more interface mechanisms for enabling communication with other devices and/or networks. In some cases, device interface 1462 may be any means such as a device or circuitry embodied in hardware, software, or a combination of hardware and software that is configured to receive and/or transmit data from/to a network and/or any other device or module in communication with processing circuitry 1450. In this regard, device interface 1462 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet, or other methods. In situations where device interface 1462 communicates with a network, the network may be any of various examples of wireless or wired communication networks such as, for example, data networks like a Local Area Network (LAN), a Metropolitan Area Network (MAN), and/or a Wide Area Network (WAN), such as the Internet. In some example embodiments, processing circuitry 1450 may be in communication with a probe management system 1470 and/or a bolt repair platform 1480 via device interface 1462.

Probe management system 1470 may include one or more tool conduit switches 1472, such as tool conduit switches 406 described in reference to FIGS. 24 and 26, and/or one or more probe pushers 1474, such as probe pushers 418 described in reference to FIG. 26. The user may operate user interface 1460 to cause the processing circuitry to actuate tool conduit switch 1472 to select a given portion of the tool conduit through which to drive the push-pull probe to and from a desired location, e. g. a tool conduit leading to the operating station, tool module, or baffle bolt container, such as by actuation of a hydraulic or pneumatic one or more valve or energization or deenergization of one or more relays or other suitable electronic switch mechanisms. The user may operate the user interface 1460 to cause processing circuitry 1450 to cause probe pusher 1474 to pay out or retract a probe, such as by actuating one or more pneumatic or hydraulic valves or energization or deenergization of one or more relays or other suitable electronic switch mechanisms, which in turn causes a motor to turn. The motor may be an air motor, hydraulic motor, electric motor of the like.

Bolt repair platform 1480 may include one or more bolt repair platforms, such as bolt repair platform 200 as discussed in reference to FIGS. 6-22 and/or bolt repair platform 500 as discussed in reference to FIGS. 28-46. The bolt repair platform 1480 may include vacuum pump/valves 1481, one or more of positioning motors 1482, tool modules 1484, cameras 1486, position sensors 1487, discharge valves 1488, and/or wheels 1489. The user may operate the user interface to cause the processing circuity to cause the vacuum pump and one or more vacuum control valves apply a vacuum force to vacuum cup attachments 204, discussed in reference to FIGS. 6 and 41. The vacuum force may grip a baffle plate to hold bolt repair platform in a position relative to the baffle plate. When it is desired to move bolt repair platform 1480 to a different position, the user may interact with the user interface to cause the vacuum pump and/or vacuum control valves to release the vacuum force, thus releasing the vacuum cup attachments from the baffle plate.

The user may operate the user interface 1460 to cause the processing circuitry 1450 to cause one or more positioning motors, such as tool module positioning motor 525, as discussed in reference to FIGS. 38A and 38B, to move a tool module 1484, such as tool module 206 (FIG. 9) or tool module 502 (FIG. 28) to a desired location. Positioning motors 1482 may include one or more of air motors, hydraulic motors, electronic servo motor, electronic step motors, or the like configured to move the tool module in the any of the X axis 244, Y axis 245, coarse Z axis 242, fine Z axis, and theta axis 507 (FIGS. 15 and 29). In some example embodiments, positioning motors 1482 may also include one or more tool rack positioning motors, such as tool rack positioning motors 516, as discussed in reference to FIGS. 38A and 38B, configured to drive the tool rack vertically between tool modules.

The user may operate user interface 1460 to cause the processing circuitry to operate tool modules 1484 in the desired manner. Processing circuitry 1450 may cause a tool drive motor, such as tool drive motor 232 as discussed in reference to FIG. 19 or tool motor 505 as discussed in FIG. 30 to rotate a tool held by a spline drive or a tool drive couple chuck. Tool drive motor 232 or tool motor 505 may be an air motor, a hydraulic motor, an electronic servo motor, an electronic step motor, or the like. In an example embodiment, processing circuitry 1450 may cause a tool drive coupler chuck, such as tool drive coupler chuck 508 as discussed in reference to FIG. 30, to shift between an open state to accept tools 252 and a closed state to retain a tool captured by the tool coupler chuck, such as by actuation of a pneumatic or hydraulic value. Additionally or alternatively, processing circuitry 1450 may cause the tool coupler, such as tool coupler 207 as discussed in reference to FIG. 16, to engage or release tool module 1484 from a tool platform. In some embodiments, the processing circuitry 1450 may apply and remove hydraulic pressure from the spline position lockout 270, as discussed above in reference to FIG. 23, to lock or release the spline drive 254, by opening or shutting one or more valves.

Control system 1400 may be configured to receive image data from one or more cameras 1486 associated a tool module 1484, such as camera 231 as discussed in reference to FIG. 18, a camera associated with the spent bolt container 408, as discussed in reference to FIG. 24 or camera 510 as discussed in reference to FIG. 30. Processing circuitry 1450 may cause the image data to be displayed on one or more displays associated with user interface 1460, such that the operator may monitor the position and operation of one or more tool modules. Additionally or alternatively, one or more cameras 1486 may be mounted or positioned about the reactor core or bolt repair platform 1480 to provide the operator with additional or different vantage points of the operation of the tool module and/or bolt repair platform.

Control system 1400 may also be configured to receive sensor data from one or more sensors 1487 associated with the baffle bolt repair platforms 1480 and/or tool modules 1484. The sensors 1487 may include position sensors, such as resolver position feedback sensors 234 as discussed in reference to FIG. 19, torque sensors, temperature sensors associated with a tool module or motor, or the like. Processing circuitry 1450 may cause the sensor data or data indicated by the sensor data to be displayed on one or more displays of user interface 1460.

The operator may operate user interface 1460 to cause processing circuitry 1450 to actuate a discharge release valve 1488, such as discharge valve 527 as discussed in reference to FIG. 39, associated with a spent bolt chute, to open or shut. Opening discharge release valve 1488 may in turn release a spent baffle bolt into a baffle bolt container or retain the spent baffle bolt within the spent bolt chute, respectively. The discharge valve 1488 may be actuated by pneumatic pressure, hydraulic pressure, electronic servo motor, or the like.

The operator may operate the user interface 1460 to cause processing circuitry 1450 to drive one or more wheels, such as wheels 532 as discussed in reference to FIG. 46. Wheels 1489 may be electrically driven, pneumatically driven, hydraulically driven, or the like and may be mecanum wheels enabling movement of the baffle bolt repair platform 1480 in any direction.

In some example embodiments, the bolt repair platform may be further configured for optional modifications. In this regard, for example, the bolt may be a baffle bolt of a reactor internal support structure. In an example embodiment, repairing the bolt comprises extraction and replacement of the bolt. In some example embodiments, the bolt repair platform also includes a plurality of vacuum cups configured to maintain the bolt repair platform in position relative to a baffle plate during repair of the bolt. In an example embodiment, the bolt access apertures are configured to enable access to edge baffle bolts. In some example embodiments, the at least one tool module includes two tool modules configured to repair bolts simultaneously. In an example embodiment, the two tool modules are installed with the same orientation. In some example embodiments, the two tool modules are installed with opposing orientation. In an example embodiment, the at least one tool module is configured to be removably coupled to the vertical drive assembly. In some example embodiments, the at least one tool module comprises a hollow spline drive including a bore hole operably coupled to a tool conduit, and a tool may be installed or removed from the spline drive through the bore hole and the tool conduit, without moving the tool module. In an example embodiment, the bolt repair platform also includes a push-pull probe configured to move a tool through the tool conduit to the spline drive or an operator work station. In some example embodiments, the push pull probe is further configured to move an extracted bolt from the drive spine to a spent bolt container. In an example embodiment, the tool conduit also includes an integrated decontamination system. In some example embodiments, the tool module also includes a tool drive motor and drive gears configured to transfer rotational force generated by the tool drive motor to the spline drive. In an example embodiment, the spline drive includes a plurality of engagement slots, and the tool module also includes a bearing drive coupler. The bearing drive coupler is configured to transfer rotational force from the drive gears to the spline drive. In some example embodiments, the spline drive includes a slope at a leading edge of at least a portion of the engagement slots, and the slope is configured to align the bearing drive coupler with the engagement slots. In an example embodiment, the tool module also includes a spline position lockout configured to center the drive spine in a tool axis. In some example embodiments, the spline position lockout is hydraulically or pneumatically actuated. In an example embodiment, the bolt repair platform also includes at least one roller configured to engage an edge of a baffle plate to enable lateral movement of the bolt repair platform. In some example embodiments, the bolt repair platform also includes a linear slider configured to enable lateral movement of a tool operably coupled to the at least one tool module. In an example embodiment, the bolt repair platform is configured to enable simultaneously deployment of a plurality of bolt repair platforms within a reactor internal structure. In an example embodiment, the bolt repair platform also includes a push pull probe a conduit switch configured to move a tool or an extracted bolt through the tool conduit and a conduit switch configured to align the push probe to move through the conduit to the spline drive, operator station, or spent bolt container. In some example embodiments, the tool module comprises two tool drive assemblies. In an example embodiment, the two tool drive assemblies are disposed on opposite sides of the tool module. In some example embodiments, the tool module also includes at least one positioning assembly configured to move the tool module in a horizontal plane. In an example embodiment, the at least one positioning assembly include a first positioning motor configured drive the tool motor along a first linear bearing and a second positioning motor configured to drive the tool module along a second linear bearing. The first linear bearing is disposed perpendicularly to the second linear bearing. In some example embodiments, the at least one positioning assembly includes a rotation motor configured to rotate the tool module in the horizontal plane. In an example embodiment, the rotation motor is configured to rotate the tool module at least 180 degrees. In some example embodiments, the vertical drive assembly includes a working face and two side faces disposed on opposite sides of the working face. The bolt access apertures are at least partially disposed on a side face. In an example embodiment, the at least one positioning assembly includes an air motor. In some example embodiments, the tool module includes a camera configured to monitor a tool driven by the tool module. In an example embodiment, the camera is radiation hardened. In some example embodiments, the tool module includes a tool drive coupler chuck configured to releasably engage one or more tools. In an example embodiment, the bolt repair platform also includes a tool changer rack configured to releasably retain one or more tools or bolts. In some example embodiments, the bolt repair platform also includes a tool changer vertical drive assembly configured to raise and lower the tool changer rack. In an example embodiment, the bolt repair platform also includes a spent bolt chute configured to receive a bolt and guide the bolt to a spent bolt container. In some example embodiments, the tool changer rack includes a spent bolt port vertically aligned with the spent bolt chute configured for the bolt to pass through the spent bolt port to be discharged into the spent bolt container through the spent bolt chute. In an example embodiment, the bolt repair platform also includes a plurality of wheels configured to support the bolt repair platform. In some example embodiments, the plurality of wheels are further configured to drive the bolt repair platform in one or more directions. In an example embodiment, the plurality of wheels are configured for omnidirectional movement. In some example embodiments, the plurality of wheels are pneumatically driven. In an example embodiment, the plurality of wheels include mecanum wheels.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A bolt repair platform for repairing a bolt disposed in an internal support structure of a nuclear reactor vessel, comprising:
   a frame; and
   a tool module comprising
      a tool having a first end configured to rotationally engage a bolt and a second end,
      a motor-driven rotary driver movably mounted on the frame, wherein the rotary driver defines a distal end thereof that is configured to retain the second end of the tool so that, when actuated, the rotary driver rotationally drives the tool, and
      an actuator operatively disposed between the rotary driver and the frame so that actuation of the actuator moves the rotary driver among a plurality of positions of the rotary driver with respect to the frame,
   wherein the frame is removably disposed on the structure, and the rotary driver is movable with respect to the frame so that, at each of the plurality of positions of the rotary driver, the first end of the tool is capable of engagement with a respective bolt disposed in the structure.

2. The bolt repair platform of claim 1, wherein the frame comprises a face disposed between the tool module and the internal support structure and a plurality of bolt access apertures extending through the face so that at least a portion of the tool passes through a bolt access aperture of the plurality of bolt access apertures to repair the bolt.

3. The bolt repair platform of claim 1 further comprising a plurality of vacuum cups attached to the frame and configured to apply a vacuum force to a surface of the internal support structure to maintain the bolt repair platform in position relative to the internal support structure during repair of the bolt.

4. The bolt repair platform of claim 1 further comprising a second tool module comprising
   a second tool having a first end configured to rotationally engage a bolt and a second end,
   a second motor-driven rotary driver movably mounted on the frame, wherein the second rotary driver defines a distal end thereof that is configured to retain the second end of the second tool so that, when actuated, the second rotary driver rotationally drives the second tool, and
   a second actuator operatively disposed between the second rotary driver and the frame so that actuation of the second actuator moves the second rotary driver among a plurality of positions of the second rotary driver with respect to the frame,
   wherein the second rotary driver is movable with respect to the frame, so that, at each of the plurality of positions of the second rotary driver, the first end of the second tool is capable of engagement with a second respective bolt disposed in the structure.

5. The bolt repair platform of claim 4, wherein the tool, the rotary driver and the actuator of the tool module are operable to repair the bolt simultaneously with the second tool, second rotary driver, and second actuator of the second tool module repairing the second bolt.

6. The bolt repair platform of claim 1, wherein the tool module further comprises
   a second tool having a first end configured to rotationally engage a bolt and a second end,
   a second motor-driven rotary driver movably mounted on the frame, wherein the second rotary driver defines a distal end thereof that is configured to retain the second end of the second tool so that, when actuated, the second rotary driver rotationally drives the second tool, and
   wherein the actuator is operatively disposed between the second rotary driver and the frame so that actuation of the actuator moves the second rotary driver among a plurality of positions of the secondary rotary driver with respect to the frame.

7. The bolt repair platform of claim 1, wherein the tool module further comprises a tool rotation motor configured to rotate the tool module about an axis between at least one working position and a tool change position, wherein the first end of the tool is directed toward the internal support structure in the at least one working position.

8. The bolt repair platform of claim 7, wherein the tool rotation motor is configured to rotate the tool module at least 180 degrees about the axis.

9. The bolt repair platform of claim 7, wherein the frame comprises
   a working face,
   a first side face,
   a second side face, and
   a plurality of bolt access apertures disposed through the working face and at least a portion of the first side face or second side face,
   wherein the at least one working position comprises a first working position in which the first end of the tool is directed toward the working face, a second working position in which the first end of the tool is directed toward the first side face, and a third working position in which the first end of the tool is directed toward the second side face.

10. The bolt repair platform of claim 7 further comprising a tool changer rack comprising a plurality of apertures configured to releasably retain one or more tools or bolts.

11. The bolt repair platform of claim 10 further comprising a vertical drive assembly to raise and lower the tool changer rack, the vertical drive assembly comprising a drive motor configured to drive a positioning gear along a rack coupled to the frame.

12. The bolt repair platform of claim 11 further comprising a spent bolt chute configured to receive a bolt or tool at a first end of the spent bolt chute and guide the bolt or tool to a spent bolt container disposed at a second end of the spent bolt chute.

13. The bolt repair platform of claim 12, wherein the tool changer rack comprises a spent bolt port extending through the tool changer rack and disposed at the first end of the spent bolt chute, such that the bolt or tool is passed through the spent bolt port to be received by the first end of the spent bolt chute.

14. The bolt repair platform of claim 1, wherein the actuator comprises
   a first positioning motor configured drive the tool module along a first linear bearing, and
   a second positioning motor configured to drive the tool module along a second linear bearing,
   wherein the first linear bearing is disposed perpendicularly to the second linear bearing.

15. The bolt repair platform of claim 14, wherein the first positioning motor or the second positioning motor is an air motor.

16. The bolt repair platform of claim 1, wherein the tool module further comprises a camera configured to acquire data in a video format for display to an operator monitoring the tool driven by the rotary driver.

17. The bolt repair platform of claim 16, wherein the camera is radiation hardened to be operable with a dose of at least two MRad.

18. The bolt repair platform of claim 1, wherein the tool module comprises a tool drive coupler chuck configured to shift between an open state to accept and release the tool and a closed state to retain the tool.

19. The bolt repair platform of claim 1 further comprising a plurality of mecanum wheels configured to support the bolt repair platform on the structure and drive the bolt repair platform in one or more directions.

20. A system for repairing bolts disposed in baffle plates forming an internal support structure of a nuclear reactor vessel, comprising:
a plurality of frames disposed adjacent one or more said baffle plates; and
at each said frame of the plurality of frames,
a tool disposed movably on the frame, the tool having an end configured to engage a first bolt disposed in a first baffle plate of the one or more baffle plates, and
a first actuator operatively disposed between the tool and the frame so that actuation of the first actuator moves the tool with respect to the frame,
wherein the frame and the tool are disposed with respect to the first baffle plate so that, upon actuating the first actuator to move the tool with respect to the frame to a position proximate a first bolt disposed in the first baffle plate, movement of at least one of the frame and the tool with respect to the first baffle plate engages the tool with the first bolt.

21. The system as in claim 20, wherein the tool at each said frame is movable on the frame in a first direction and in a second direction orthogonal to the first direction.

22. The system as in claim 21, wherein the first actuator at each said frame is disposed so that the first actuator moves the tool in the first direction, and comprising, at each said frame, a second actuator operatively disposed between the tool and the frame so that actuation of the second actuator moves the tool with respect to the frame in the second direction.

23. The system as in claim 22, comprising, at each said frame, a third actuator operatively disposed between the tool and the frame so that actuation of the third actuator moves the tool with respect to the frame in a third direction that is orthogonal to the first direction and the second direction.

24. The system as in claim 22, comprising, at each said frame, a sub-frame disposed on the frame movably with respect to the frame in the first direction, wherein
the tool is mounted on the sub-frame movably with respect to the frame in the second direction,
the first actuator is operatively disposed between the sub-frame and the frame, and
the second actuator is operatively disposed between the tool and the sub-frame.

25. The system as in claim 23, comprising, at each said frame a fourth actuator operatively disposed between the tool and the frame so that actuation of the fourth actuator rotates the tool about an axis.

26. The system as in claim 23, comprising, at each said frame,
a first sub-frame disposed on the frame movably with respect to the frame in the first direction, and
a second sub-frame disposed on the first sub-frame movably with respect to the first sub-frame in the second direction,
wherein
the tool is mounted on the second sub-frame movably with respect to the frame in the third direction,
the first actuator is operatively disposed between the first sub-frame and the frame,
the second actuator is operatively disposed between the second sub-frame and the first sub-frame, and
the third actuator is operatively disposed between the tool and the second sub-frame.

27. The system as in claim 20, comprising a sensor disposed with respect to the tool so that the sensor outputs a signal that varies with respect to the sensor's position with respect to one of the frame and the first baffle plate.

28. The system as in claim 27, wherein the sensor is a camera.

29. The system as in claim 27, wherein the sensor is a light-emitting optical sensor.

30. The system as in claim 20, comprising a sensor in communication with the first actuator so that the sensor outputs a signal that varies with operation of the first actuator in moving the tool.

31. The system as in claim 30, comprising a processor that receives the signal and computer instructions executable by the processor to cause the processor to track a position of the tool with respect to at least one of the frame and the first baffle plate.

32. A system for repairing bolts disposed in baffle plates forming an internal support structure of a nuclear reactor vessel, comprising:
a frame disposed adjacent one or more said baffle plates;
a plurality of tools disposed movably on the frame, each said tool having an end configured to engage one or more bolts disposed in the baffle plates; and
a plurality of actuators,
wherein, for each said tool of the plurality of tools,
at least one actuator of the plurality of actuators is operatively disposed between the tool and the frame so that actuation of the at least one actuator moves the tool with respect to the frame independently of each other tool of the plurality of tools, and
the frame and the tool are disposed with respect to a first baffle plate of the one or more baffle plates so that, upon actuating a first actuator of the at least one actuator to move the tool with respect to the frame to a position proximate a first bolt disposed in the first baffle plate, movement of at least one of the frame and the tool with respect to the first baffle plate engages the tool with the first bolt.

33. A system for repairing bolts disposed in baffle plates forming an internal support structure of a nuclear reactor vessel, comprising
a frame adjacent one or more said baffle plates;
a tool disposed movably on the frame, the tool having an end configured to engage a first bolt disposed in a first baffle plate of the one or more baffle plates;
a sub-frame disposed movably on the frame, wherein the tool is mounted on the sub-frame;
a first actuator operatively disposed between the tool and the frame so that actuation of the first actuator moves the tool with respect to the frame; and
a first conduit attached to the sub-frame and extending from the sub-frame to a position proximate a cable source, wherein the tool is attached to an end of a cable from the cable source so that insertion of the cable into the first conduit positions the tool at the sub-frame, and wherein the frame and the tool are disposed with respect to the first baffle plate so that, upon actuating the first actuator to move the tool with respect to the frame to a position proximate the first bolt, movement of at least one of the frame and the tool with respect to the first baffle plate engages the tool with the first bolt.

34. The system as in claim 33, comprising a rotary driver operatively disposed between the sub-frame and the tool so that, when actuated, the rotary driver rotationally drives the tool.

35. The system as in claim 33, comprising a valve in the first conduit, and a second conduit extending from the valve to a receptacle, wherein the valve is selectively actuatable between a first position at which the valve connects a first portion of the first conduit between the valve and the position proximate the cable source to a second portion of the first conduit that extends from the valve to the sub-frame and a second position at which the valve connects the first portion of the first conduit to the second conduit.

36. A system for repairing bolts disposed in baffle plates forming an internal support structure of a nuclear reactor vessel, comprising:

a frame disposed adjacent one or more said baffle plates;

a plurality of tools disposed on the frame, each tool having an end configured to engage a respective a first bolt disposed in a first baffle plate of the one or more baffle plates;

a chuck disposed movably on the frame between a first position at which an operative end of the chuck opposes a first tool of the plurality of tools and actuation of the chuck causes the chuck to grip the first tool and a second position at which the first tool opposes the first bolt; and an actuator operably disposed between the chuck and the frame so that actuation of the actuator moves the chuck with respect to the frame, and wherein the frame and the chuck are disposed with respect to the first baffle plate so that upon actuating the actuator to move the chuck with respect to the frame to a position proximate the first bolt, movement of at least one of the frame and the chuck with respect to the first baffle plate brings the chuck to the second position.

37. The system as in claim 36, comprising a sub-frame disposed movably on the frame, wherein the chuck is disposed movably on the sub-frame between the first position of the chuck and the second position of the chuck.

38. The system as in claim 37, wherein the chuck is disposed movably on the sub-frame about an axis between the first position of the chuck and the second position of the chuck and comprising a second actuator operatively disposed between the chuck and the sub-frame so that actuation of the second actuator rotates the chuck about the axis.

* * * * *